United States Patent
Suzuki et al.

(10) Patent No.: US 7,495,060 B2
(45) Date of Patent: Feb. 24, 2009

(54) TETRAKISPHENOL AND NON-CLATHRATED CURING AGENT FOR EPOXY RESIN

(75) Inventors: Hiroshi Suzuki, Chiba (JP); Satoru Abe, Chiba (JP); Izuo Aoki, Chiba (JP); Midori Aoki, legal representative, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 355 days.

(21) Appl. No.: 11/510,686

(22) Filed: Aug. 25, 2006

(65) Prior Publication Data

US 2006/0287465 A1    Dec. 21, 2006

Related U.S. Application Data

(60) Continuation-in-part of application No. 10/717,871, filed on Nov. 19, 2003, now abandoned, which is a division of application No. 09/331,829, filed on Jun. 23, 1999.

(60) Provisional application No. PCT/JP97/04889, filed on Dec. 26, 1997, now Pat. No. 6,727,325.

(30) Foreign Application Priority Data

| Dec. 27, 1996 | (JP) | ............................ 1996/358518 |
| Jan. 21, 1997 | (JP) | ............................ 1997/22040 |
| May 14, 1997 | (JP) | ............................ 1997/123964 |
| Jul. 2, 1997 | (JP) | ............................ 1997/177468 |

(51) Int. Cl.
*C08G 59/62* (2006.01)
*C08L 63/00* (2006.01)
*C08L 63/02* (2006.01)
*C08L 63/04* (2006.01)

(52) U.S. Cl. ............. 525/523; 525/423; 525/485; 525/486; 525/504; 525/505; 525/506; 525/508; 525/510; 525/533; 528/98

(58) Field of Classification Search .............. None
See application file for complete search history.

(56) References Cited

U.S. PATENT DOCUMENTS

| 3,694,407 A |   | 9/1972 | Krikorian |
| 4,246,162 A |   | 1/1981 | Schreiber |
| 4,668,718 A |   | 5/1987 | Schreiber |
| 5,157,165 A | * | 10/1992 | Koike et al. ............ 568/723 |
| 5,200,475 A |   | 4/1993 | Dewhirst |
| 5,364,977 A |   | 11/1994 | Asai et al. |
| 5,534,565 A | * | 7/1996 | Zupancic et al. ........ 523/454 |
| 6,727,325 B1 | * | 4/2004 | Suzuki et al. ............ 525/523 |

FOREIGN PATENT DOCUMENTS

| EP | 304125 A2 | 2/1989 |
| EP | 0488597 A1 | 6/1992 |
| JP | 60-40125 A | 3/1985 |
| JP | 01-074213 | 3/1989 |
| JP | 1-74213 A | * | 3/1989 |
| JP | 2-18413 A | * | 1/1990 |
| JP | 02018413 |   | 1/1990 |
| JP | 2-296814 A |   | 12/1990 |
| JP | 04-275325 A |   | 9/1992 |
| JP | 4-275325 A | * | 9/1992 |
| JP | 5-105739 |   | 4/1993 |
| JP | 5-105739 A | * | 4/1993 |
| JP | 5-194711 A |   | 8/1993 |
| JP | 5-201902 A |   | 8/1993 |
| JP | 6-9868 A |   | 1/1994 |
| JP | 6-166646 A |   | 6/1994 |
| JP | 6-329570 A |   | 11/1994 |
| JP | 7-76538 A |   | 3/1995 |
| JP | 7-173089 |   | 7/1995 |
| JP | 7-74260 |   | 8/1995 |
| JP | 8-151429 A |   | 6/1996 |

OTHER PUBLICATIONS

Chemical abstracts registry No. 25085-99-8 for UVR 6410 diglycidyl ether of bisphenol A polymer, 1967, two pages.*
Chemical Abstracts Registry No. 25085-99-8 for VVR6410, 1996.

* cited by examiner

*Primary Examiner*—Robert Sellers
(74) *Attorney, Agent, or Firm*—Dennis G. LaPointe

(57) ABSTRACT

The present invention has an object to provide curatives for epoxy resins and curing accelerators for epoxy resins, which both have improved subliming and decomposing properties and which, when mixed with an epoxy resin, enable the mixture to be greatly improved in thermal stability that is extremely important for the control of a curing reaction and to have a prolonged pot life (stability as a one-pack mixture comprising the epoxy resin, curative, etc.) and improved curability at low temperatures. The curative is characterized by being a clathrate comprising a tetrakisphenol compound represented by a general formula (I), wherein X represents $(CH_2)n$, wherein n is 0, 1, 2 or 3, and $R^1$ to $R^8$ each represents hydrogen, a lower alkyl, optionally-substituted phenyl, halogeno or a lower alkoxy, and the curing accelerator is characterized by being a clathrate comprising a tetrakisphenol compound represented by the general formula (I) shown above and a compound accelerating the curing of a compound which reacts with the epoxy group of an epoxy resin to cure the resin.

(1)

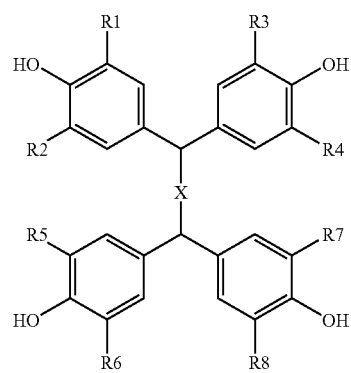

4 Claims, 72 Drawing Sheets

TETRAKISPHENOL AND NON-CLATHRATED CURING AGENT FOR EPOXY RESIN

RELATED APPLICATIONS

This application is a continuation-in-part of U.S. patent application Ser. No. 10/717,871, filed Nov. 19, 2003, which is a divisional application of U.S. patent application Ser. No. 09/331,829, filed Jun. 23, 1999, now U.S. Pat. No. 6,727,325, which is a national stage application under 35 U.S.C. 371(c)(1) of international application PCT/JP97/04889, filed Dec. 26, 1997.

FIELD OF INVENTION

The present invention is related to epoxy resin compositions and to a curative for epoxy resins and a curing accelerator for epoxy resins, both of which contain a tetrakisphenol compound.

BACKGROUND OF THE INVENTION

Epoxy resins are characterized as one having various excellent properties, such as chemical proof, corrosion resistance, mechanical property, thermal property, adhesive property to various materials, electric property, and easy handling property under any condition, and are widely used for adhesives, paints, electrometal materials and complex materials. An epoxy group in an epoxy resin is a functional group which has great distortion therein and enormous reactivity, being reactive to both acids and bases, and is capable of curing epoxy resins by virtue of such high reactivity to make a resin into three dimension structure. An epoxy resin composition is composed of an epoxy prepolymer, which contains more than 2 epoxy groups in a molecule, and a curative, and is normally added with a curing accelerator, a denaturant, a filler, etc. depending upon the use thereof. It is known that the property of a cured-resin is subject to the type of a curative used, and various curatives have ever been used for industrial purposes. Epoxy resin compositions can be divided into two main types, the one is one-pack mixture and the other is two-pack mixture type, the former type can be cured, for example, by heating, pressing or allowing the composition itself to stand. The other type, two-pack mixture type, can be cured by admixing the main component and either a curative or a curing accelerator just before use and subsequently heating, pressing or allowing the mixture to stand, for example. Normally, the epoxy resin compositions are prepared into two-pack mixture-types, which are widely used for parts to be used in the fields of electric appliances industry, automobile industry and air-crafts industry, since two-pack mixture type has excellent properties in terms of the strength of cured-products, thermal property, electricity property, etc., though it is not easy to handle and not economical from operation point of view. However, the two-pack mixture type has problems that, (1) since it has short pot life, that means time maintainable the state of prepared composition to be usable for curing, operational performance is ceased due to starting of partial curing of the composition during the preparation, which causes the increase of viscosity of the composition, and (2) the physico-chemical property of the composition is ceased by incorrect mixing or incomplete preparation. Therefore, latent-type curatives and curing accelerators, which are prepared as one-pack mixture type, have been desired. Latent-type curatives and curing accelerators are defined as ones, in which a curative and a curing accelerator compounded in a resin are stable at room temperature, and which may induce a curing reaction by virtue of an effect such as heating. For the initiation of curing reactions, heat, light, pressure, etc. may be effective, however, it is rather normal to use heating. For stabilizing the effect of curatives and curing accelerators, microcapsules thereof have been used, however, such microcapsules do not have sufficient mechanical strength, and therefore, there have been a problem in stability of those microcapsules such that they cannot stand for a process of blending to adjust resin compositions.

It is known that there are several types of curatives, for example, (1) addition-type curatives, the molecules of a curative are always incorporated into a cured-resin by virtue of the reaction with epoxy groups, (2) polymerization-type curatives, of which molecules enzymatically induce opening of rings of epoxy groups without causing incorporation of molecules of the curative into resins to cause polymerization and addition reaction between oligomers, and (3) photoinitiation-type curatives, which initiate curing by gaining irradiation of ultraviolet rays. Irrespective of the type as described above, it is the most important thing to carry on polymerization addition reaction under a fixed condition and more homogeneously and faster in order to obtain a cured-product in the stable state. However, we have still problems when using any of existing curatives such that (1) curing reaction by using any of existing curatives stops before the completion of the reaction due to increase of viscosity of resins, (2) there are many inhibitory factors against a curing reaction, (3) some severe conditions are required for completing a curing reaction, and (4) a great amount of a curative is required for carrying out a curing reaction homogeneously, and therefore, curing accelerators which enable to proceed homogeneous and fast polymerization addition reaction under a mild condition have badly been required. The curing accelerator is defined here as the one which makes the curing time of a curative for curing epoxy resins shorter and makes the curing reaction faster and more smooth. For addition-type curatives, such as primary amines and secondary amines, alcohols or phenols are used as a curing accelerator for promoting a polymerization-addition reaction. However, there is yet a problem in those use in general, since in case of using any of polymerization-type curatives, such as imidazoles, anion polymerization to be developed between oligomers tends to be inhibited by such alcohols and phenols.

In Japanese Patent Laid-open No. Hei 5-194711 Gazette, an epoxy resin which is compounded with a clathrate comprising both a curative for epoxy resins and a curing accelerator for epoxy resins with a multimolecular (phenol) host compound is described. Specifically, a method for curing epoxy resins by adding a clathrate comprising 2-ethyl-4-methylimidazole and 2,2'-methylenebis(4-methyl-6-t-butylphenol) at a ratio of 1:1 is added into an epoxy resin at a rate of several % based on imidazole is described in the Gazette.

However, although there is a description that a pot life (stability as a one-pack mixture) of the compounded-epoxy resin described above can be prolonged sharply, it is just a comparison with a similar clathrate, cyclodextrin, and the performance of that compounded-epoxy resin is not yet satisfactory for the use in a practical scale. Also, there is no description on the thermal stability and the curability at low temperature in the Gazette.

In Japanese Patent Laid-open No. Hei 5-201902 Gazette, there is a description of a clathrate comprising a tetrakis-phenol compound and an imidazole compound, although there is no definite description that the clathrate can be used as a curative and a curing accelerator for epoxy resins.

In Japanese Patent Laid-open Nos. Sho 60-40125 and Hei 8-151429 Gazettes, an use of a salt of an imidazoline compound and a polyhydric phenol as a curative for epoxy resins is described. However, such curative is neither crystalline solid nor a clathrate and does not give sufficient stabilizing effect as a one-pack mixture, in practice. Again, in U.S. Pat. No. 3,519,576, an use of a salt of an amine compound and a polyhydric phenol compound as a curative for epoxy resins is described. However, this salt is not practically satisfactory as a curative in the light of the stability as a one-pack mixture. In U.S. Pat. No. 4,845,234, an use of a salt of an imidazole compound and a polyhydric phenol compound as a curative for epoxy resins is described. However, the state of this salt is highly-viscous liquid and is not a clathrate compound, and it is not the one which can be practically used with satisfaction in the light of the stability as a one-pack mixture.

In Japanese Patent Publication No. Hei 6-9868, a disclosure of the use of a salt of a tetrakisphenol compound and an imidazole compound as a curative for epoxy resins is made, however, there is no definite description about the use. In this publication, a salt of an imidazole compound and a polyhydric phenol compound is disclosed, however, the state of the salt is highly-viscous liquid and is not formed as a clathrate compound. Though there is a description as to the stability as a one-pack mixture, etc., such effect seems to be practically unsatisfactory. Furthermore, the description lacks an explanation on the heat stability and the curability at low temperatures.

In Japanese Patent Publication No. 2501154 and Japanese Patent Publication No. Hei 7-74260, there is a description that a tetrakisphenol skeleton be introduced into a produced-resin by using a tetrakisphenol compound as a curative. In this case, There is a characteristic in the resin that a tetrakisphenol skeleton be introduced into the produced-resin, where the tetrakisphenol compound as a curative is used at a greater rate of 0.5-2 moles against 1 mole of epoxy groups. As the effect, only description on the stability as a one-pack mixture is given, whereas no description is given about the stability on heat and the curability at low temperatures.

Considering such background as described above, it is an object of the present invention to provide a curative for epoxy resins and a curing accelerator for epoxy resins, which have improved subliming property and decomposing property, remarkably-improved thermal stability which is extremely important for the control of a curing reaction, a prolonged pot life (stability as a one-pack mixture comprising an epoxy resin and a curative) and improved curability at low temperatures. Furthermore, the present invention is also directed to provide an epoxy resin composition which provides stable cured-products even under a mild condition by proceeding a curing reaction of an epoxy resin faster and smoothly, etc.

DISCLOSURE OF INVENTION

For solving the problem as described above, it is found that the thermal stability of a curative for epoxy resins and a curing accelerator for epoxy resins in an epoxy resin composition can be improved by including either the curative or the curing accelerator with a tetrakisphenol host compound, allowing the pot life of such curative and curing accelerator remarkably longer, and further improving the curability thereof at low temperatures.

Further, it is found by the inventors that a fast and smooth curing reaction of epoxy resins can be accomplished by simultaneously using a specific tetrakisphenol compound together with a compound which reacts with the epoxy group of an epoxy resin to cure the resin, and that stable cured-products can be obtained even under a mild condition for the reaction.

Therefore, the present invention is directed to a curative for epoxy resins, characterized that the curative is composed of a clathrate of a tetrakisphenol compound represented by a general formula [I];

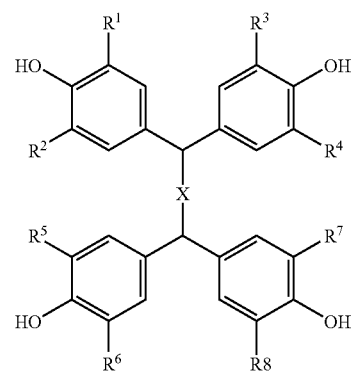

wherein X represents $(CH_2)n$, wherein n is 0, 1, 2 or 3, and $R^1$ to $R^8$ each represents hydrogen, a lower alkyl, optionally-substituted phenyl, halogeno or a lower alkoxy, and a compound which reacts with the epoxy group of an epoxy resin to cure the resin, and to a curing accelerator, characterized by being a clathrate comprising a tetrakisphenol compound represented by the general formula [I] shown above and a compound accelerating the curing of a compound which reacts with the epoxy group of an epoxy resin to cure the resin.

The present invention is directed to an epoxy resin composition characterized by containing at least one of a clathrate comprising a tetrakisphenol compound represented by a general formula [I] and a compound which reacts with the epoxy group of an epoxy resin to cure the resin and a clathrate comprising a tetrakisphenol compound represented by the general formula [I] and a compound accelerating the curing of a compound which reacts with the epoxy group of an epoxy resin to cure the resin, and preferably to an epoxy resin composition wherein said clathrate is contained at a content range of from 0.001 to 0.1 mole based on 1 mole of epoxy groups.

Furthermore, the present invention is also directed to an epoxy resin composition characterized by containing a curative which reacts with the epoxy group of an epoxy resin to cure the resin and a tetrakisphenol compound represented by a general formula [I];

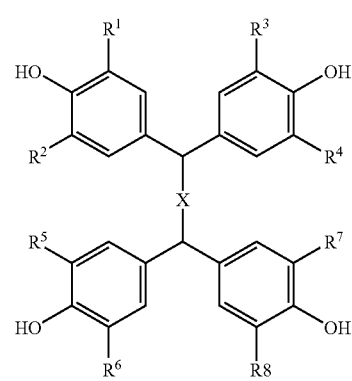

wherein X represents $(CH_2)n$, wherein n is 0, 1, 2 or 3, and $R^1$ to $R^8$ each represents hydrogen, a lower alkyl, optionally-substituted phenol, halogeno or a lower alkoxy, in an amount of from 0.001 to 0.025 mole based on 1 mole of epoxy groups.

As examples for the compound (curative) which reacts with the epoxy group of an epoxy resin to cure the resin and the compound (curing accelerator) accelerating the curing of a compound which reacts with the epoxy group of an epoxy resin to cure the resin, amines, imidazoles, amides, esters, alcohols, thiols, ethers, thioethers, phenols, phosphorus compounds, ureas, thioureas, acid anhydrides, Louis acids, onium salts, active silica compounds-aluminum complexes, etc. are given, however, any ones can be optionally selected from the ones which are customarily and conventionally-used as a curative or a curing accelerator for epoxy resins without any constraints.

As amines, for examples, aliphatic amines, alicyclic and heterocyclic amines, aromatic amines, modified amines and the like can be used.

As examples for the aliphatic amines: ethylenediamine, trimethylenediamine, tetramethylenediamine, hexamethylenediamine, diethylenetriamine, triethylenetetramine, tetraethylenepentamine, dipropylenediamine, dimethylaminopropylamine, diethylaminopropylamine, trimethylhexamethylenediamine, pentanediamine, bis(2-dimethylaminoethyl)ether, pentamethyldiethylenetriamine, alkyl-t-monoamine, 1,4-diazabicyclo(2,2,2)octane(triethylenediamine), N,N,N',N'-tetramethylhexamethylenediamine, N,N,N',N'-tetramethylpropylenediamine, N,N,N',N'-tetramethylethylenediamine, N,N-dimethylcyclohexylamine, dimethylaminoethoxyethoxy ethanol, dimethylaminohexanol and the like can be given.

As examples for the alicyclic and heterocyclic amines; piperidine, piperidine, menthanediamine, isophoronediamine, methylmorpholine, ethylmorpholine, N,N',N''-tris (dimethylaminopropyl)hexahydro-s-triazine, 3,9-bis(3-aminopropyl)-2,4,8,10-tetraoxyspiro(5,5)undecaneadacto, N-aminoethylpiperadine, trimethylaminoethylpiperadine, bis(4-aminocyclohexyl)methane, N,N'-dimethylpiperadine, 1,8-diazabicyclo(4,5,0)undecene-7 and the like can be given.

As examples for the aromatic amines, o-phenylenediamine, m-phenylenediamine, p-phenylenediamine, diaminodiphenylmethane, diaminodiphenylsulfone, benzylmethylamine, dimethylbenzylamine, m-xylenediamine, pyridine, picoline and the like can be given.

As examples for the modified polyamines, polyamines added with epoxy compounds, polyamines added by Michael reaction, polyamines added by Mannich reaction, polyamines added with thiourea, ketone-blocked polyamines and the like can be given.

As examples for other amines, dicyandiamide, guanidine, organic acid hydrazid, diaminomaleonitrile, amineimide, trifluoroboron-piperidine complex, trifluoroboron-monoethylamine complex and the like can be given.

As examples for the imidazol compounds, imidazol, 2-methylimidazol, 2-ethylimidazol, 2-isopropylimidazol, 2-n-propylimidazol, 2-undecyl-1H-imidazol, 2-heptadecyl-1H-imidazol, 1,2-dimethylimidazol, 2-ethyl-4-methylimidazol, 2-phenyl-1H-imidazol, 4-methyl-2-phenyl-1H-imidazol, 2-phenyl-4-methylimidazol, 1-benzyl-2-methylimidazol, 1-cyanoethyl-2-methylimidazol, 1-cyanoethyl-2-ethyl-4-methylimidazol, 1-cyanoethyl-2-undecylimidazol, 1-cyanoethyl-2-phenylimidazol, 1-cyanoethyl-2-ethyl-4-methylimidazolium trimellitate, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-(2'-undecylimidazolyl)-ethyl-s-triazine, 2,4-diamino-6-[2'-ethyl-4-imidazolyl-(1')]-ethyl-s-triazine, 2,4-diamino-6-[2'-methylimidazolyl-(1')]-ethyl-s-triazine isocyanuric acid addition products, 2-phenylimidazol isocyanuric acid addition products, 2-methylimidazol isocyanuric acid addition products, 2-phenyl-4,5-dihydroxymethylimidazo 1,2-phenyl-4-methyl-5-hydroxymethylimidazol, 1-cyanoethyl-2-phenyl-4,5-di(2-cyanoethoxy)methylimidazol, 1-dodecyl-2-methyl-3-benzylimidazolium chloride, 1-benzyl-2-phenylimidazole hydrochloride, 1-benzyl-2-phenylimidazolium trimellitate and the like can be given.

As examples for the imidazoline compounds, 2-methylimidazoline, 2-phenylimidazoline and the like can be given.

As examples for the amide compounds, polyamides obtainable by means of polymerization of dimaric acid and polyamine can be given, and as examples for ester compounds, active carbonyl compounds, such as aryl and thioaryl esters of carboxylic acids, can be given. Further, as examples for phenol, alcohols, thiols, ethers and thioether compounds, phenol novolac, cresol novolac, polyol, polymercaptan, polysulfide, 2-(dimethylaminomethylphenol), 2,4,6-tris (dimethylaminomethyl)phenol, tri-2-ethylhexyl hydrochloride of 2,4,6-tris(dimethylaminomethyl)phenol and the like can be given.

Further, as examples for urea, thiourea and Louis acid type curatives, butylated urea, butylated melamine, butylated thiourea, trifluoroboron and the like can be given.

As examples for phosphorus-containing curatives, organic phosphine compounds, such as alkyl phosphines including ethyl phosphine and butyl phosphine, primary phosphines, such as phenyl phosphine, dialkyl phosphines, such as dimethyl phosphine and dipropyl phosphine, secondary phosphines, such as diphenyl phosphine and methylethyl phosphine, tertial phosphines, such as trimethyl phosphine and triethyl phosphine, and the like can be given, whereas as examples for acid anhydride type curatives, phthalic anhydride, hexahydrophthalic anhydride, methyltetrahydrophthalic anhydride, methylhexahydrophthalic anhydride, endomethylenetetrahydrophthalic anhydride, methylendomethyle netetrahydrophthalic anhydride, maleic anhydride, tetramethylenemaleic anhydride, trimellitic anhydride, chlorendic anhydride, piromellitic anhydride, dodecenylsuccinic anhydride, benzophenonetetracarboxylic anhydride, ethylene glycol bis(anhydrotrimellitate), methylcyclohexenete tracarboxylic anhydride, polyazelaic anhydride and the like can be given.

As examples for onium salt type and active silica compound-aluminium complex type curatives, aryldiazonium salts, diaryliodonium salts, triarylsulfonium salts, triphenylsilanol-aluminium complex, triphenylmethoxysilane-aluminium complex, silylperoxide-aluminium complex, triphenylsilanol-tris(salicylaldehydato)-aluminium complex and the like can be given.

In the present invention, the tetrakisphenol compound forming a clathrate compound with the curative or the curing accelerator as described above is a compound represented by a general formula [I];

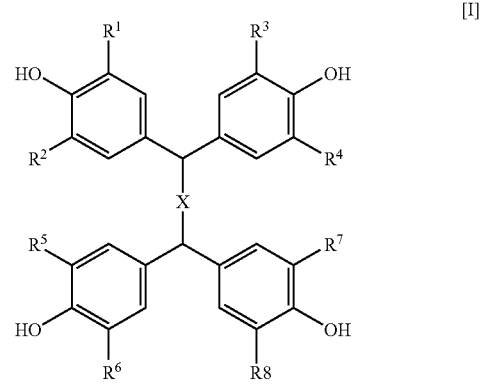

wherein X represents $(CH_2)n$, wherein n is 0, 1, 2 or 3, and $R^1$ to $R^8$ may be the same or each independently different, and which represents, for examples, hydroxy, a $C_1$-$C_6$ lower alkyl, such as methyl, propyl, isopropyl, n-butyl, isobutyl, t-butyl, n-hexyl and cyclohexyl, phenyl optionally-substituted with halogeno, a lower alykl or the like, halogeno, such as fluorine, chlorine, bromine and iodine, or a $C_1$-$C_6$ lower alkoxy, such as methoxy, ethoxy and t-butoxy.

Any tetrakis phenols represented by a general formula [I] can be used in the present invention without any cobstraint, and the followings are given as the definite examples, those are 1,1,2,2-tetrakis(4-hydroxyphenyl)ethane, 1,1,2,2-tetrakis(3-methyl-4-hydroxyphenyl)ethane, 1,1,2,2-tetrakis(3,5-dimethyl-4-hydroxyphenyl) ethane, 1,1,2,2-tetrakis(3-chloro-4-hydroxyphenyl)ethane, 1,1,2,2-tetrakis(3,5-dichloro-4-hydroxyphenyl)ethane, 1,1,2,2-tetrakis(3-bromo-4-hydroxyphenyl)ethane, 1,1,2,2-tetrakis(3,5-dibromo-4-hydroxyphenyl) ethane, 1,1,2,2-tetrakis(3-t-butyl-4-hydroxyphenyl)ethane, 1,1,2,2-tetrakis(3,5-di-t-butyl-4-hydroxyphenyl)ethane, 1,1,2,2-tetrakis(3-fluoro-4-hydroxyphenyl)ethane, 1,1,2,2-tetrakis(3,5-difluoro-4-hydroxyphenyl)ethane, 1,1,2,2-tetrakis(3-methoxy-4-hydroxyphenyl)ethane, 1,1,2,2-tetrakis(3,5-dimethoxy-4-hydroxyphenyl)ethane, 1,1,2,2-tetrakis(3-chloro-5-methyl-4-hydroxyphenyl)ethane, 1,1,2,2-tetrakis(3-bromo-5-methyl-4-hydroxyphenyl)ethane, 1,1,2,2-tetrakis(3-methoxy-5-methyl-4-hydroxyphenyl)ethane, 1,1,2,2-tetrakis(3-t-butyl-5-methyl-4-hydroxyphenyl)ethane, 1,1,2,2-tetrakis(3-chloro-5-bromo-4-hydroxyphenyl)ethane, 1,1,2,2-tetrakis(3-chloro-5-phenyl-4-hydroxyphenyl)ethane, 1,1,2,2-tetrakis[(4-hydroxy-3-phenyl)phenyl]ethane, 1,1,3,3-tetrakis(4-hydroxyphenyl)propane, 1,1,3,3-tetrakis(3-methyl-4-hydroxyphenyl)propane, 1,1,3,3-tetrakis(3,5-dimethyl-4-hydroxyphenyl) propane, 1,1,3,3-tetrakis(3-chloro-4-hydroxyphenyl)propane, 1,1,3,3-tetrakis(3,5-dichloro-4-hydroxyphenyl)propane, 1,1,3,3-tetrakis(3-bromo-4-hydroxyphenyl)propane, 1,1,3,3-tetrakis(3,5-dibromo-4-hydroxyphenyl)propane, 1,1,3,3-tetrakis(3-phenyl-4-hydroxyphenyl) propane, 1,1,3,3-tetrakis(3,5-diphenyl-4-hydroxyphenyl)propane, 1,1,3,3-tetrakis(3-methoxy-4-hydroxyphenyl)propane, 1,1,3,3-tetrakis(3,5-dimethoxy-4-hydroxyphenyl)propane, 1,1,3,3-tetrakis(3-t-butyl-4-hydroxyphenyl)propane, 1,1,3,3-tetrakis(3,5-di-t-butyl-4-hydroxyphenyl) propane, 1,1,4,4-tetrakis(4-hydroxyphenyl)butane, 1,1,4,4-tetrakis(3-methyl-4-hydroxyphenyl)butane, 1,1,4,4-tetrakis(3,5-dimethyl-4-hydroxyphenyl)butane, 1,1,4,4-tetrakis(3-chloro-4-hydroxyphenyl)butane, 1,1,4,4-tetrakis(3,5-dichloro-4-hydroxyphenyl)butane, 1,1,4,4-tetrakis(3-methoxy-4-hydroxyphenyl)butane, 1,1,4,4-tetrakis(3,5-dimethoxy-4-hydroxyphenyl)butane, 1,1,4,4-tetrakis(3-bromo-4-hydroxyphenyl)butane, 1,1,4,4-tetrakis(3,5-dibromo-4-hydroxyphenyl) butane, 1,1,4,4-tetrakis(3-t-butyl-4-hydroxyphenyl)butane, 1,1,4,4-tetrakis(3,5-di-t-butyl-4-hydroxyphenyl)butane and the like. These tetrakis phenol compounds can be used in either form of single or a combination of 2 or more thereof in the present invention.

The synthesis of a clathrate comprising a tetrakisphenol compound and either a compound which reacts with the epoxy group of an epoxy resin to cure the resin (a curative) or a compound accelerating the curing of a compound which reacts with the epoxy group of an epoxy resin to cure the resin (a curing accelerator) can be achieved at high selectivity and a high yield, by adding a tetrakisphenol compound into liquid amine or imidazole compound, which are either a curative or a curing accelerator, to allow them to a reaction in case such amine and imidazole are liquid compounds, or by adding a tetrakisphenol compound into the suspension of such amine or imidazole in case they are solid compound, or by allowing a tetrakisphenol powder to a solid-phase reaction directly with such solid amine or imidazole. The clathrate according to the present invention is produced basing on a mechanism that the molecules of a guest compound penetrate into the space in the crystalline lattice constituted by the molecules of a host compound. Consequently, for a guest compound, easiness in such penetration might be determined by the size, the configuration, the polarity, the solubility, etc. of the molecules of a guest compound. The state of the clathrate prepared in the present invention is crystalline solid.

As examples for the uncured epoxy resins applicable for the present invention, publicly-known resins, for examples, bisphenol A-epichlorohydrin resin, multifunctional epoxy resins, alicyclic epoxy resins, brominated epoxy resins, and epoxy-novolac resins, which contain at least one epoxy group in the molecule, can be given.

The present invention is directed to an epoxy resin composition characterized in that the composition contains a clathrate comprising a tetrakisphenol compound represented by a general formula [I] and either a curative for epoxy resins or a curing accelerator for epoxy resins, such as amines and imidazoles as described above, as a curative for epoxy resins and/or a curing accelerator for epoxy resins.

The amount of the clathrate to be used may be same to the amount of curatives and curing accelerators commonly-used, such as amines and imidazoles, to prepare a clathrate, and it depends on a method for curing. In case of using addition-type curatives of which molecules are always contained in the cured-resin because of its reaction with the epoxy groups, a clathrate is normally prepared by using a curative in an amount ranging from 0.3 to 1.0 mole relative to 1 mole of epoxy groups, though it depends on requirements on the property of a desired resin. Whereas, in case of polymerization-type curatives or light initiation-type curatives, which causes polymerization and addition reactions between oligomers by inducing the ring opening of epoxy groups in a reagent fashion without causing the inclusion of the curative molecules into the resin, and in case of using the clathrate as a curing accelerator, the content of the clathrate can be sufficient even it is less than 0.2 mole relative to 1 mole of epoxy groups. Particularly in the present invention, by using a clathrate wherein a tetrakisphenol compound is used, it is possible to reduce the content of the clathrate to a small amount ranging from 0.001 to 0.1 mole, and further to a range of from 0.001 to 0.05 mole. Further, it is also possible to use such clathrates as single or by mixing 2 or more thereof.

When the curative for epoxy resins or the curing accelerator for epoxy resins comprising the clathrate according to the present invention is compounded with the uncured epoxy resin as described above, the thermal stability which is very important for the control of a curing reaction is remarkably improved when compared with the stability of the epoxy resin, wherein only the guest compound (a curative or a curing accelerator, such as amines and imidazoles, before being included) contained in the curative and the curing accelerator is compounded.

The curative for epoxy resins and the curing accelerator for epoxy resins according to the present invention have good resistance against humidity and does not cause the decomposition and sublimation thereof.

And, the resin compositions according to the present invention containing the clathrates as a curatives or a curing accelerator as described above have several excellent thermal properties. For the thermal properties of the resin composition, three properties, including the thermal stability at an ordinary temperature (stability as a one-pack mixture), thermal stability to heating at a temperature of from an ordinary temperature to a desired temperature for a curing reaction and thermal stability at a curing temperature, are required. The uncured epoxy resins compounded with the curative and the curing accelerator according to the present invention are very stable (having good stability as a one-pack mixture) under an ordinary temperature and are curable by just heating them up to a certain temperature to promptly produce a cured-product.

The curing of the epoxy resin should not be initiated at a temperature below 80° C. or around. However, the epoxy resin starts curing rapidly when temperature raised to a range of from 100 to 130° C., which is normally desired for curing. In case of using known curatives and curing accelerators, curing of epoxy resins normally start gradually by heating even before a time that temperature reaches to a desired range for curing, which gives unfavorable effect to the cured-product. In addition, in case of using a known curative having relatively excellent thermal stability, the initiating temperature for curing comes into a higher range of from 150 to 180° C. However, by using the curative according to the present invention, curing at a lower range of temperature can be done.

As described above, the present invention discloses that a tetrakisphenol compound and a curative for epoxy resins or a curing accelerator for epoxy resins produce a crystalline clathrate having excellent preserving property and that the epoxy resin composition containing the said clathrate has remarkably excellent thermal property.

Further, the tetrakisphenol compound that forms the said clathrate is a compound that is conventionally known as an addition-type curative. However, the inventors of the present invention found that the tetrakisphenol compound itself has an excellent catalytic action for curing epoxy resins.

Therefore, the present invention is also understood that it is directed to an epoxy resin composition comprising a curative which reacts with the epoxy group of an epoxy resin to cure the resins and a tetrakisphenol compound represented by a general formula [I] in an amount of from 0.001 to 0.025 mole based on 1 mole of the epoxy groups;

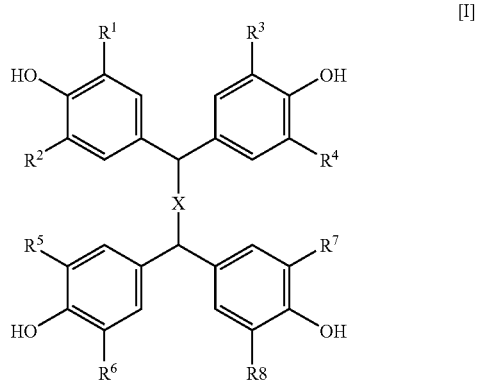

[I]

wherein X represents $(CH_2)n$, wherein n is 0, 1, 2 or 3, and $R^1$ to $R^8$ each represents hydrogen, a lower alkyl, optionally-substituted phenyl, halogeno or a lower alkoxy.

Examples for both of the curatives used in the present invention and the tetrakisphenol compounds represented by a general formula [I] and used together with the curatives are as described above.

By using the epoxy resin composition according to the present invention containing a tetrakisphenol compound, various curing reactions can proceed faster and smoothly even under a mild condition, which allow to obtain stable cured-products, because of the excellent catalytic activity of a tetrakisphenol compound for curing epoxy resins, and the curing property of a resin composition can be extremely improved by using the inventive epoxy resin composition when compared to the curing by using a curative only.

As described above, by using the clathrate comprising a curative for epoxy resins, such as amine compounds and imidazole compounds, and a tetrakisphenol compound, as a curative for epoxy resins, it is allowed to obtain a resin compound which has excellent thermal properties, such as stability as a one-pack mixture, stability to heat and curability at a low temperature, even with a very small amount, because of double effects, that is release of the curative included in the clathrate by heating and demonstration of concurrent catalytic effect given by the tetrakisphenol compound.

In addition to the elements described above, it is also allowable to compound various additives, such as a plasticizer, an organic solvent, a reactive diluent, a filler, a bulking agent, a reinforcing agent, a pigment, a flame retardant, a thickener and a mold-releasing agent, into the epoxy resin composition of the present invention, if required.

The curative for epoxy resins and the curing accelerator for epoxy resins specified in the present invention can be suitably used for curing epoxy resins, such as for epoxy resin-type adhesives, sealants for semiconductors, laminates for printed boards, varnish, powder paints, casting materials and inks.

BEST MODE FOR CARRYING OUT THE INVENTION

Figure 1:
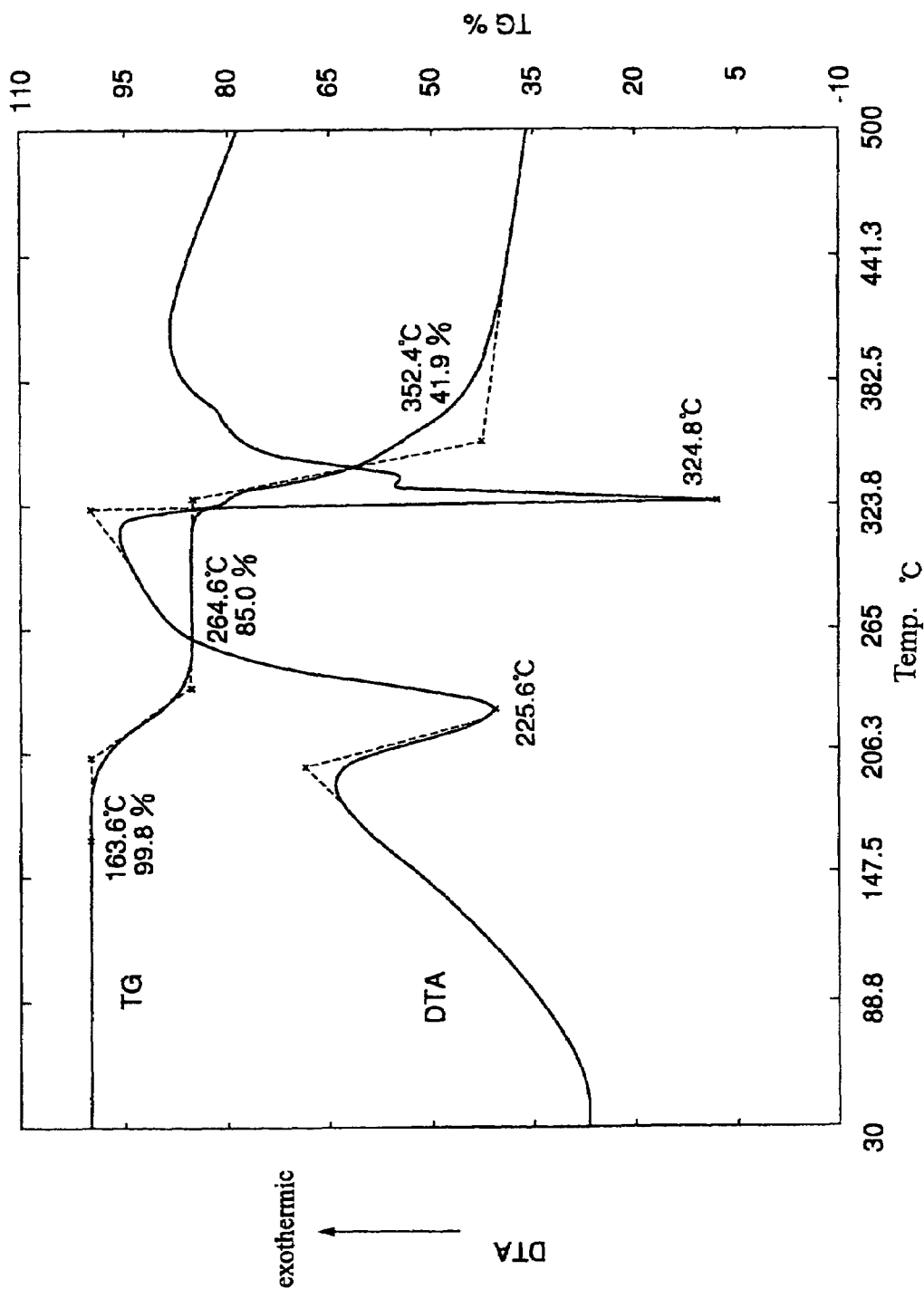
FIG. 1 shows a thermal analysis chart (TG/DTA) of a clathrate (Sample No. 10) described in Table 1.
Figure 2:
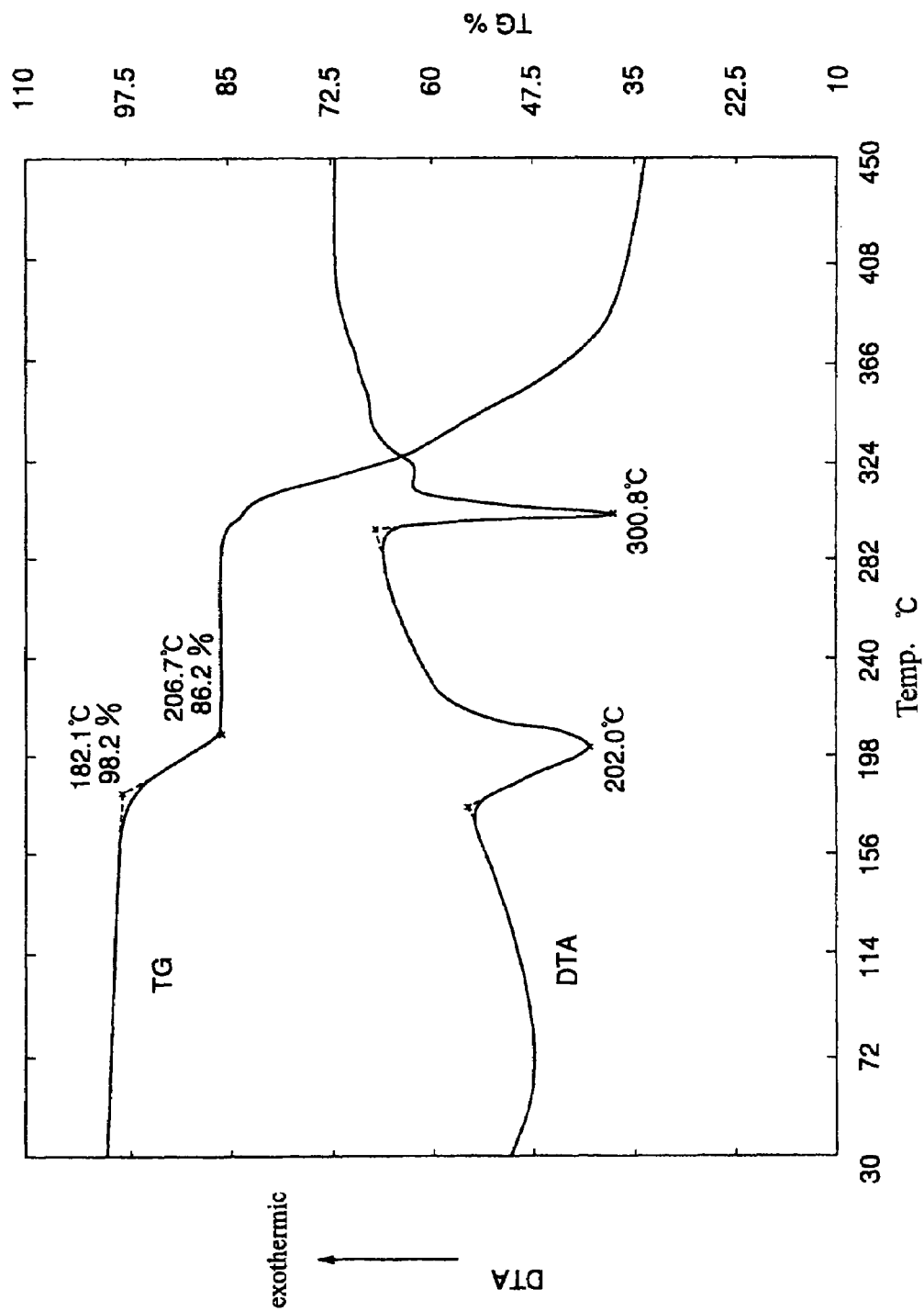
FIG. 2 shows a thermal analysis chart (TG/DTA) of a clathrate (Sample No. 11) described in Table 1.
Figure 3:
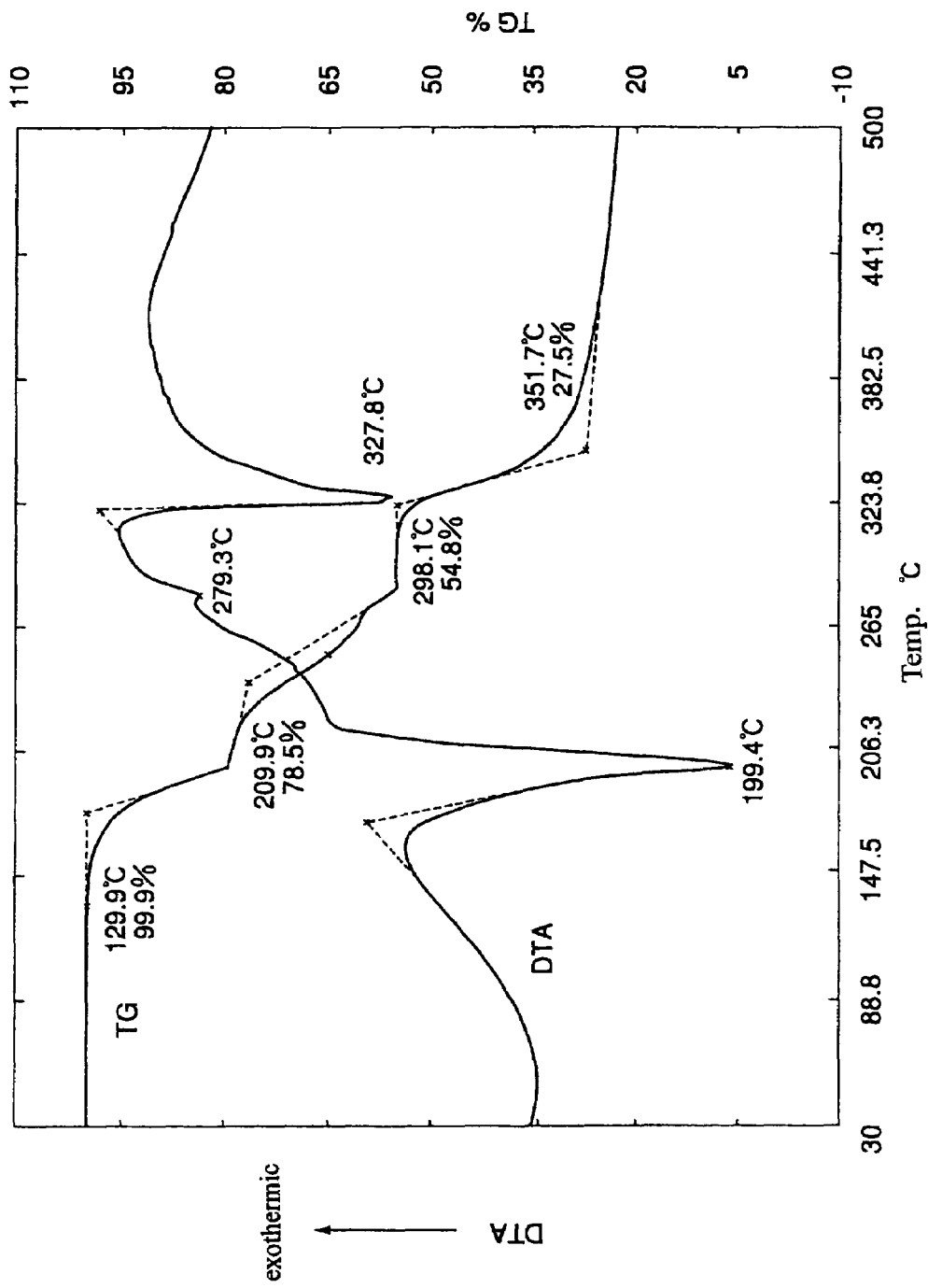
FIG. 3 shows a thermal analysis chart (TG/DTA) of a clathrate (Sample No. 19) described in Table 1.
Figure 4:
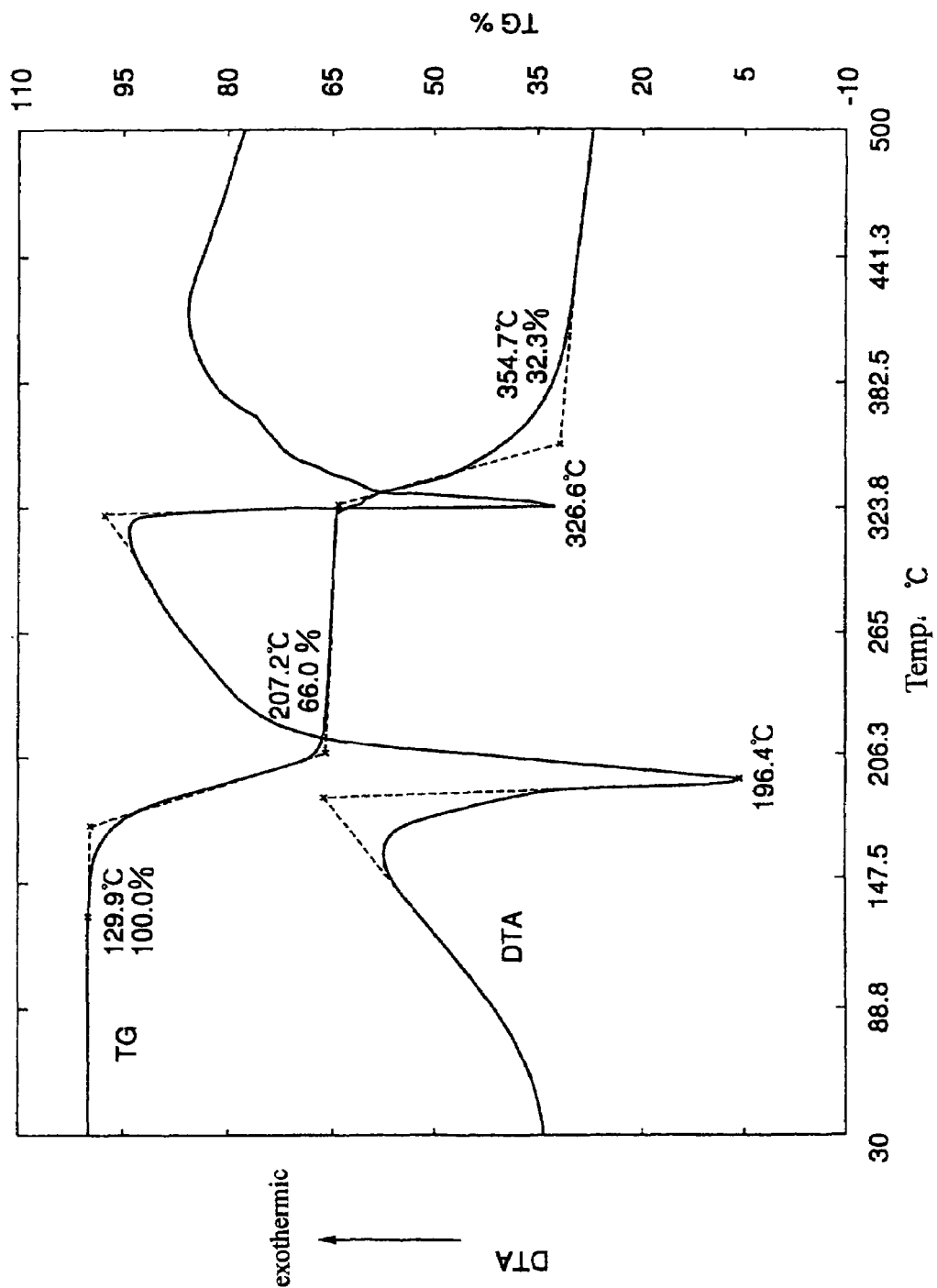
FIG. 4 shows a thermal analysis chart (TG/DTA) of a clathrate (Sample No. 20) described in Table 1.
Figure 5:
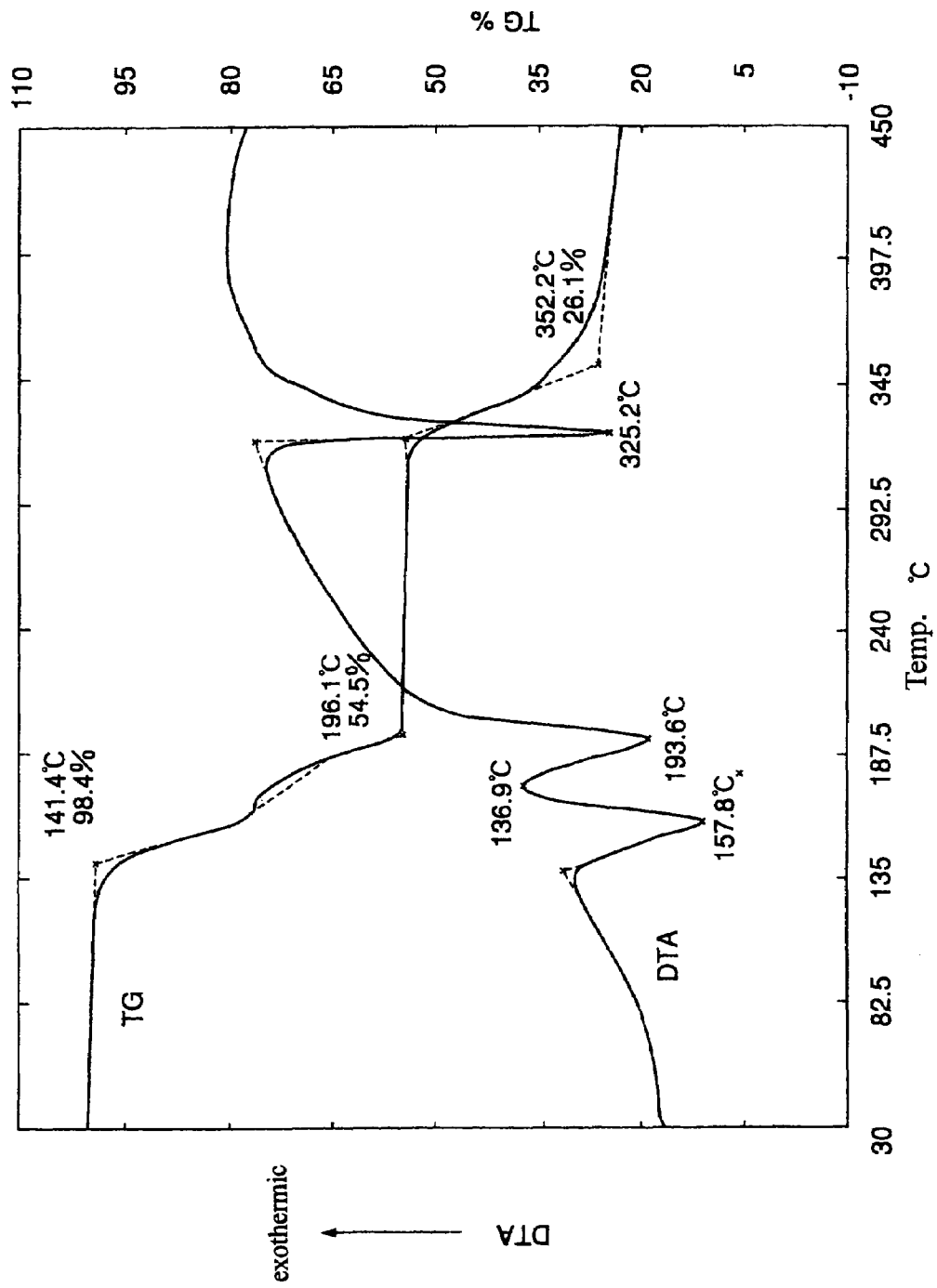
FIG. 5 shows a thermal analysis chart (TG/DTA) of a clathrate (Sample No. 21) described in Table 1.
Figure 6:
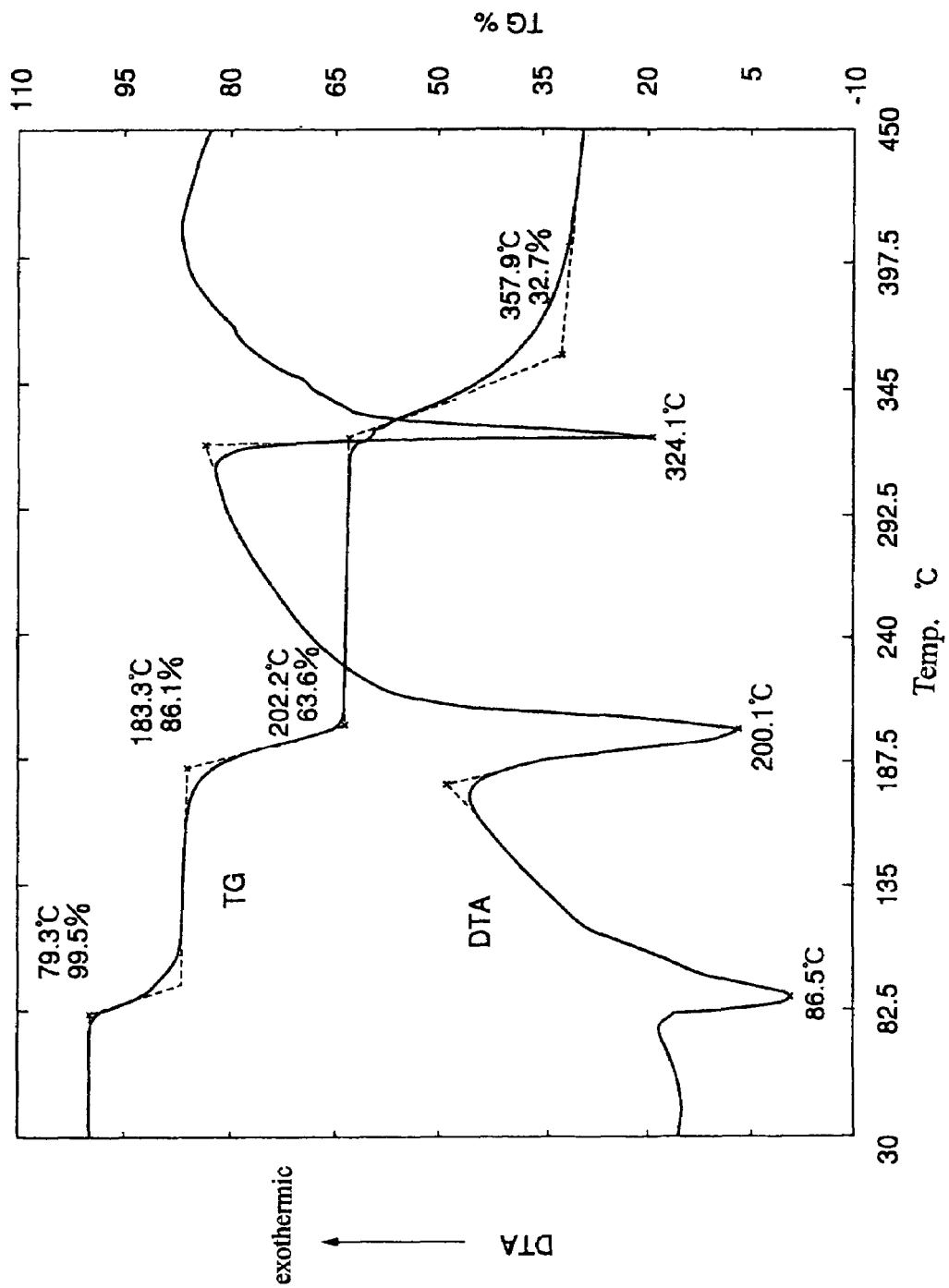
FIG. 6 shows a thermal analysis chart (TG/DTA) of a clathrate (Sample No. 22) described in Table 1.
Figure 7:
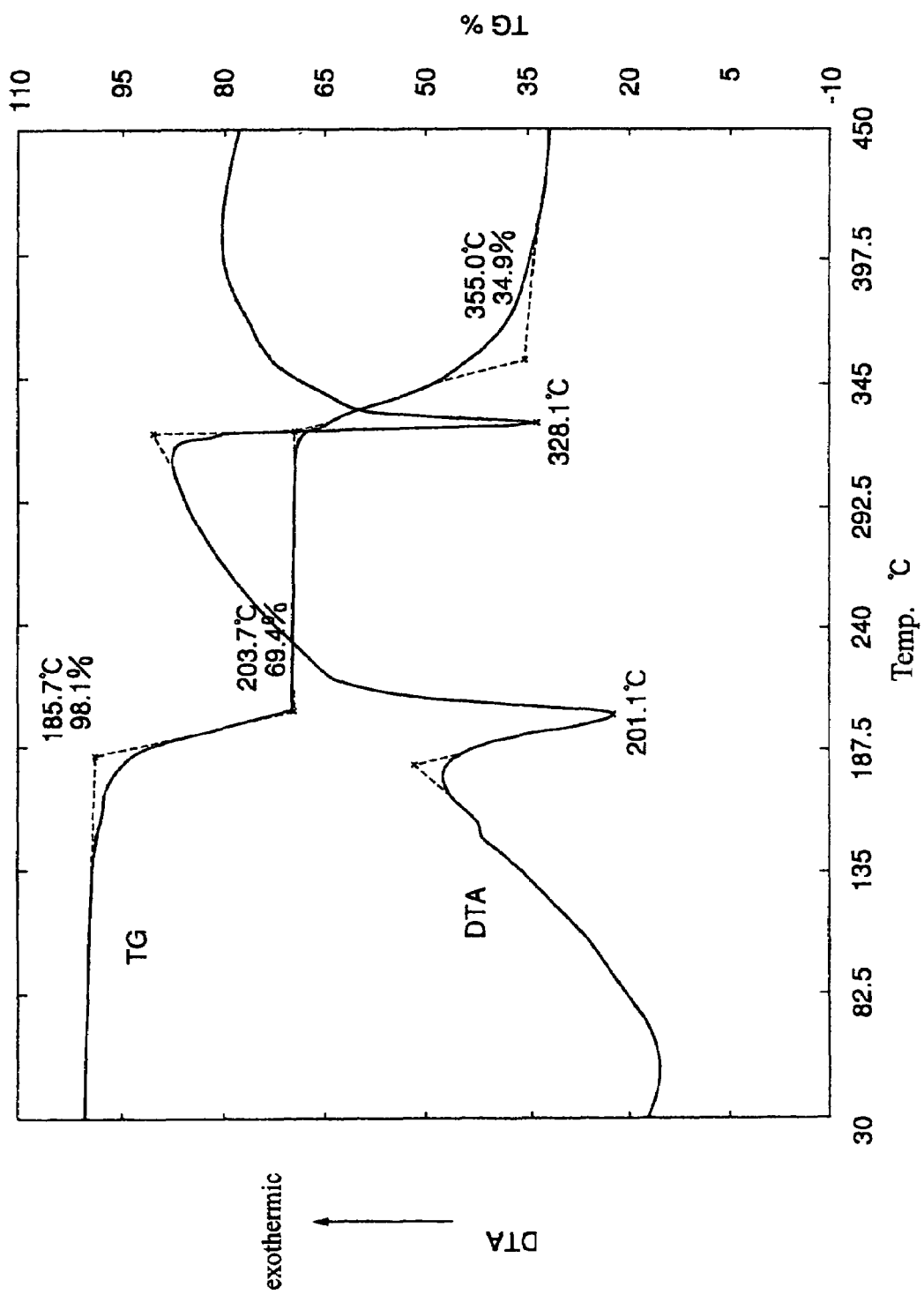
FIG. 7 shows a thermal analysis chart (TG/DTA) of a clathrate (Sample No. 23) described in Table 1.
Figure 8:
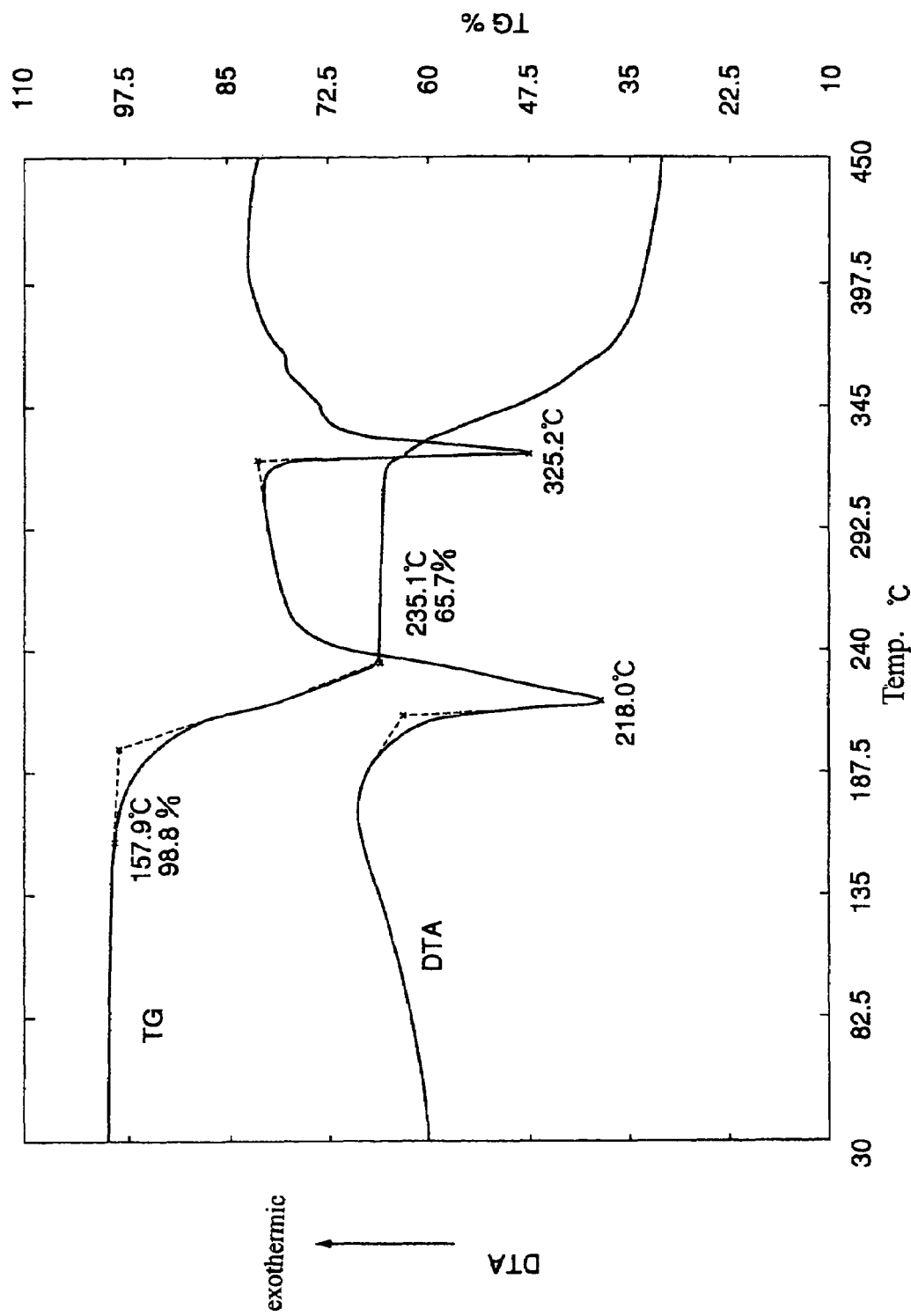
FIG. 8 shows a thermal analysis chart (TG/DTA) of a clathrate (Sample No. 24) described in Table 1.
Figure 9:
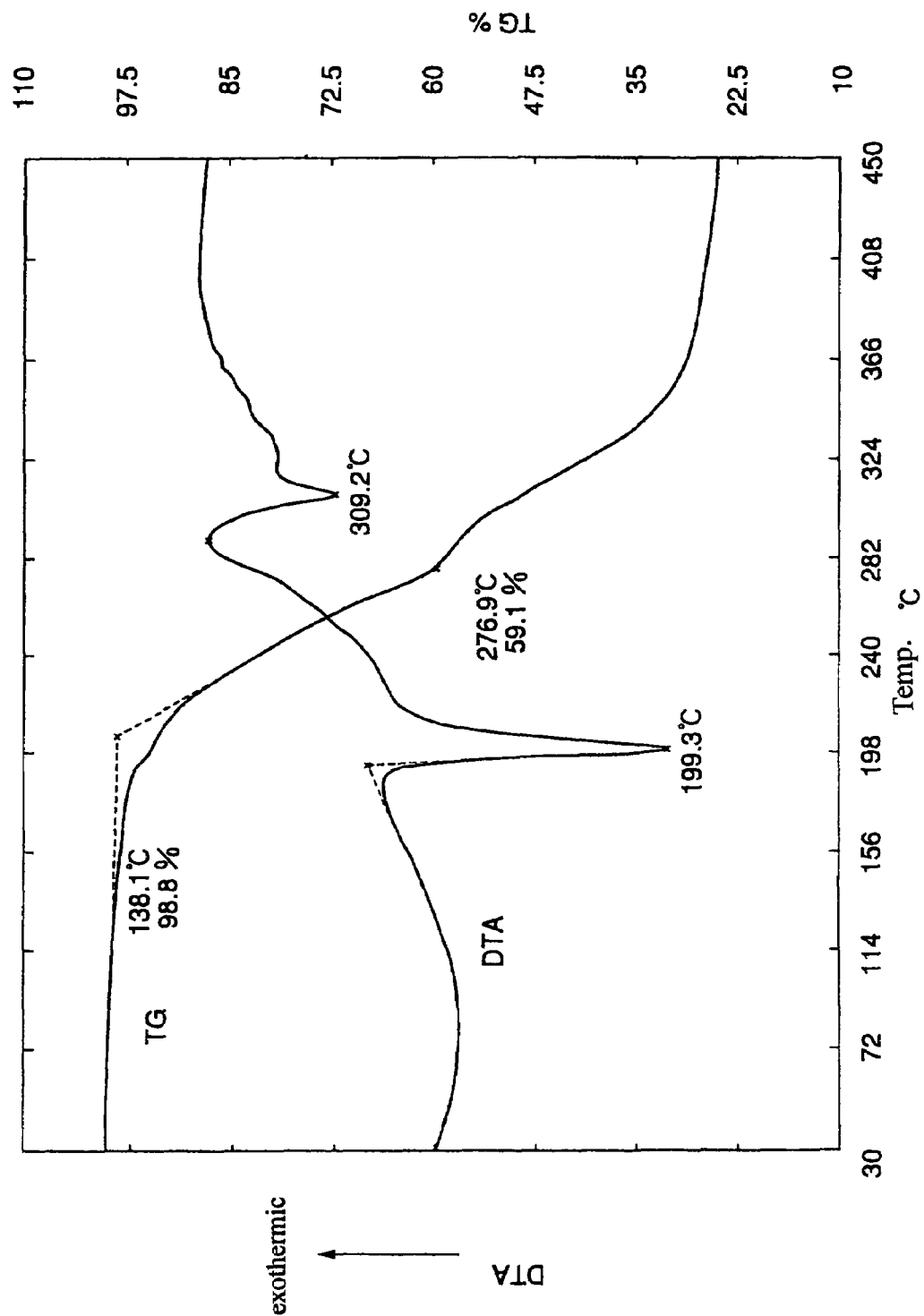
FIG. 9 shows a thermal analysis chart (TG/DTA) of a clathrate (Sample No. 27) described in Table 2.
Figure 10:
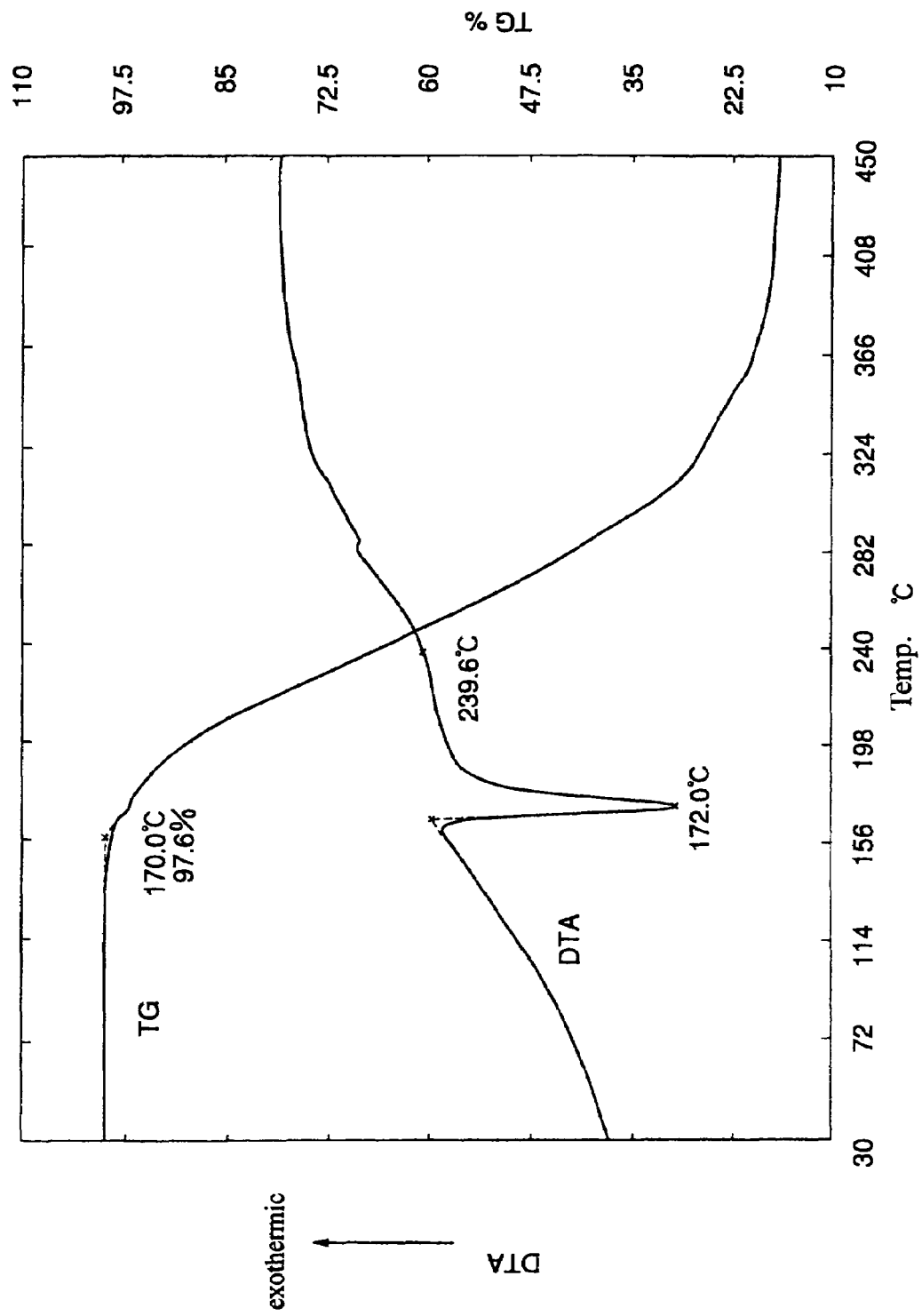
FIG. 10 shows a thermal analysis chart (TG/DTA) of a clathrate (Sample No. 28) described in Table 2.
Figure 11:
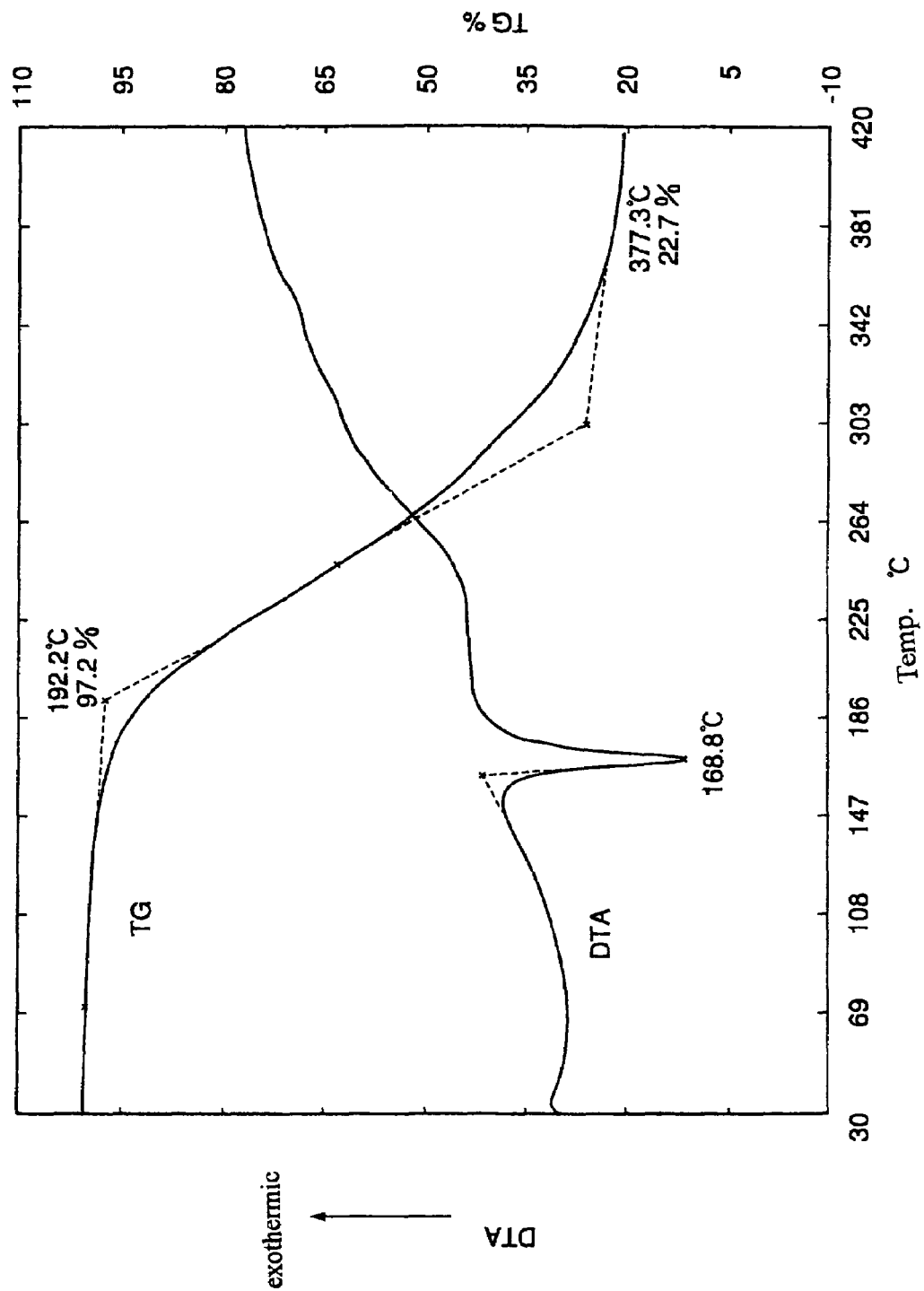
FIG. 11 shows a thermal analysis chart (TG/DTA) of a clathrate (Sample No. 29) described in Table 2.
Figure 12:
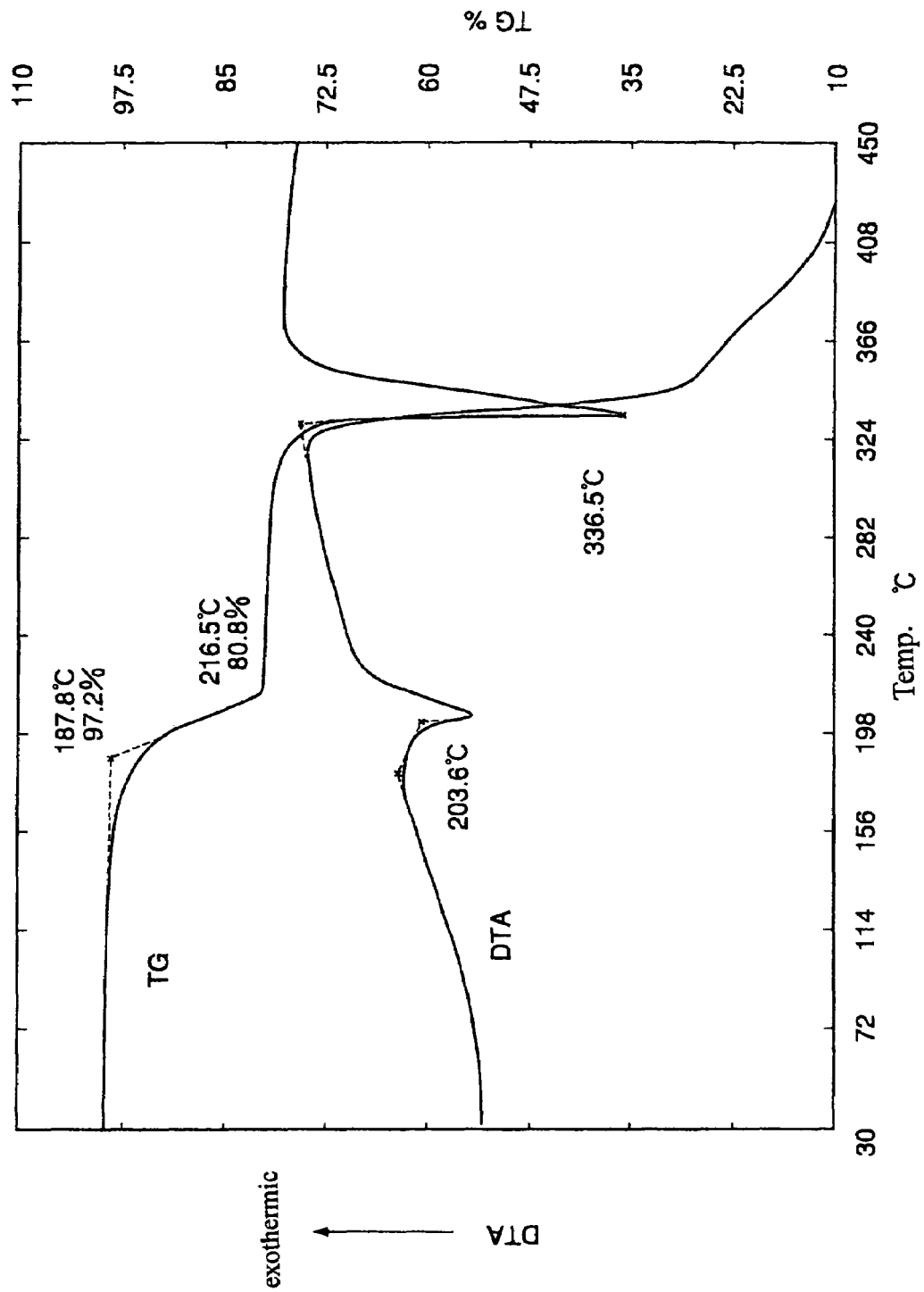
FIG. 12 shows a thermal analysis chart (TG/DTA) of a clathrate (Sample No. 30) described in Table 2.
Figure 13:
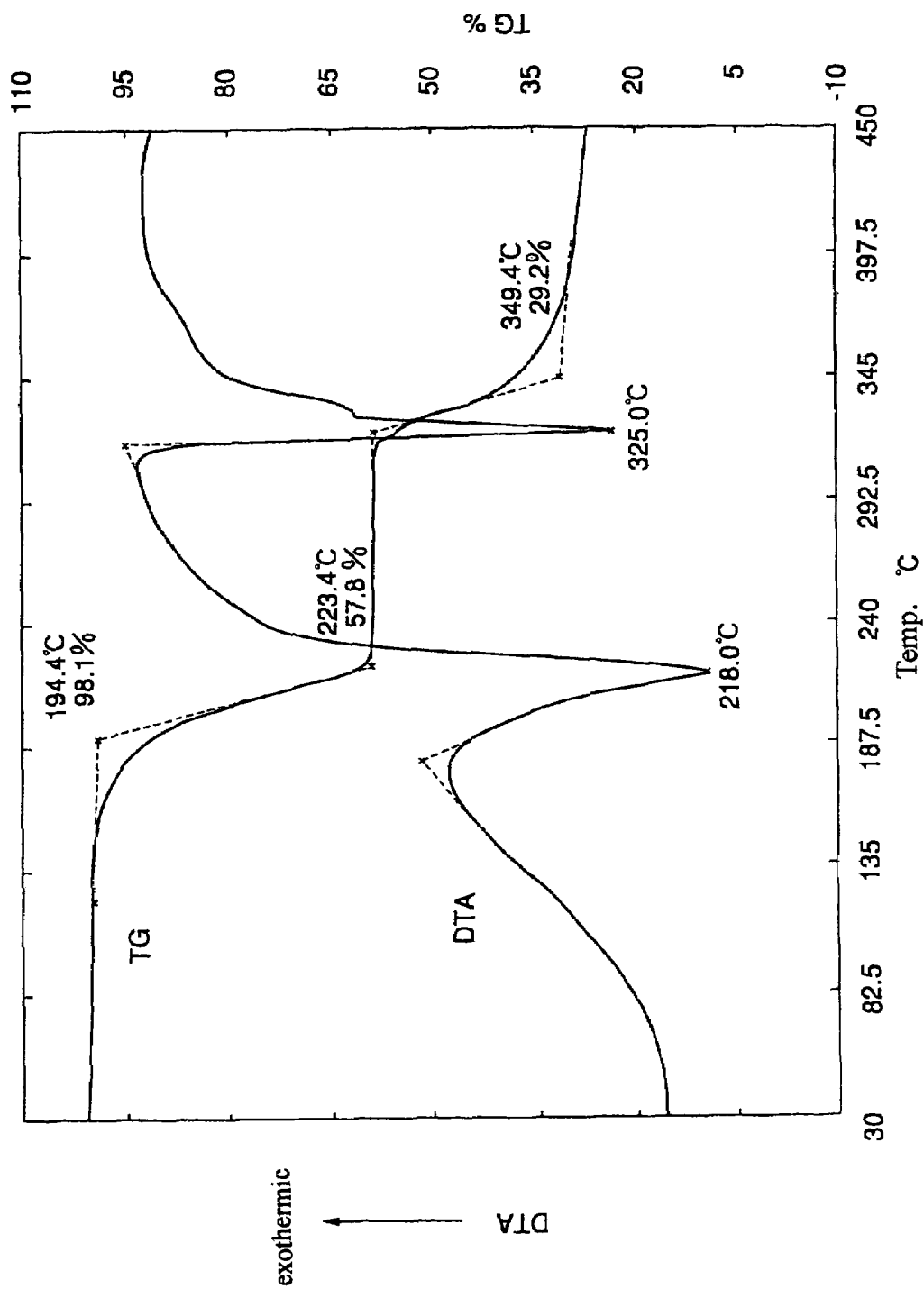
FIG. 13 shows a thermal analysis chart (TG/DTA) of a clathrate (Sample No. 31) described in Table 2.
Figure 14:
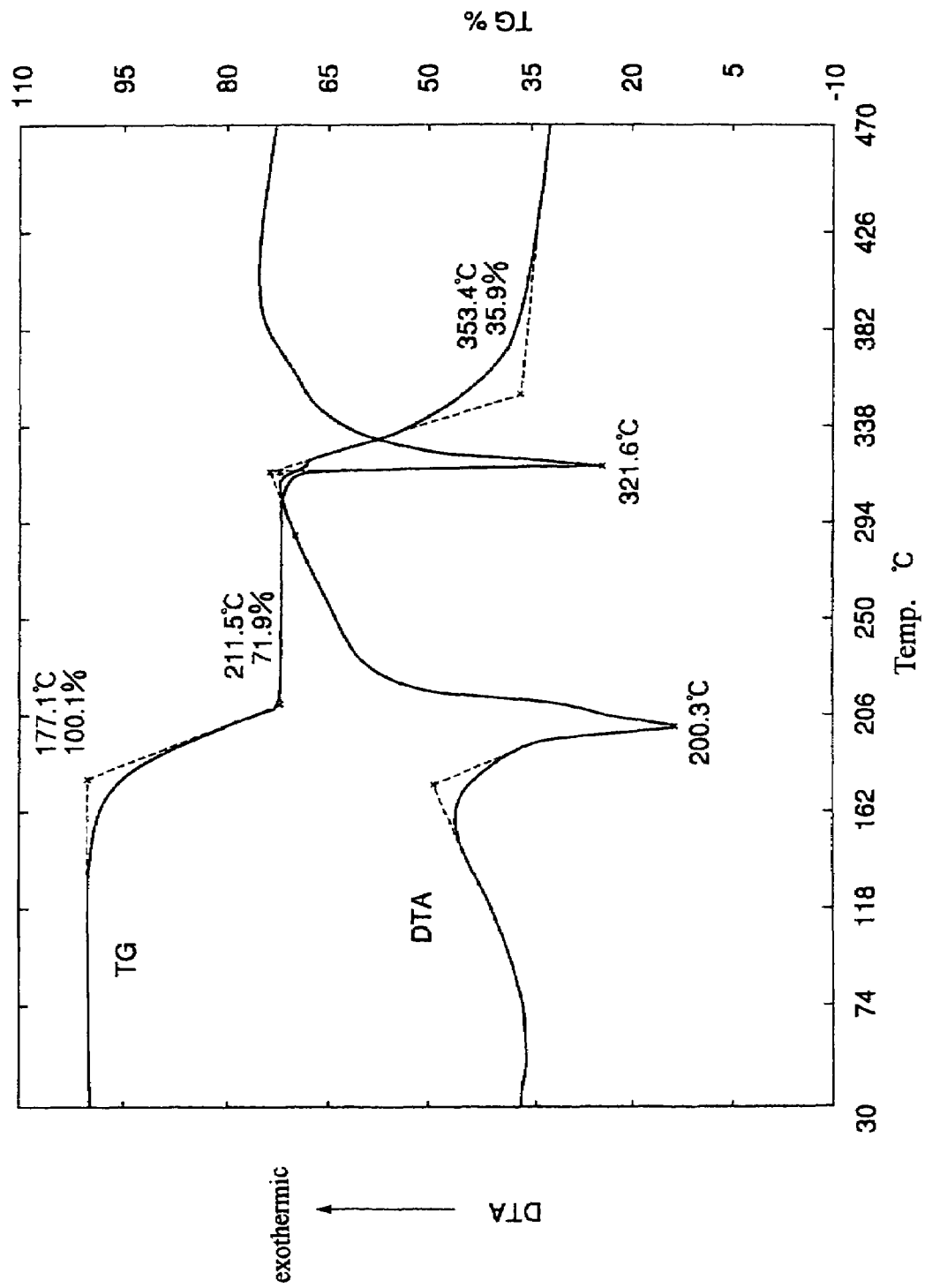
FIG. 14 shows a thermal analysis chart (TG/DTA) of a clathrate (Sample No. 32) described in Table 2.
Figure 15:
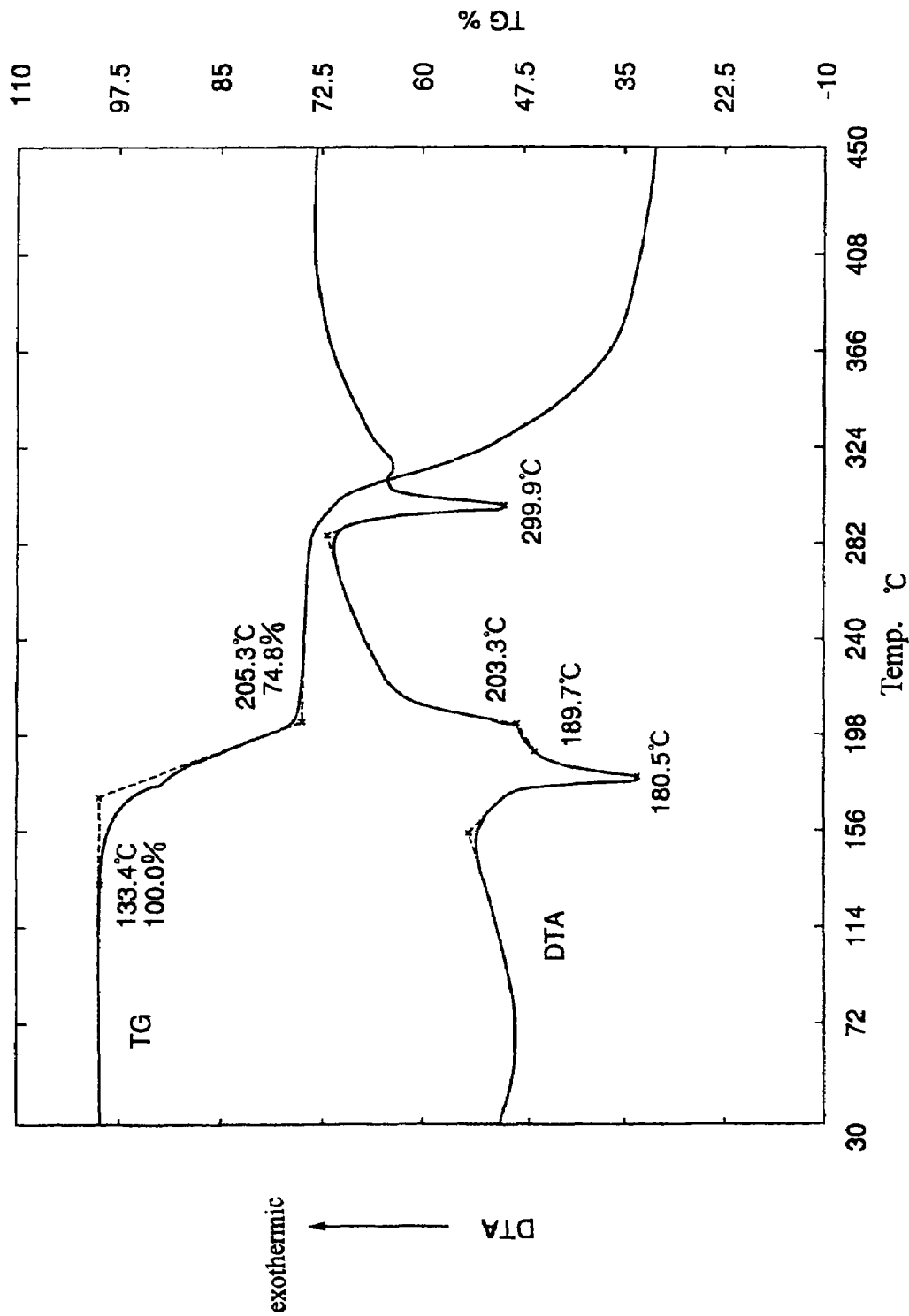
FIG. 15 shows a thermal analysis chart (TG/DTA) of a clathrate (Sample No. 33) described in Table 2.
Figure 16:
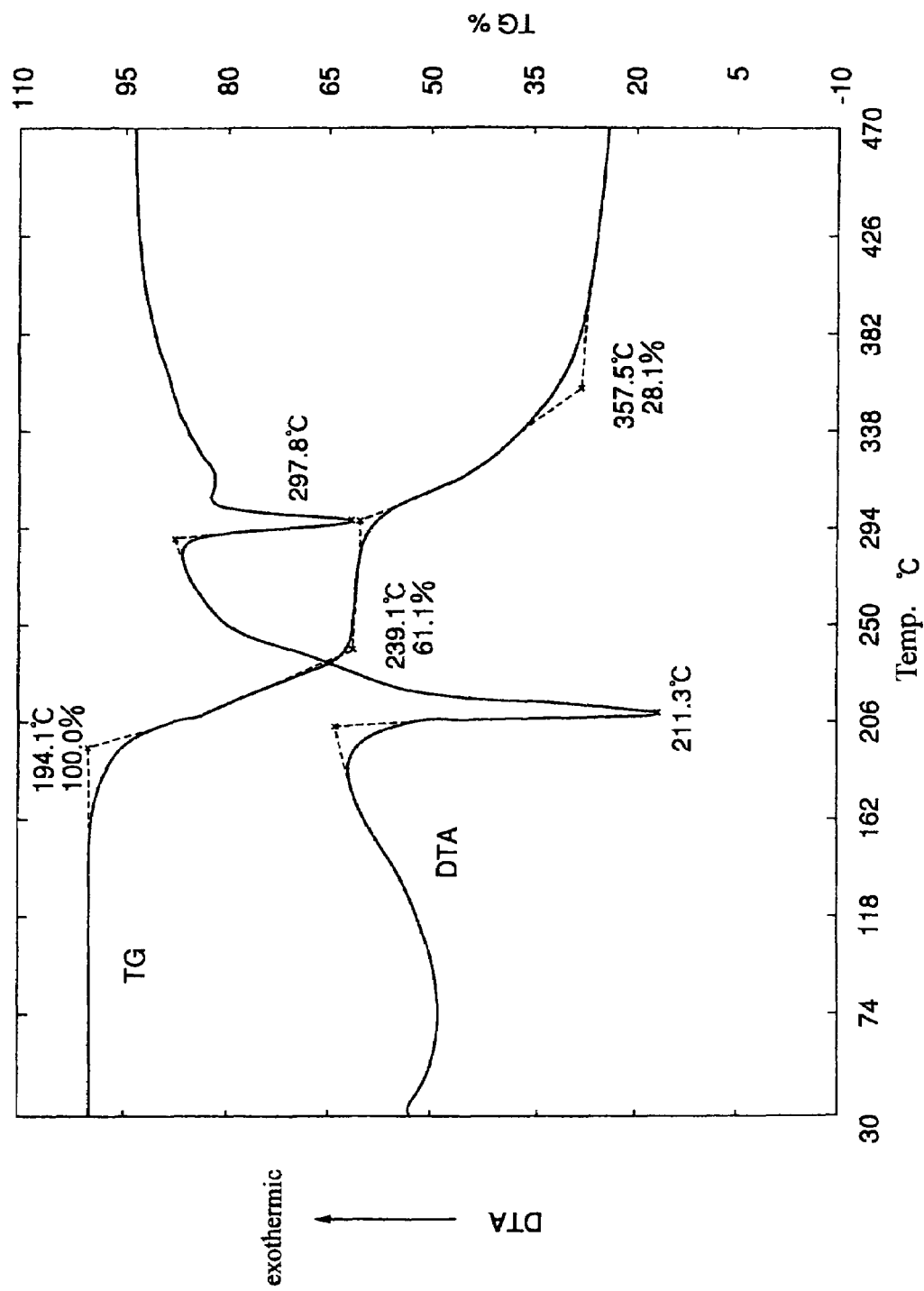
FIG. 16 shows a thermal analysis chart (TG/DTA) of a clathrate (Sample No. 38) described in Table 2.
Figure 17:
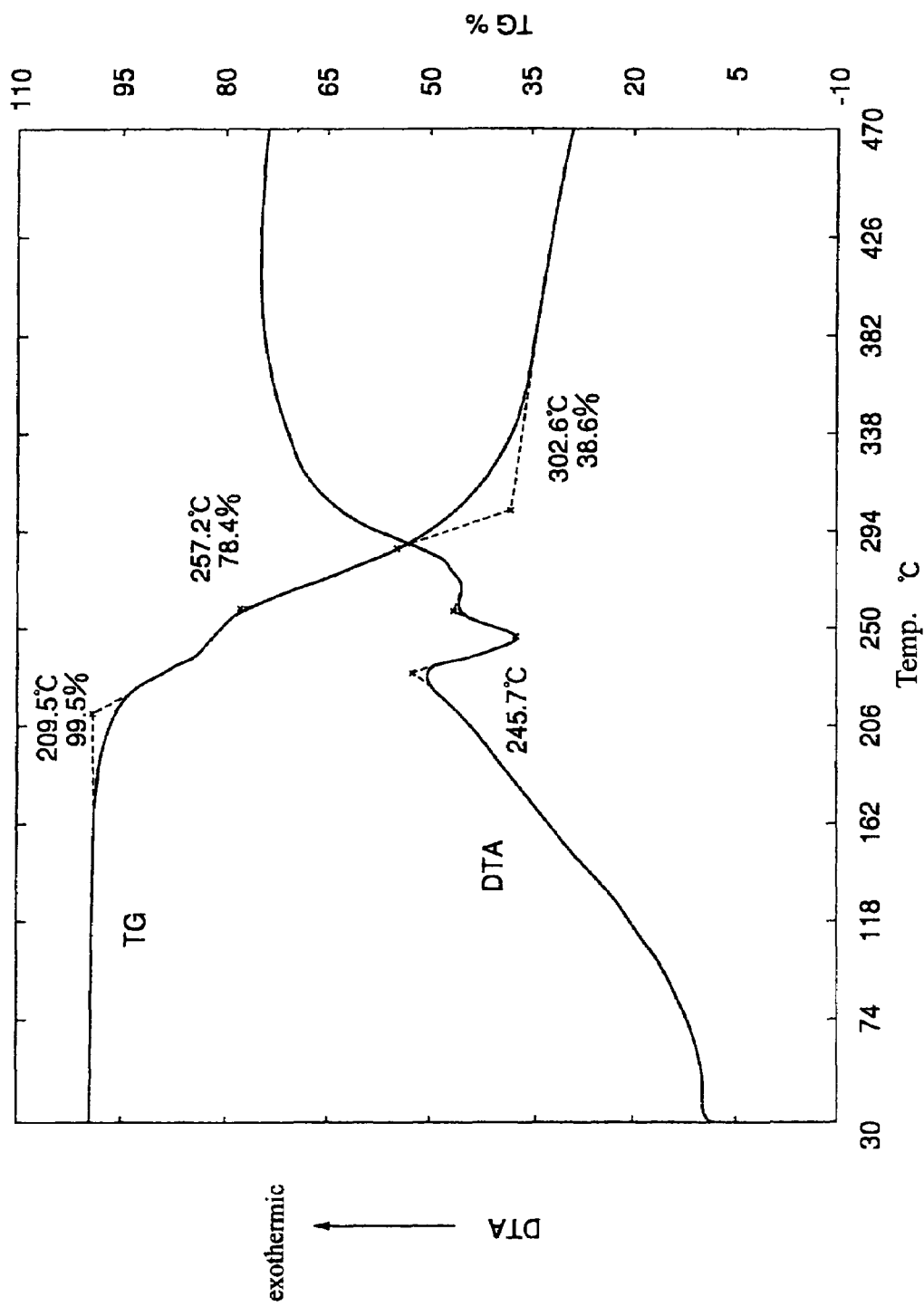
FIG. 17 shows a thermal analysis chart (TG/DTA) of a clathrate (Sample No. 43) described in Table 2.
Figure 18:
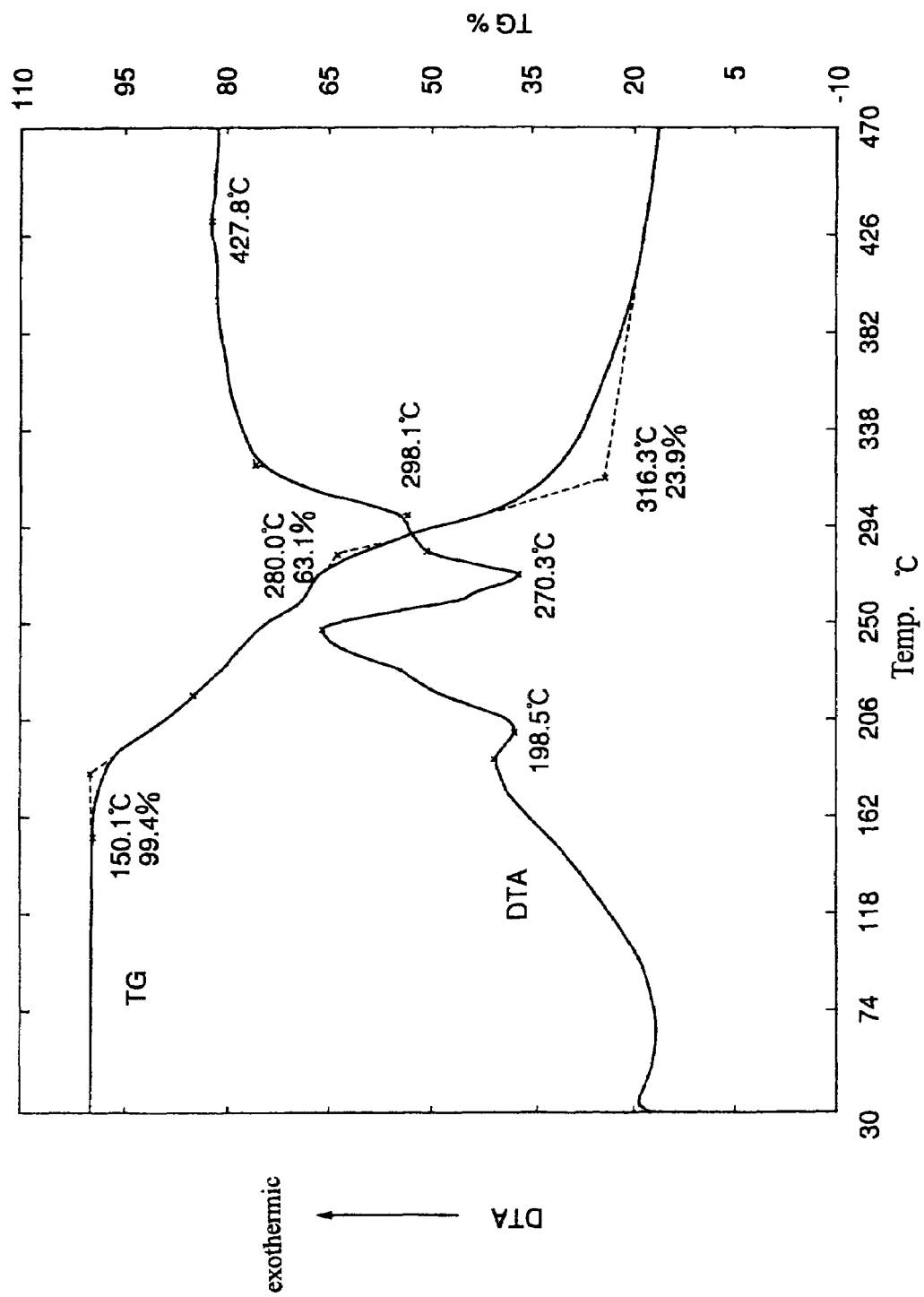
FIG. 18 shows a thermal analysis chart (TG/DTA) of a clathrate (Sample No. 46) described in Table 2.
Figure 19:
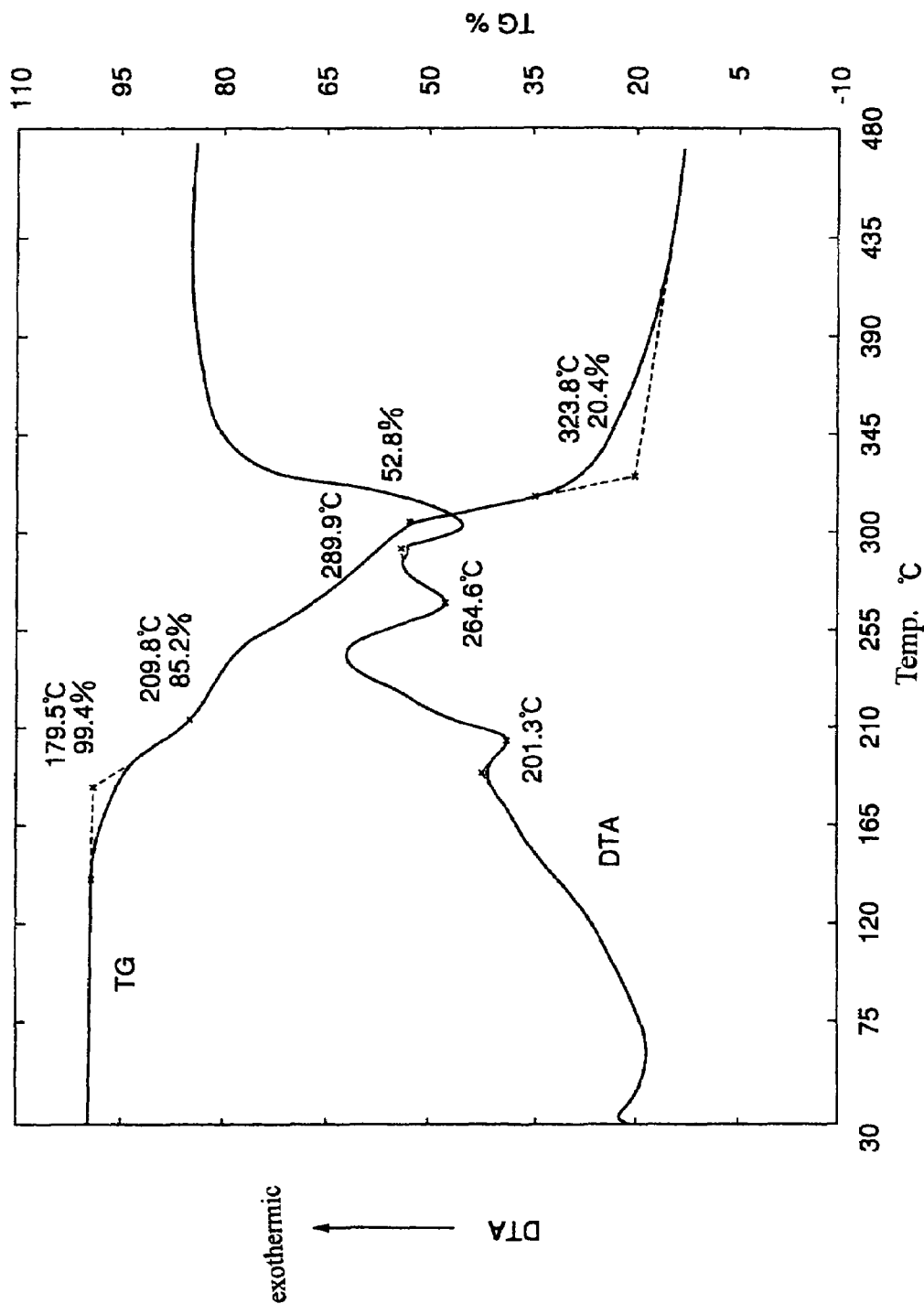
FIG. 19 shows a thermal analysis chart (TG/DTA) of a clathrate (Sample No. 47) described in Table 2.
Figure 20:
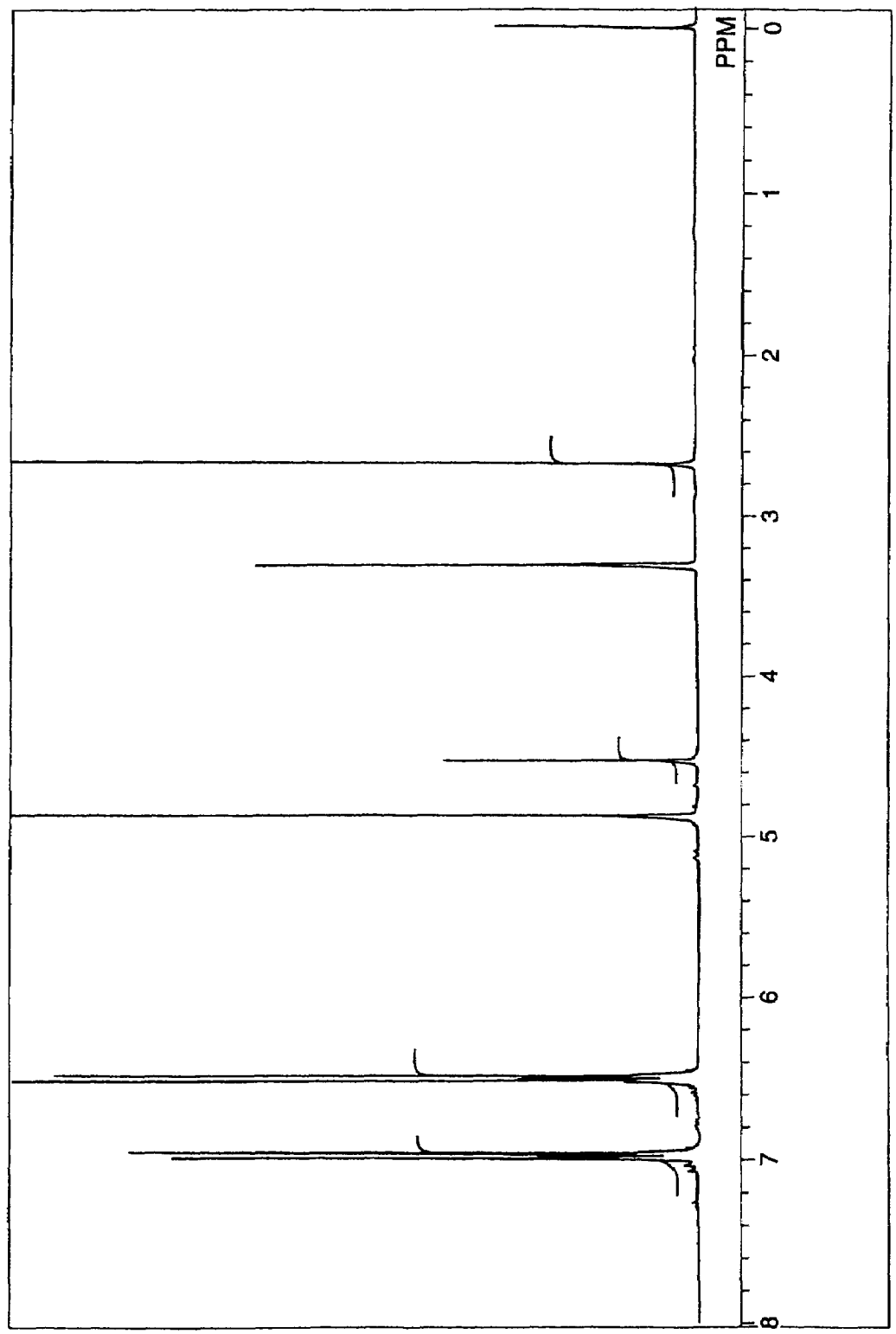
FIG. 20 shows a $^1HNMR$ spectrum chart of a clathrate (Sample No. 10) described in Table 1.
Figure 21:
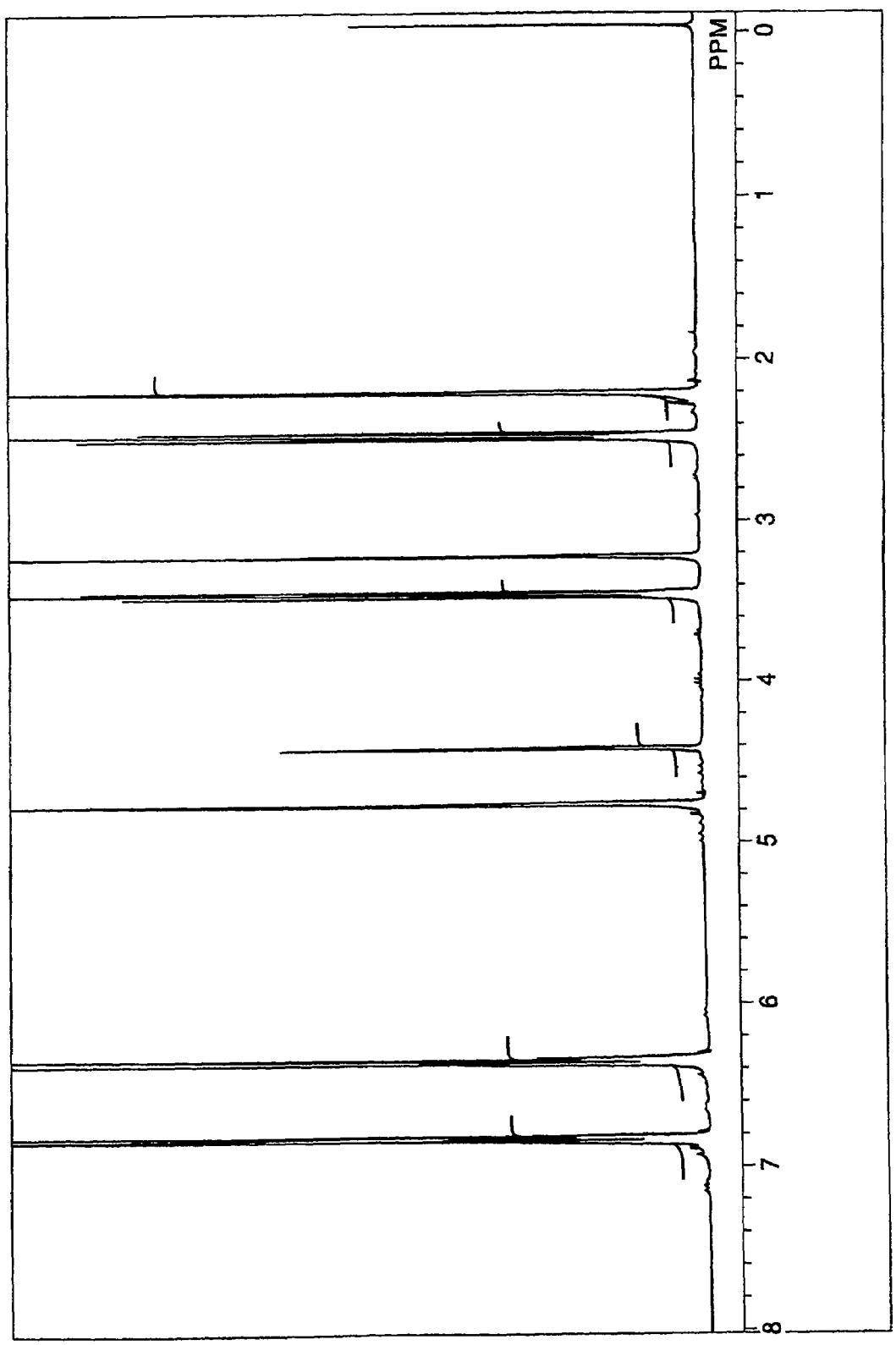
FIG. 21 shows a $^1HNMR$ spectrum chart of a clathrate (Sample No. 21) described in Table 1.
Figure 22:
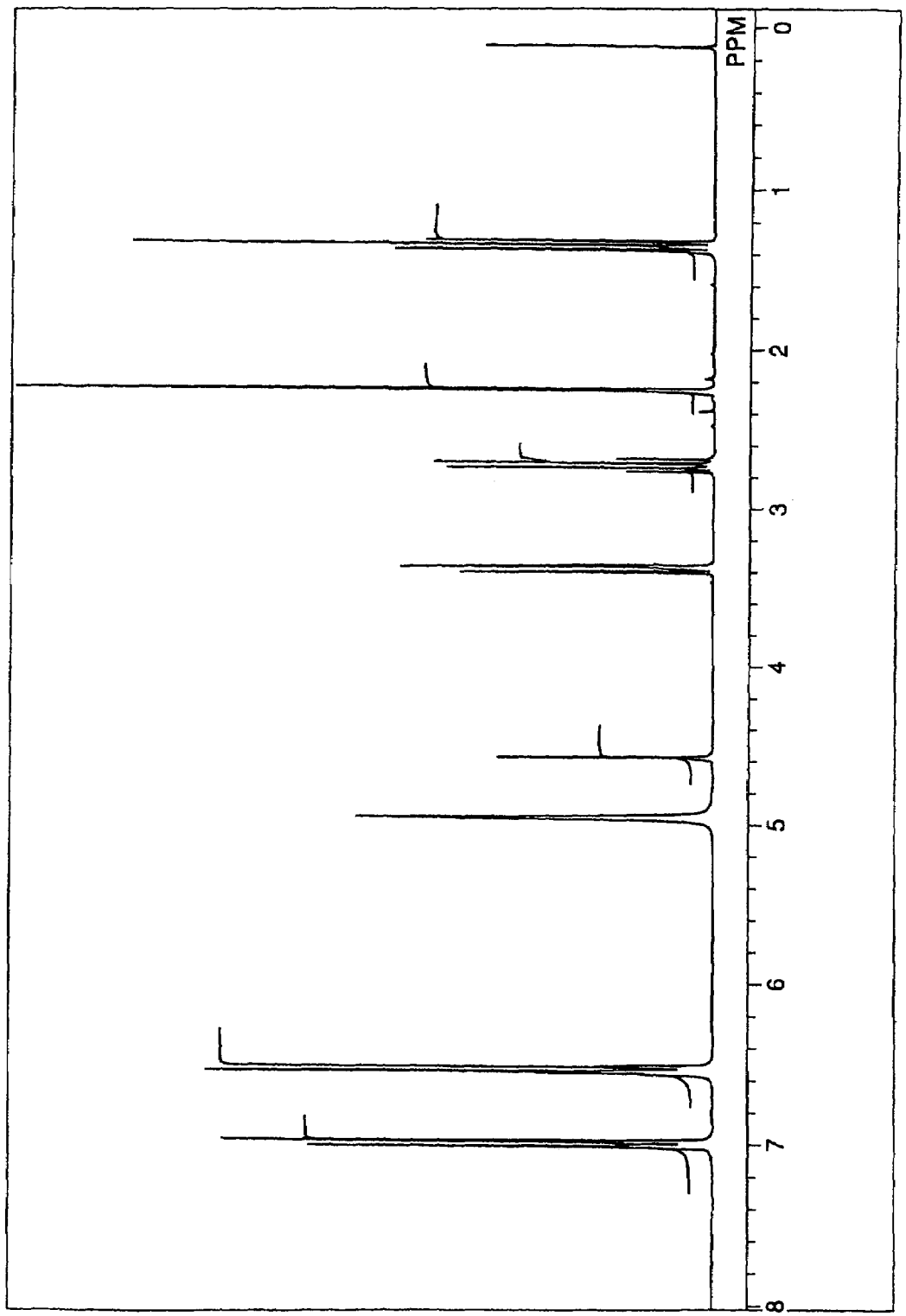
FIG. 22 shows a $^1HNMR$ spectrum chart of a clathrate (Sample No. 24) described in Table 1.
Figure 23:
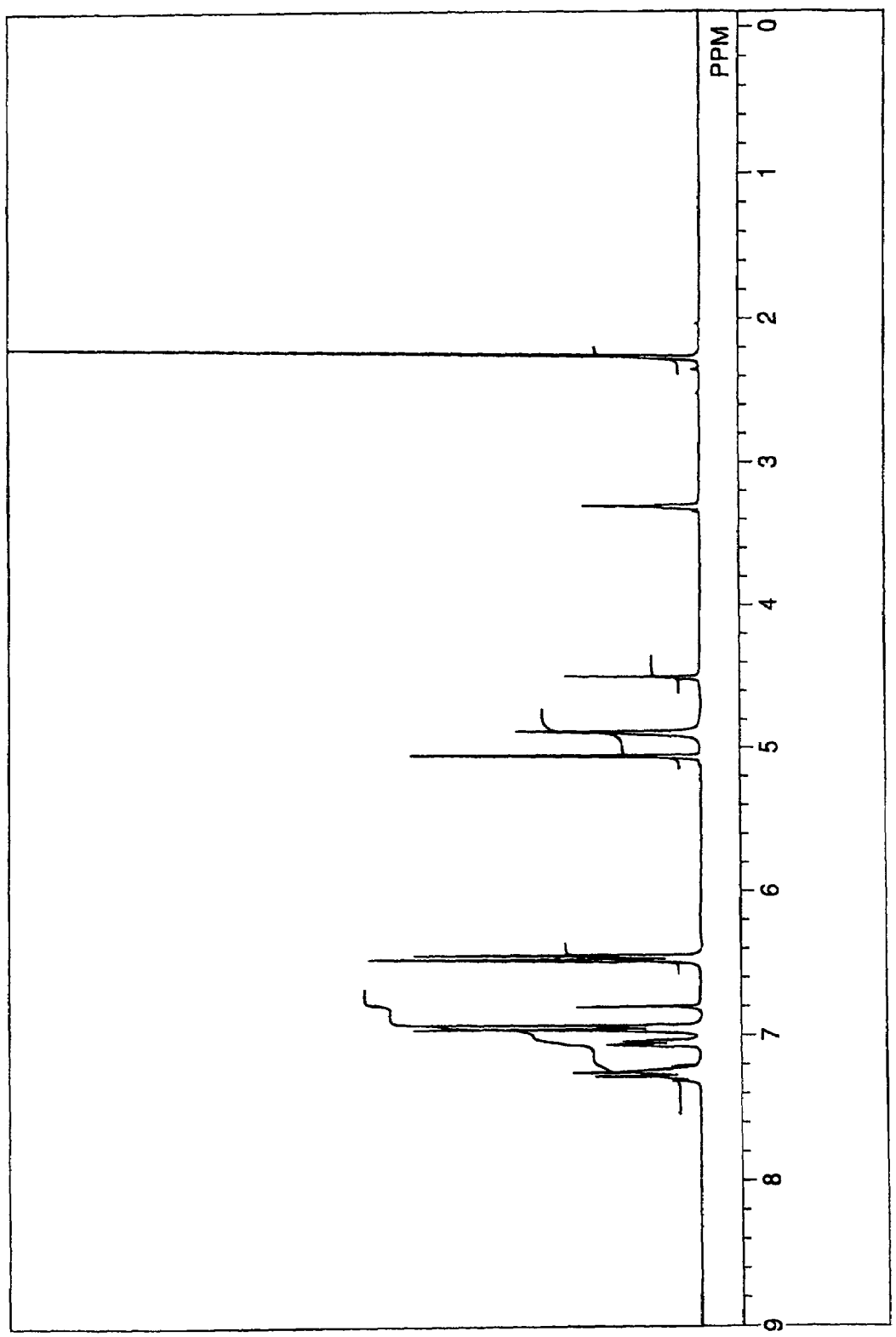
FIG. 23 shows a $^1HNMR$ spectrum chart of a clathrate (Sample No. 27) described in Table 2.
Figure 24:
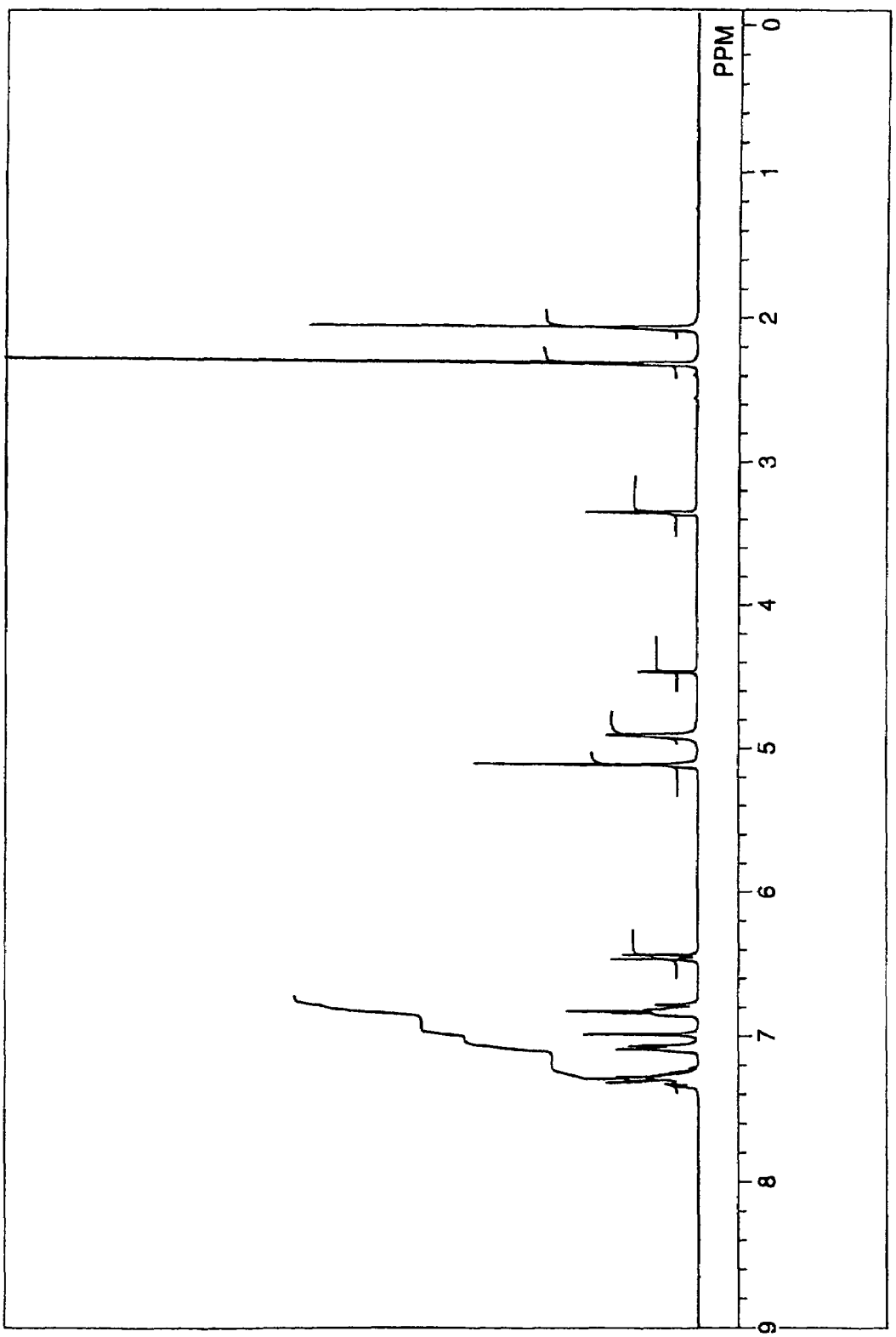
FIG. 24 shows a $^1HNMR$ spectrum chart of a clathrate (Sample No. 28) described in Table 2.
Figure 25:
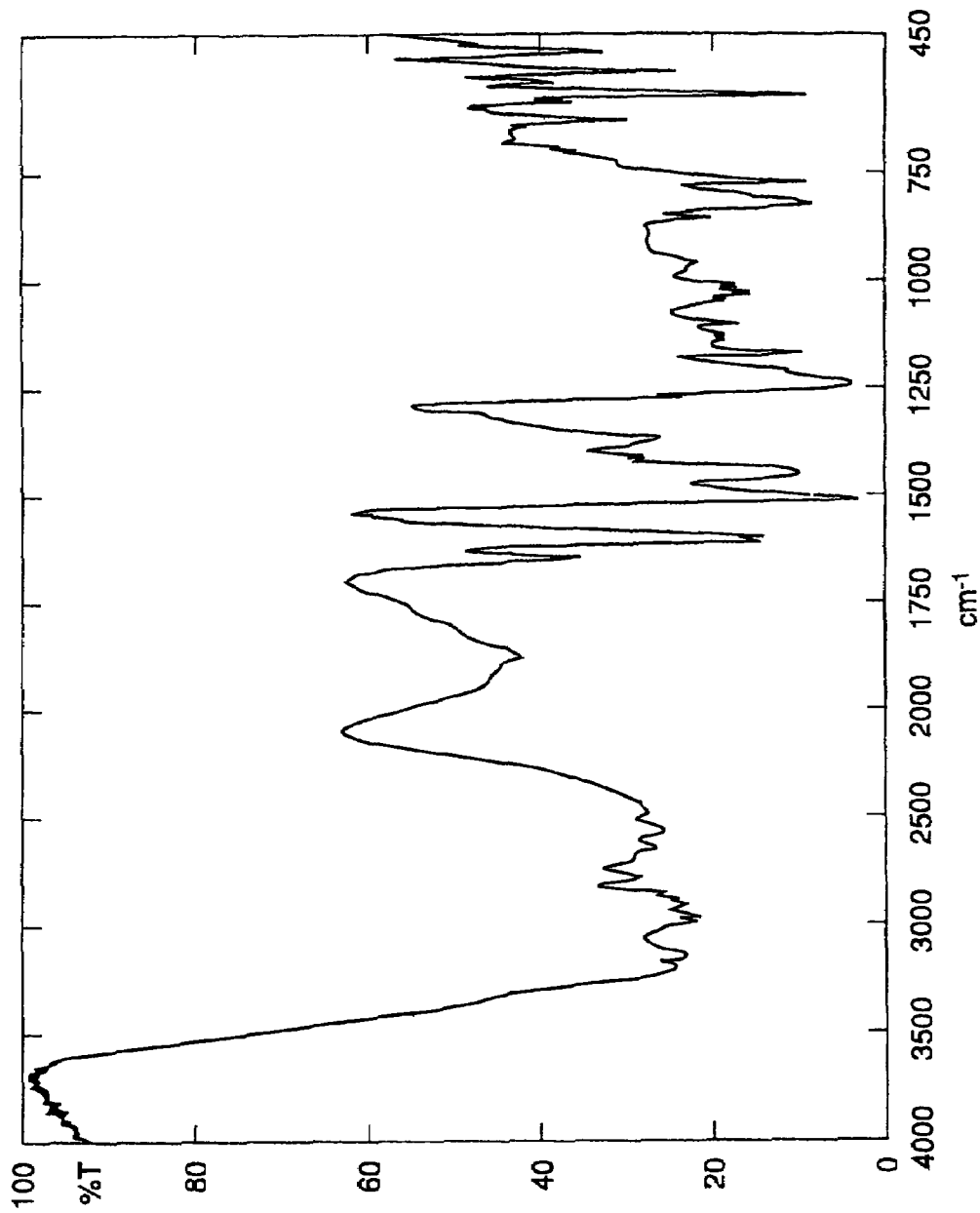
FIG. 25 shows an IR spectrum chart of a clathrate (Sample No. 24) described in Table 1.
Figure 26:
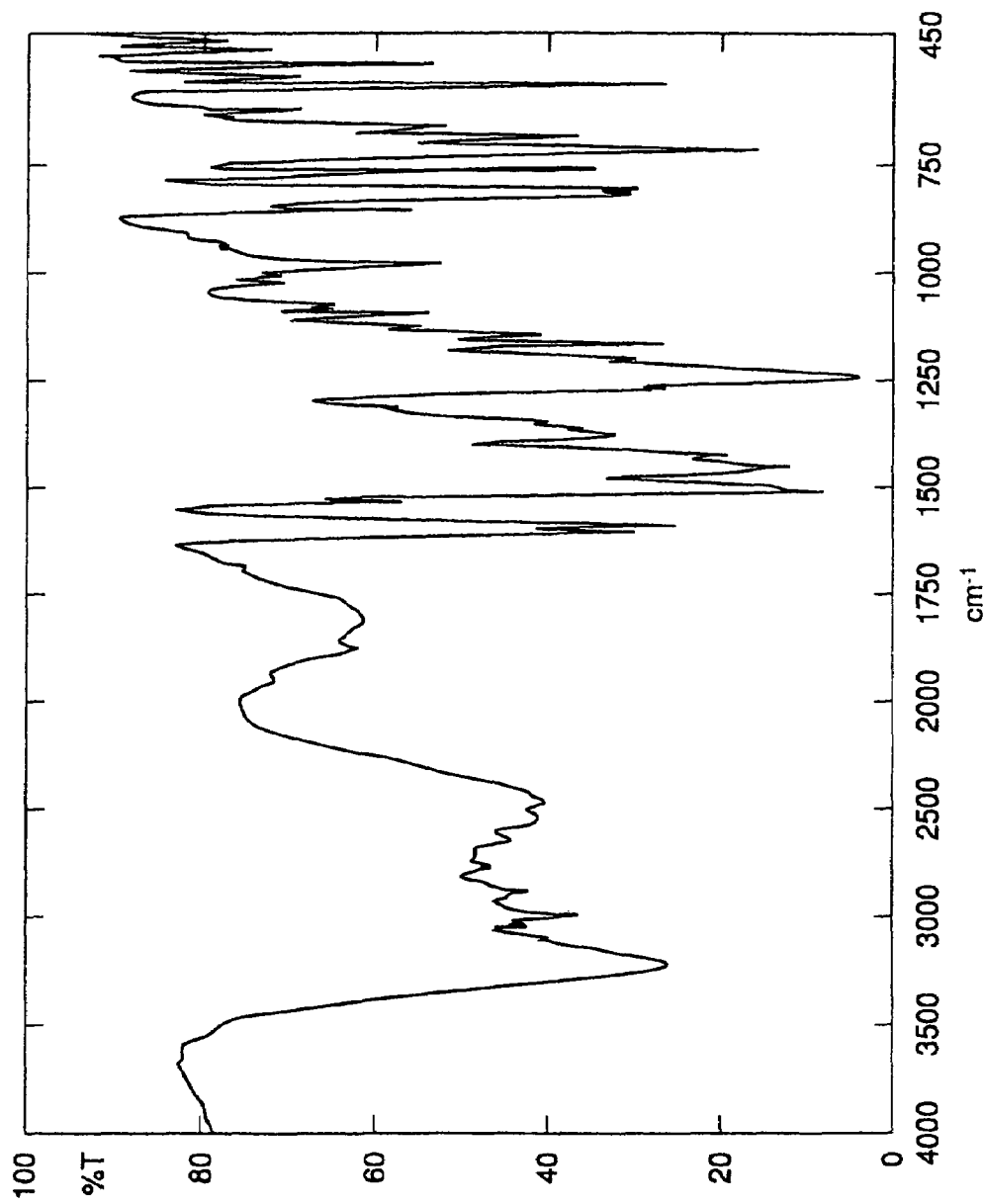
FIG. 26 shows an IR spectrum chart of a clathrate (Sample No. 27) described in Table 2.
Figure 27:
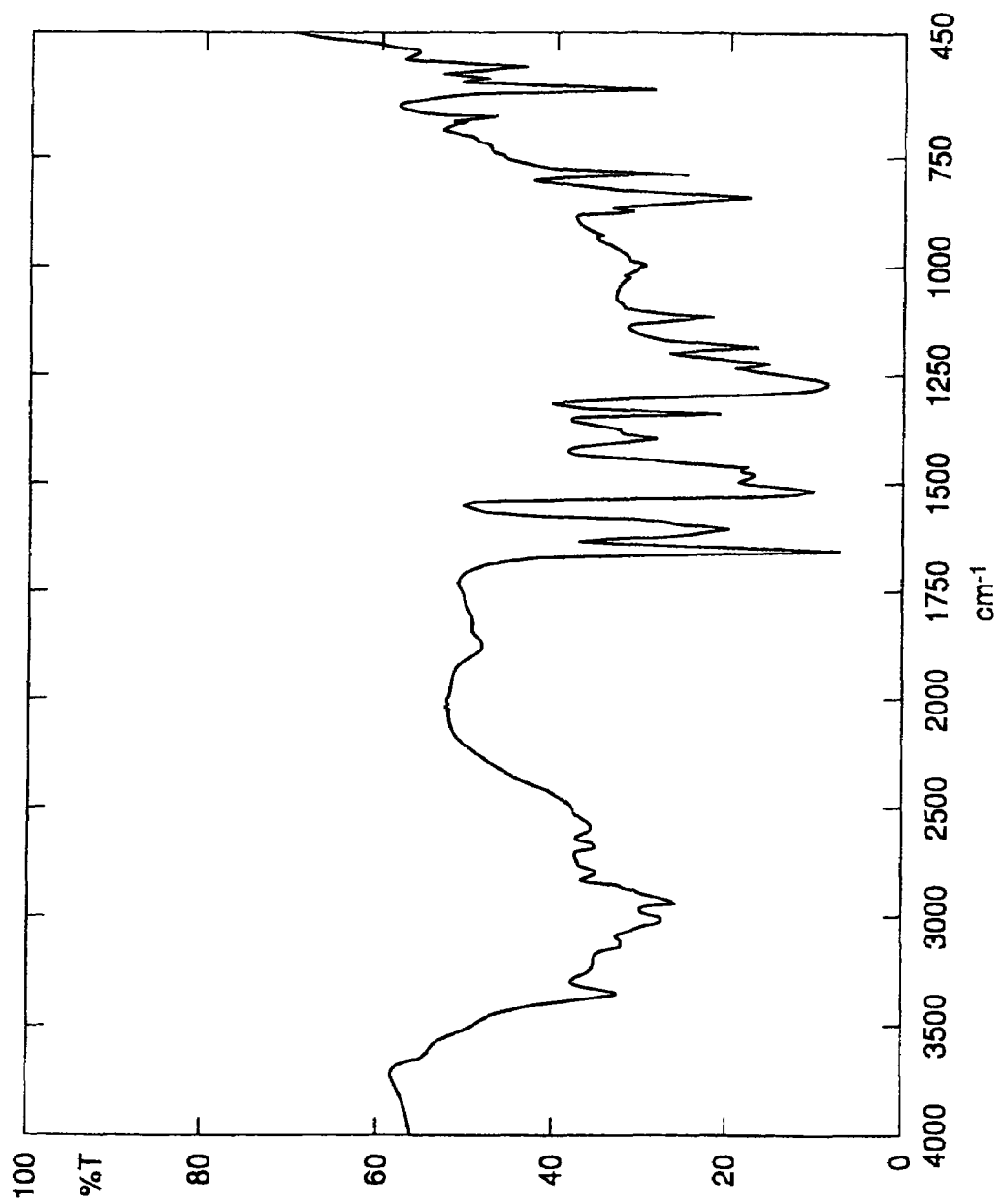
FIG. 27 shows an IR spectrum chart of a clathrate (Sample No. 39) described in Table 2.
Figure 28:
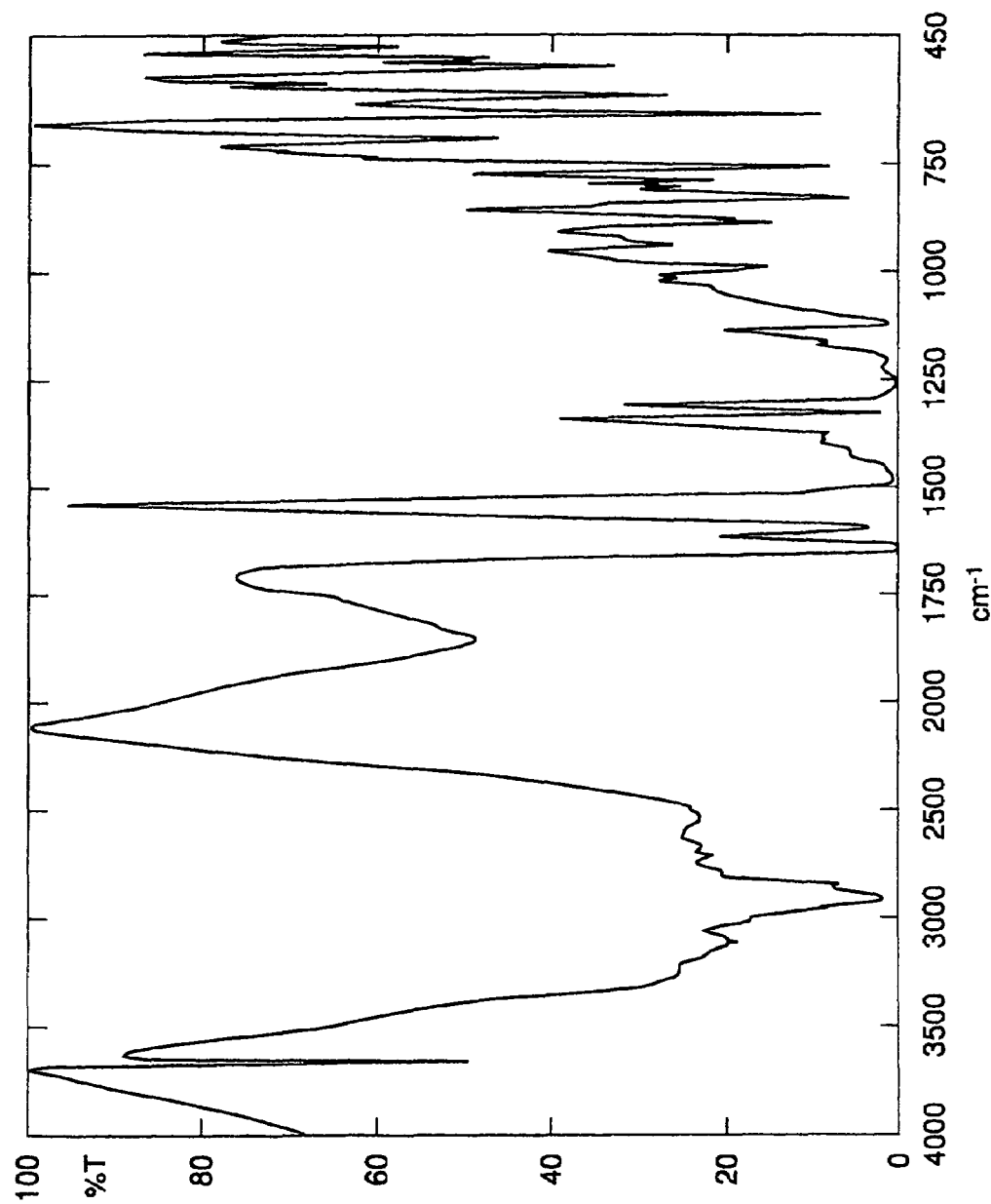
FIG. 28 shows an IR spectrum chart of a clathrate (Sample No. 42) described in Table 2.
Figure 29:
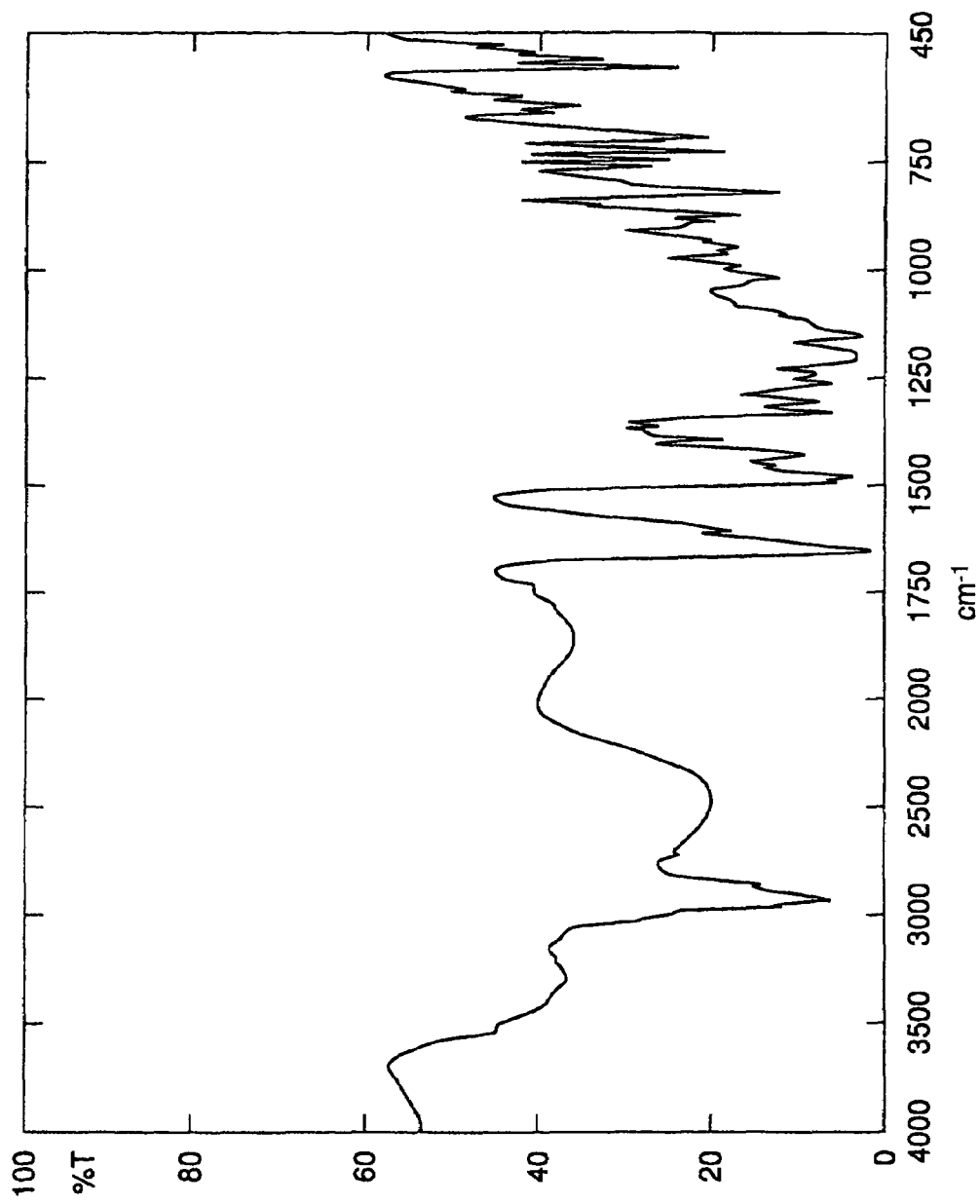
FIG. 29 shows an IR spectrum chart of a clathrate (Sample No. 45) described in Table 2.

Now, the present invention is further described in detail with referring the examples as shown below, however, it should be noted that the present invention shall not be limited to the scope being described in the examples below.

EXAMPLE 1

Manufacturing of Clathrates

Clathrates were prepared by using various curatives, curing accelerators and tetrakisphenol-containing host compounds according to either the method (1) or the method (2) as described below. (1) When a curative or a curing accelerator is in liquid sate under a room temperature, 10 parts by weight of either the curative or the curing accelerator was added with 1 part of a host compound and was subsequently stirred for 1 to 120 min. under a temperature of from 25 to 100° C., and the mixture was then allowed to stand for 1-48 hours to precipitate the crystals. After taking out the crystals by filtration, the crystals were dried under reduced pressure at a temperature of from a room temperature to 80° C. to obtain the clathrate according to the present invention. Whereas, when a curative or a curing accelerator is in solid state, it was mixed with a host compound at a specific mole ratio, and the mixture was then kneaded in a mortar for one hour to obtain the clathrate according to the present invention. The method to prepare the clathrates as described above by directly mixing either a curative or a curing accelerator and a host compound is hereinafter simplified by using a term "Neat". (2) Either a curative or a curing accelerator was dissolved in a solvent selected from methanol, ethyl acetate and dichloromethane, and a host compound in an amount of from 0.1 to an equivalent mole ratio relative to the amount of either the curative or the curing accelerator was added into the resultant solution and then dissolved or suspended in the mixture while heating at a temperature ranging from a room temperature to the reflux temperature of a solvent used. Then, the mixture was stirred for 1-120 min. and was allowed to stand for 1-48 hours at room temperature to precipitate the crystals. After taking out the crystals by means of filtration, the crystals were dried under reduced pressure to obtain the clathrate according to the present invention. The results during the preparation of the clathrates were presented in Tables 1 and 2. All samples of the clathrates obtained according to the processes described in the examples were determined as the objective clathrates by means of measuring IR spectrums, NMR spectrums, and thermal analysis (TG.DTA and/or DSC) and powder X-ray diffraction pattern analysis. The abbreviations in Tables 1 and 2 represent respectively any of a curative, a curing accelerator or a host compound as described in the following.

Curatives and Curing Accelerators:
DEA: Diethylamine
TEA: Triethylamine
PRI: Piperidine
PRA: Piperazine
PY: Pyridine
EDA: Ethylenediamine
TMDA: Trimethylenediamine
TEMDA: Tetramethylenediamine
HMDA: Hexamethylenediamine
DETA: Diethylenetriamine
TEDA: Triethylenediamine
o-PDA: Ortho-phenylenediamine
m-PDA: Meta-phenylenediamine
p-PDA: Para-phenylenediamine
BMAEE: Bis(2-dimethylaminoethyl)ether
DMAH: N,N-dimethylaminohexanol
TMHM: N,N,N',N'-tetramethylhexamethylenediamine
2E4MZ: 2-Ethyl-4-methylimidazole
1B2MZ: 1-Benzyl-2-methylimidazole
1I2MZ: 1-Isopropyl-2-methylimidazole
2MZ: 2-Methylimidazole
2PZ: 2-Phenylimidazole
2PZL: 2-Phenylimidazoline
DBU: 1,8-Diazabicyclo(5,4,0)undecene Host Compounds:
TEP: 1,1,2,2-Tetrakis(4-hydroxyphenyl)ethane
TEOC: 1,1,2,2-Tetrakis(3-methyl-4-hydroxyphenyl)ethane
TDOC: 1,1,2,2-Tetrakis(3,5-dimethyl-4-hydroxyphenyl)ethane
TCOC: 1,1,2,2-Tetrakis(3-chloro-4-hydroxyphenyl)ethane

TABLE 1

| Sample No. | Curative/Curing Accelerator (G) | Host Compound (H) | Solvent for Preparing Clathrate | Clathrate Composition H:G:Solvent (Mole ratio) | Curative-Releasing Temperature of Clathrate (° C.) |
|---|---|---|---|---|---|
| 1 | DEA | TEP | Neat | 1:2:0 | 119 |
| 2 | DEA | TEOC | Neat | 1:2:0 | 90 |
| 3 | TEA | TEP | Neat | 1:1:0 | 116 |
| 4 | TEA | TEOC | Neat | 1:2:0 | 108 |
| 5 | PRI | TEP | Neat | 1:2:0 | 174 |
| 6 | PRA | TEP | Neat | 1:2:0 | 162 |
| 7 | PY | TEP | Neat | 1:4:0 | 112 |
| 8 | PY | TEOC | Neat | 1:5:0 | 55 |
| 9 | PY | TCOC | Neat | 1:3:0 | 73 |
| 10 | EDA | TEP | Methanol | 1:1:0 | 202 |
| 11 | EDA | TEOC | Methanol | 1:1:0 | 182 |
| 12 | EDA | TDOC | Methanol | 1:1:0 | 161 |
| 13 | TMDA | TEP | Neat | 1:1.5:0 | 190 |
| 14 | TEMDA | TEP | Neat | 1:2:0 | 202 |
| 15 | HMDA | TEP | Neat | 1:1:0 | 160 |
| 16 | DETA | TEP | Neat | 1:2:0 | 133 |
| 17 | o-PDA | TEP | Ethyl acetate | 1:5:0 | 147 |
| 18 | m-PDA | TEP | Methanol | 1:2:0 | 75 |
| 19 | p-PDA | TEP | Methanol | 1:3:0 | 176 |
| 20 | p-PDA | TEP | Ethyl acetate | 1:2:0 | 172 |
| 21 | BMAEE | TEP | Ethyl acetate | 1:2:0 | 141 |
| 22 | DMAH | TEP | Ethyl acetate | 1:1:1 | 183 |
| 23 | TMHM | TEP | Methanol | 1:1:0 | 186 |
| 24 | 2E4MZ | TEP | Methanol | 1:2:0 | 187 |

TABLE 2

| Sample No. | Curative/Curing Accelerator (G) | Host Compound (H) | Solvent for Preparing Clathrate | Clathrate Composition H:G:Solvent (Mole ratio) | Curative-Releasing Temperature of Clathrate (° C.) |
|---|---|---|---|---|---|
| 25 | 2E4MZ | TEP | Ethyl acetate | 1:1.5:0 | 191 |
| 26 | 1B2MZ | TEP | Neat | 1:6:0 | 143 |
| 27 | 1B2MZ | TEP | Methanol | 1:2:0 | 200 |
| 28 | 1B2MZ | TEOC | Methanol | 1:4:0 | 168 |
| 29 | 1B2MZ | TEOC | Neat | 1:4:0 | 162 |
| 30 | 1B2MZ | TDOC | Methanol | 1:0.5:0 | 173 |
| 31 | 1I2MZ | TEP | Methanol | 1:2:0 | 183 |
| 32 | 2MZ | TEP | Ethyl acetate | 1:2:1 | 175 |
| 33 | 2MZ | TEOC | Dichloromethane | 1:2:1 | 147 |
| 34 | 2PZ | TEP | Methanol | 1:1.5:0.5 | 227 |
| 35 | 2PZL | TEP | Methanol | 1:2:2 | 216 |
| 36 | 2PZL | TEP | Ethyl acetate | 1:2:0 | 207 |
| 37 | 2PZL | TEOC | Methanol | 1:2:2 | 201 |
| 38 | 2PZL | TEOC | Ethyl acetate | 1:2:0 | 178 |
| 39 | DBU | TEP | Methanol | 1:1.5:0 | >240 |
| 40 | DBU | TEP | Ethyl acetate | 1:2:0 | 183 |
| 41 | DBU | TEP | Dichloromethane | 1:1.5:0 | >240 |
| 42 | DBU | TEOC | Methanol | 1:2:0 | >240 |
| 43 | DBU | TEOC | Ethyl acetate | 1:2:0 | 210 |
| 44 | DBU | TEOC | Dichloromethane | 1:2:0 | >240 |
| 45 | DBU | TDOC | Methanol | 1:2:0 | 147 |
| 46 | DBU | TDOC | Ethyl acetate | 1:2:1 | 179 |
| 47 | DBU | TDOC | Dichloromethane | 1:2:0 | 180 |

Figure 30:
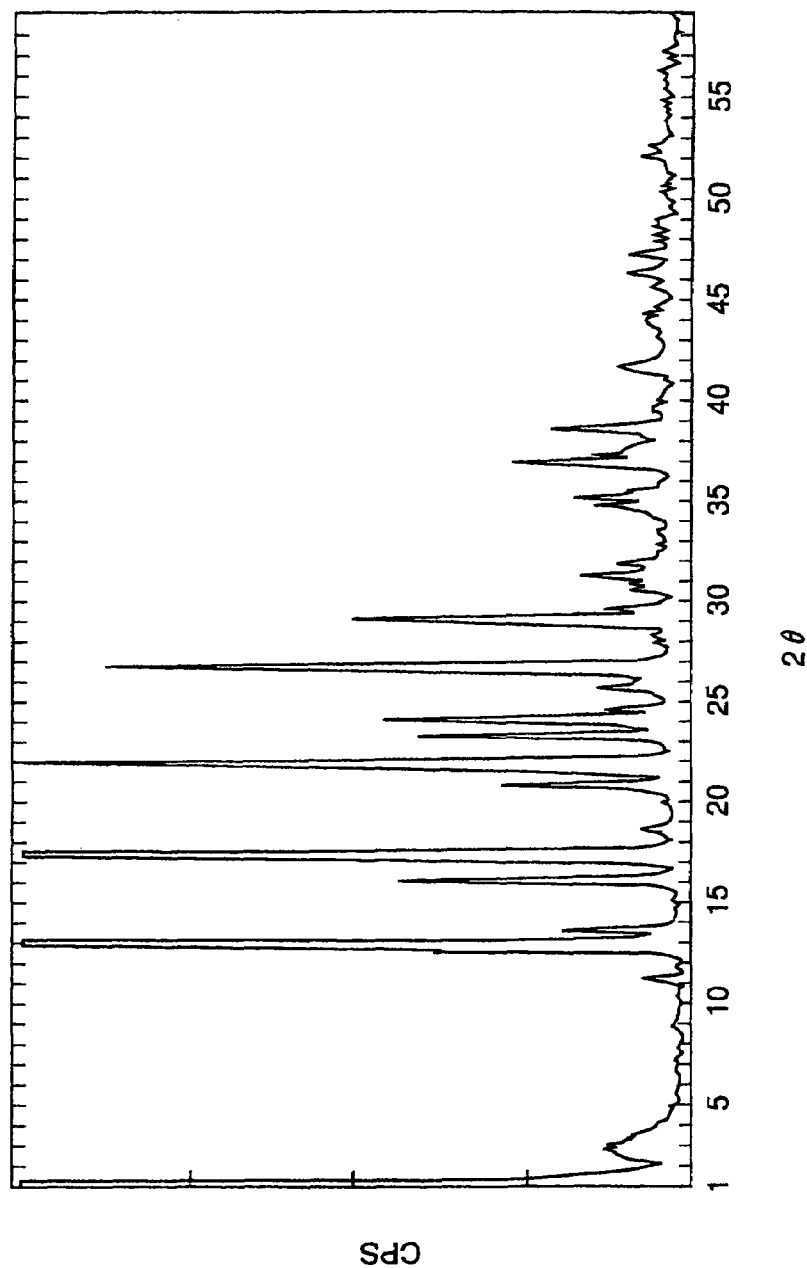
FIG. 30 shows a X-ray diffraction pattern of a clathrate (Sample No. 10) described in Table 1.
Figure 31:
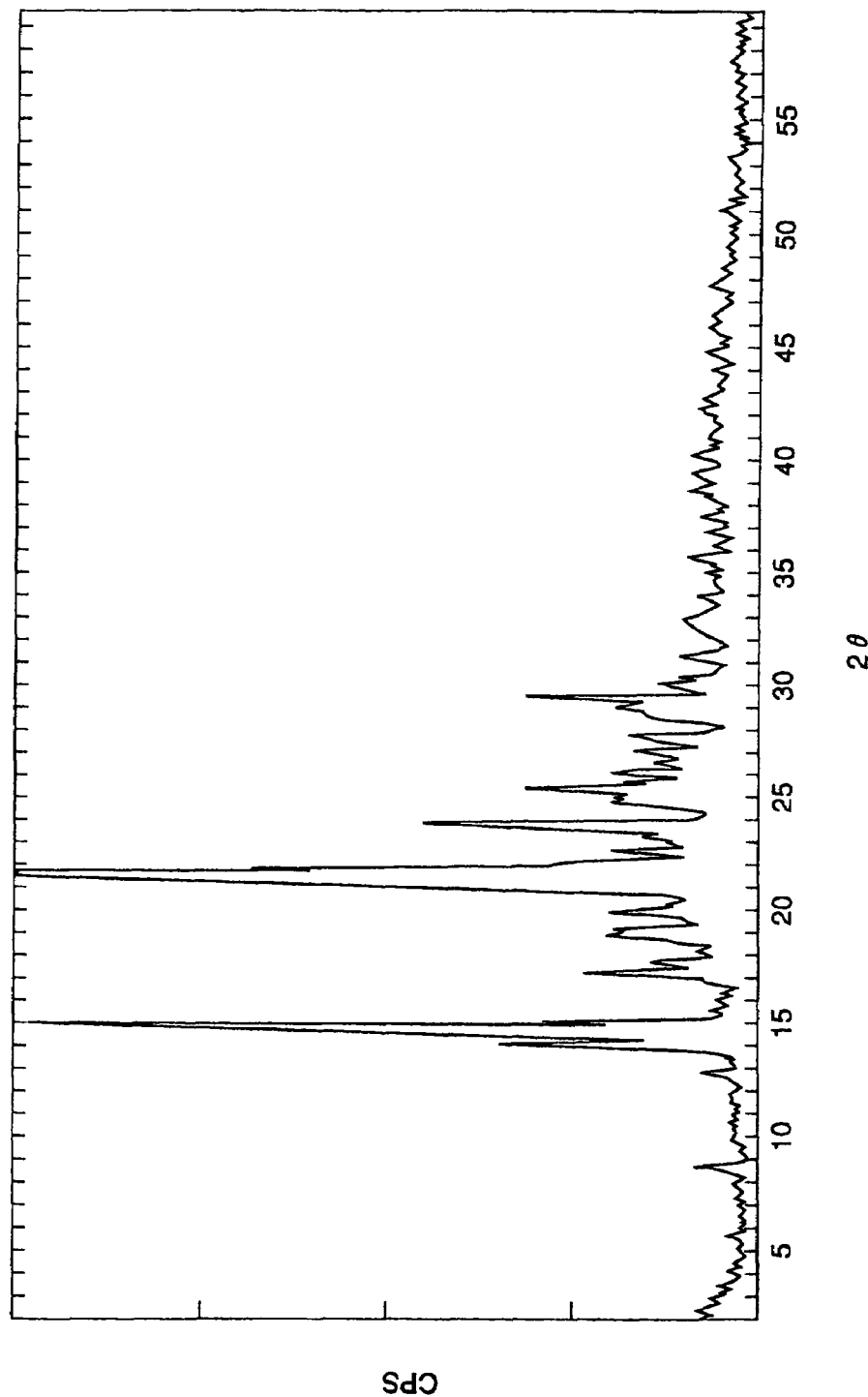
FIG. 31 shows a X-ray diffraction pattern of a clathrate (Sample No. 27) described in Table 2.
Figure 32:
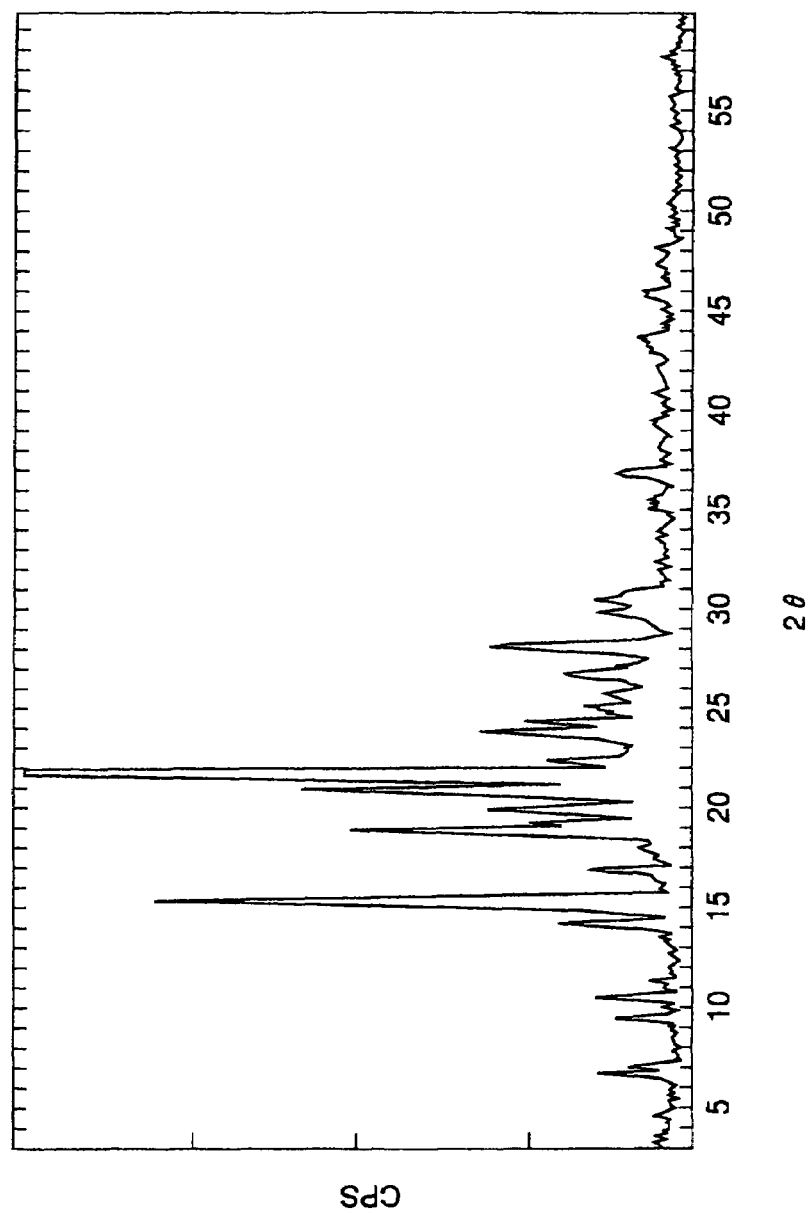
FIG. 32 shows a X-ray diffraction pattern of a clathrate (Sample No. 31) described in Table 2.
Figure 33:
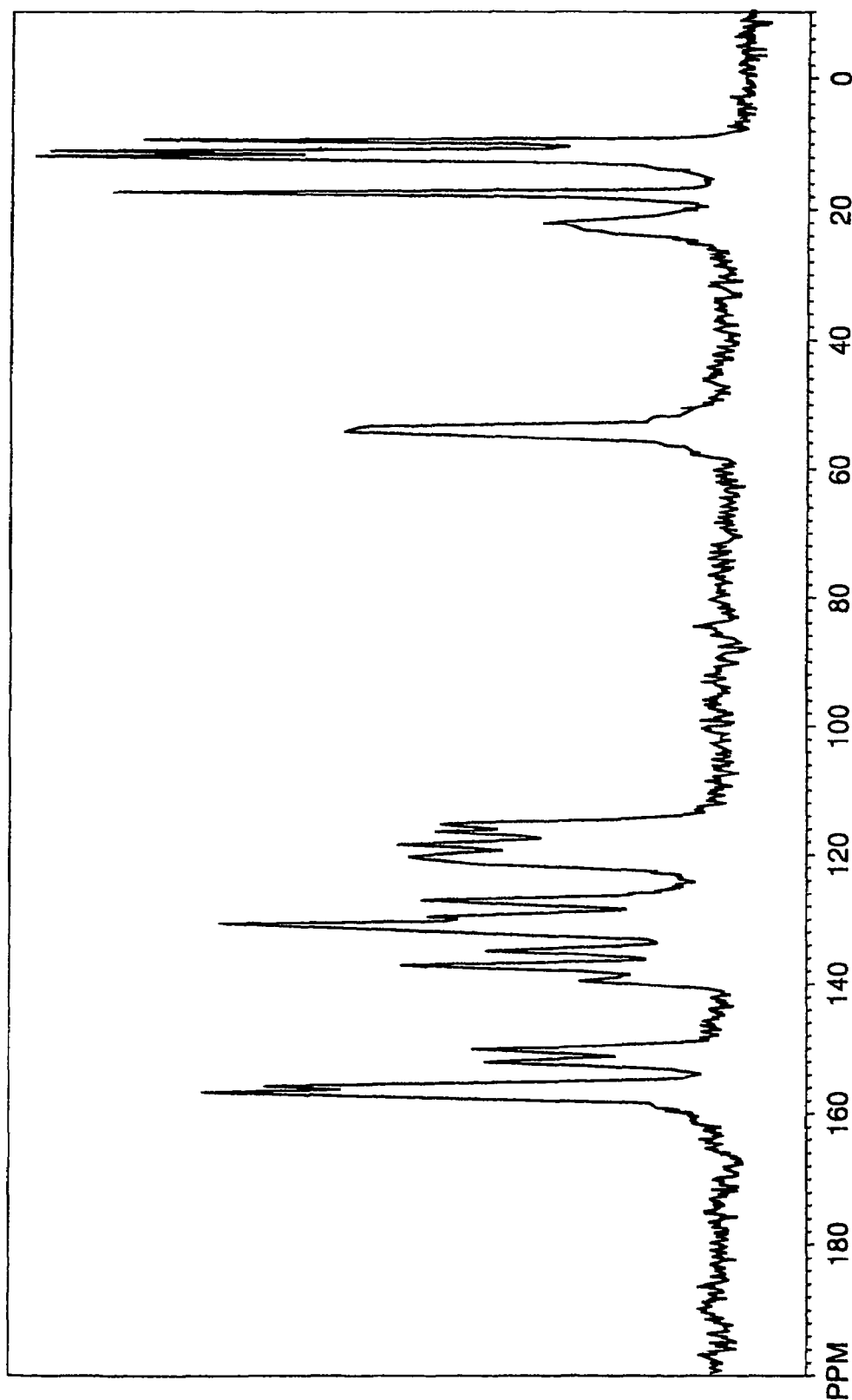
FIG. 33 shows a $^{13}C$ solid NMR spectrum chart of a clathrate (Sample No. 24) described in Table 1.
Figure 34:
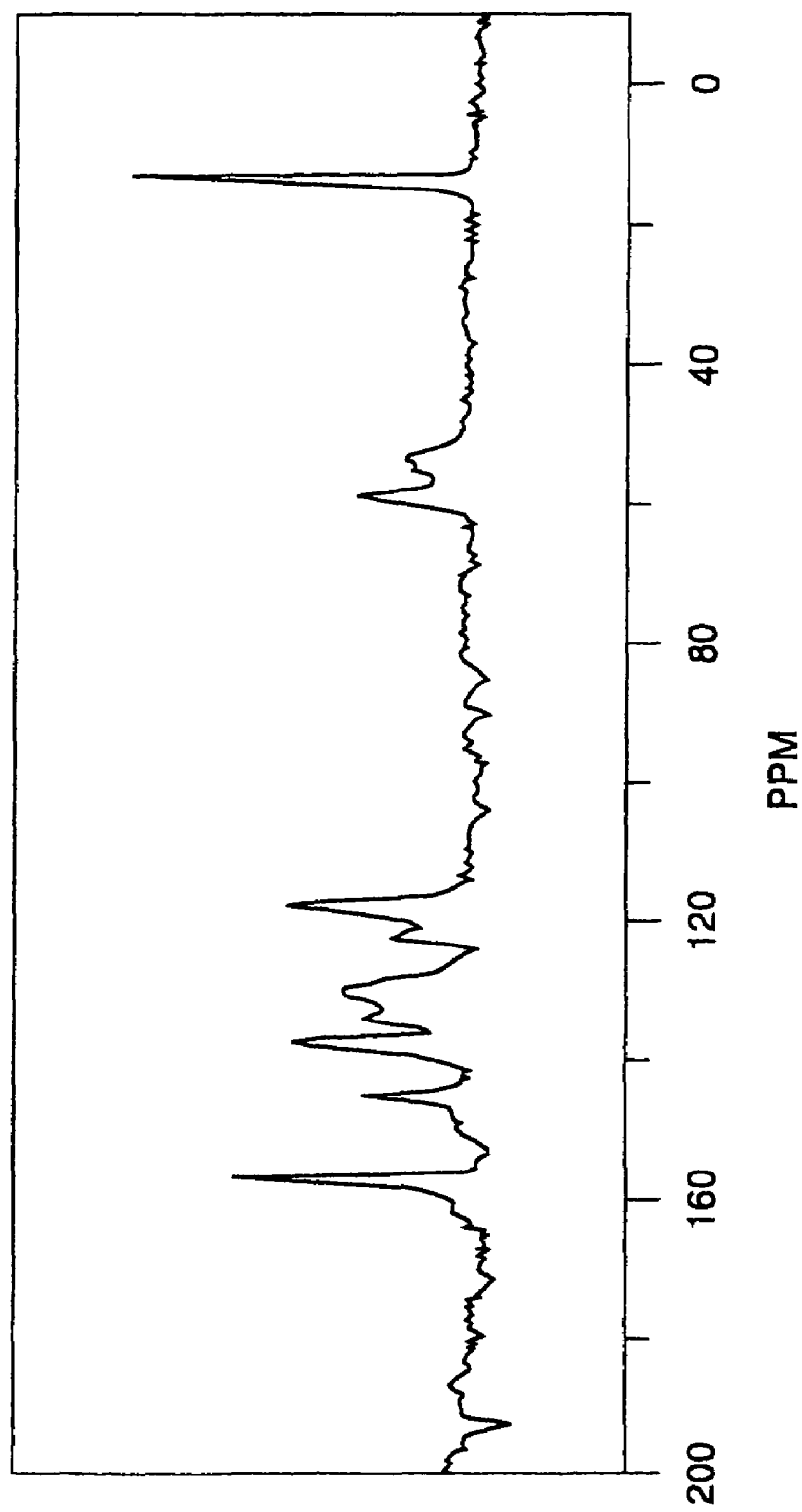
FIG. 34 shows a $^{13}C$ solid NMR spectrum chart of a clathrate (Sample No. 27) described in Table 2.
Figure 35:
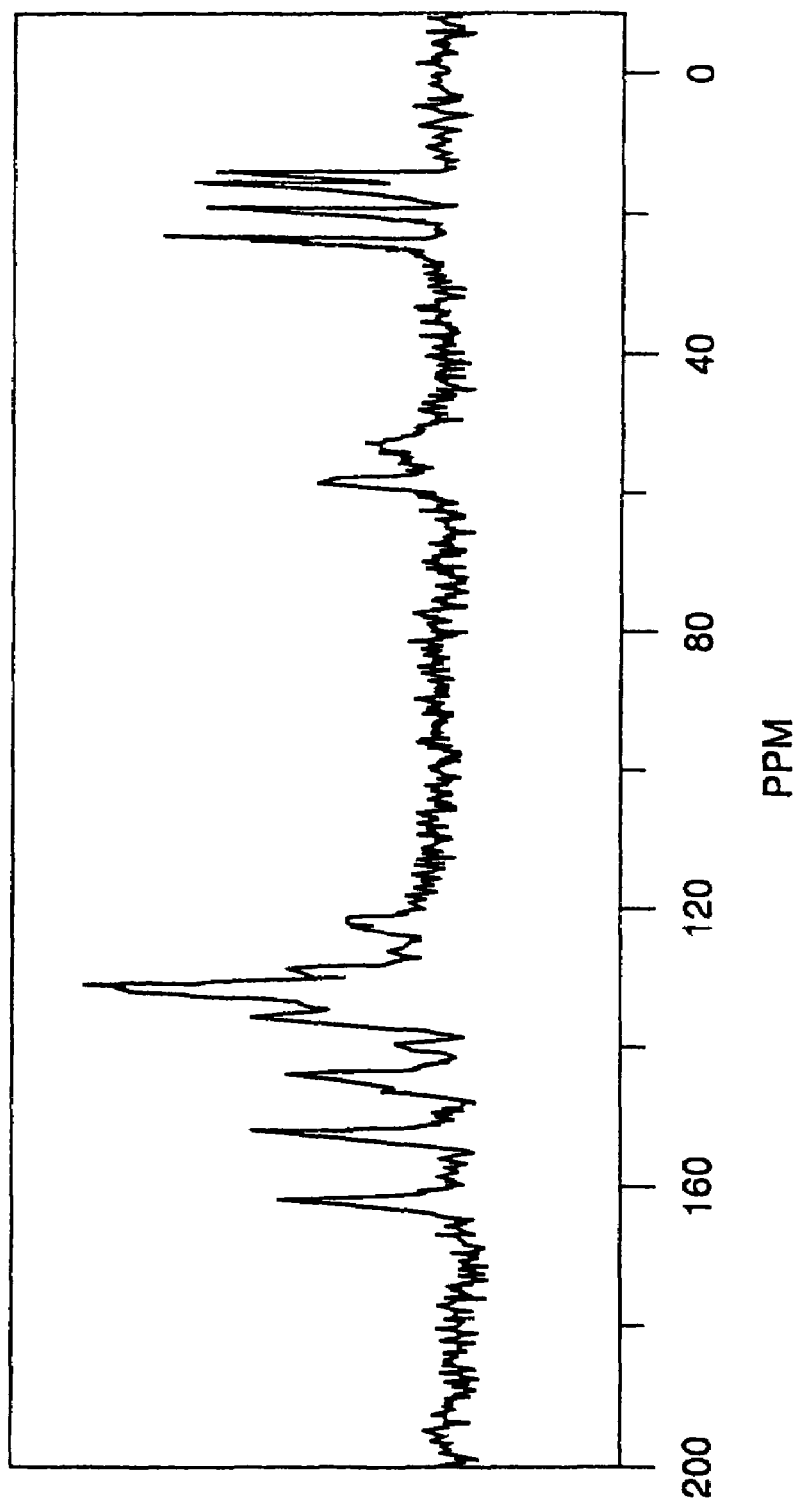
FIG. 35 shows a $^{13}C$ solid NMR spectrum chart of a clathrate (Sample No. 28) described in Table 2.
Figure 36:
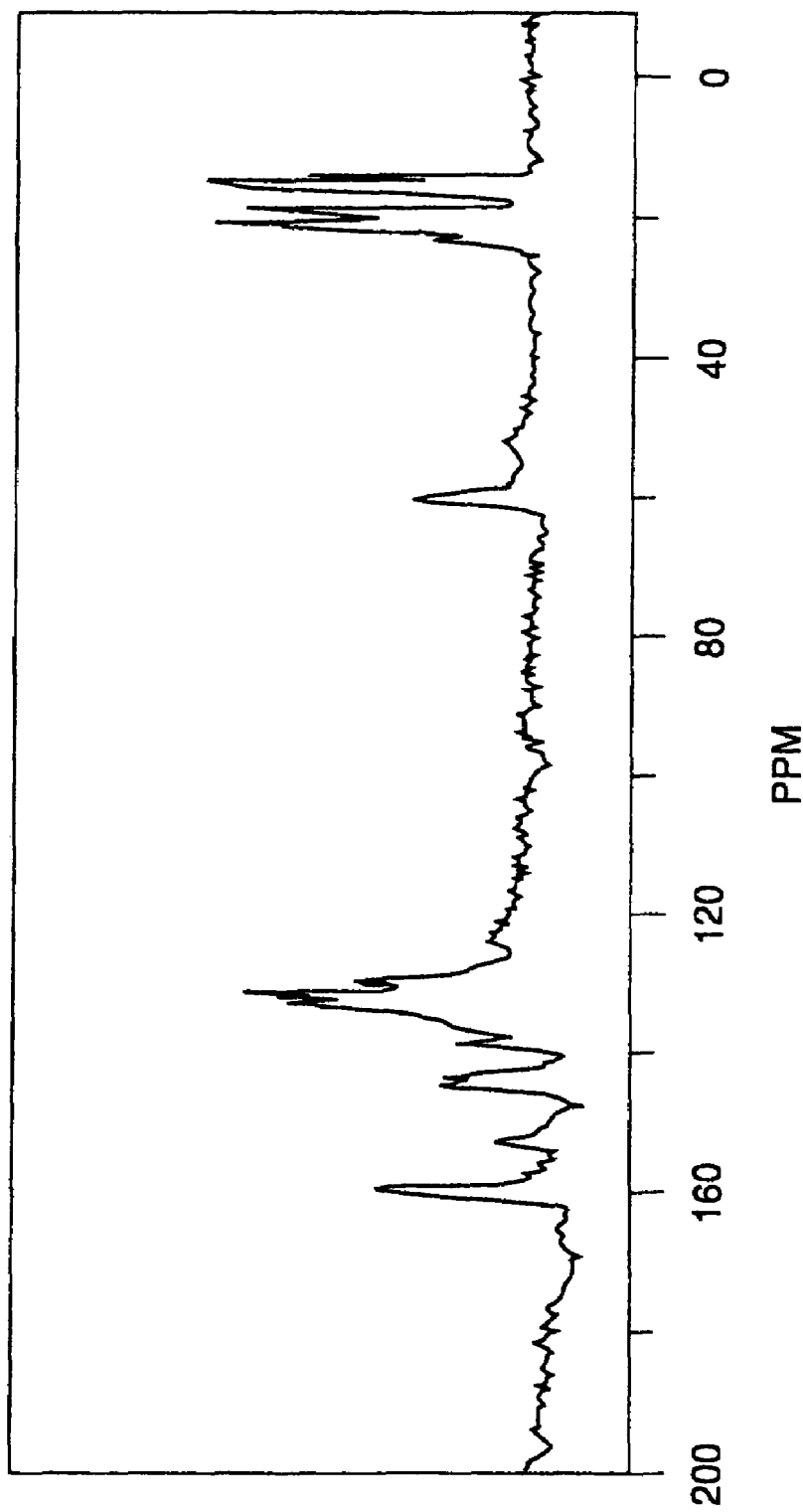
FIG. 36 shows a $^{13}C$ solid NMR spectrum chart of a clathrate (Sample No. 30) described in Table 2.
Figure 37:
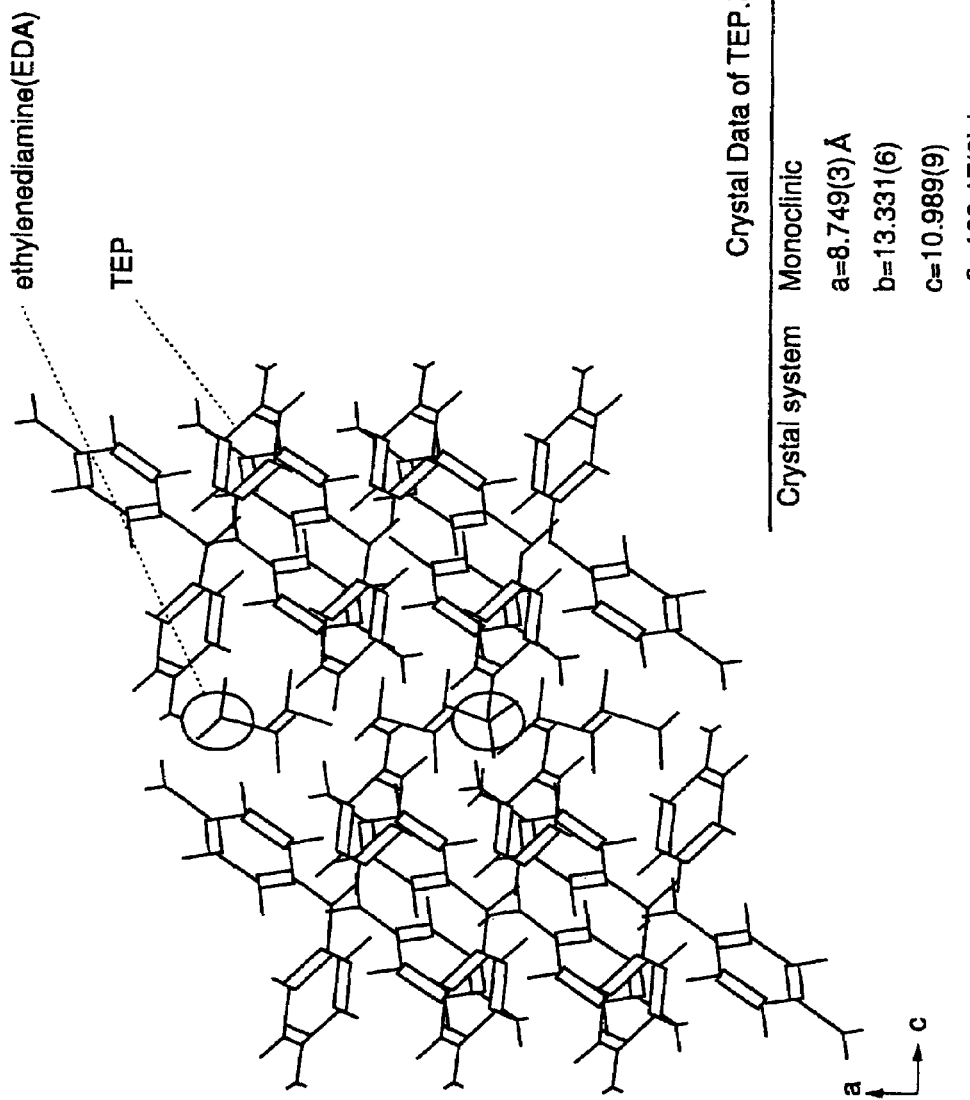
FIG. 37 shows a result of X-ray single crystal structure analysis of a clathrate (Sample No. 10) described in Table 1.
Figure 38:
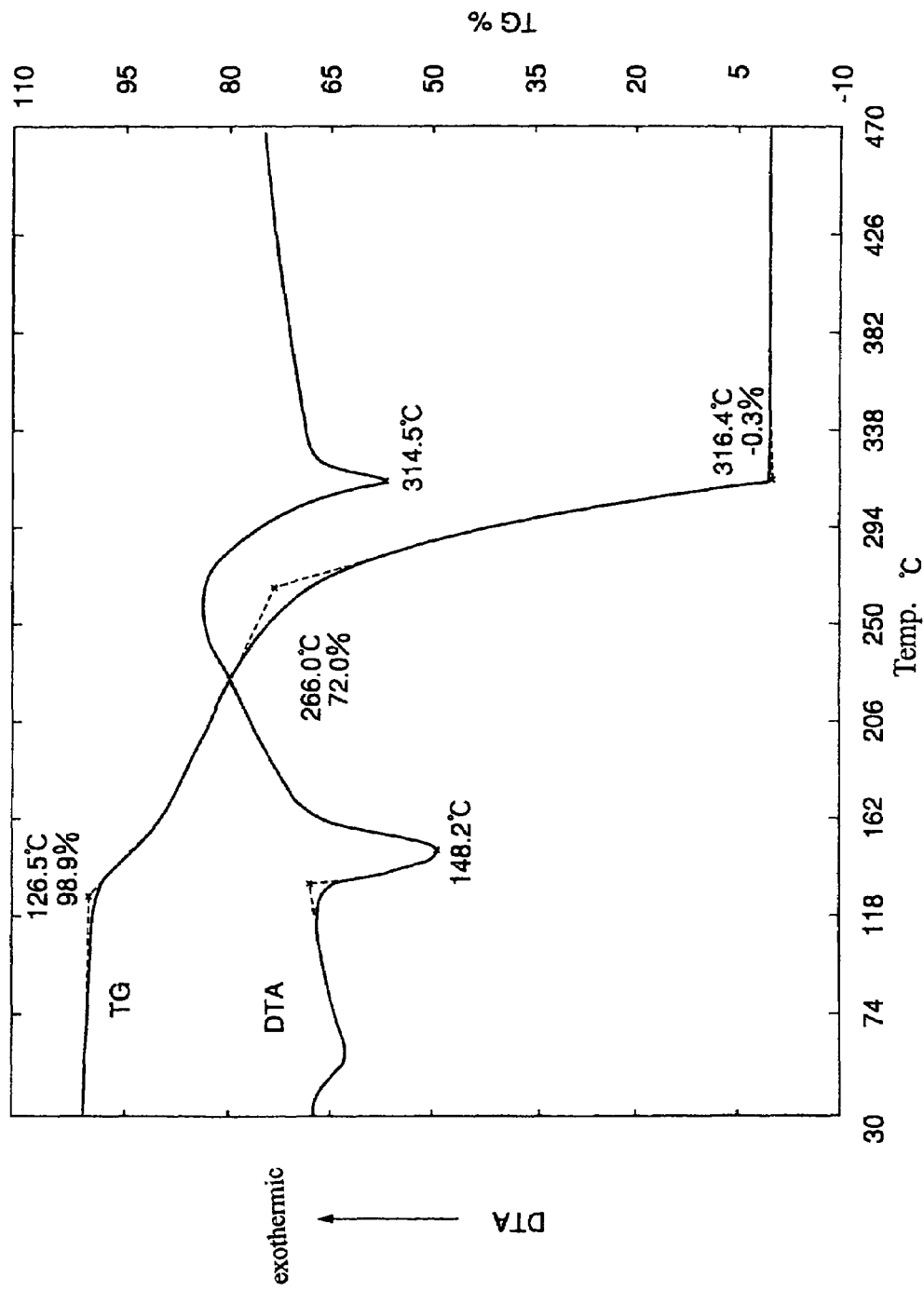
FIG. 38 shows a thermal analysis (TG/DTA) chart of a compound (Sample No. 48) described in Table 3.
Figure 39:
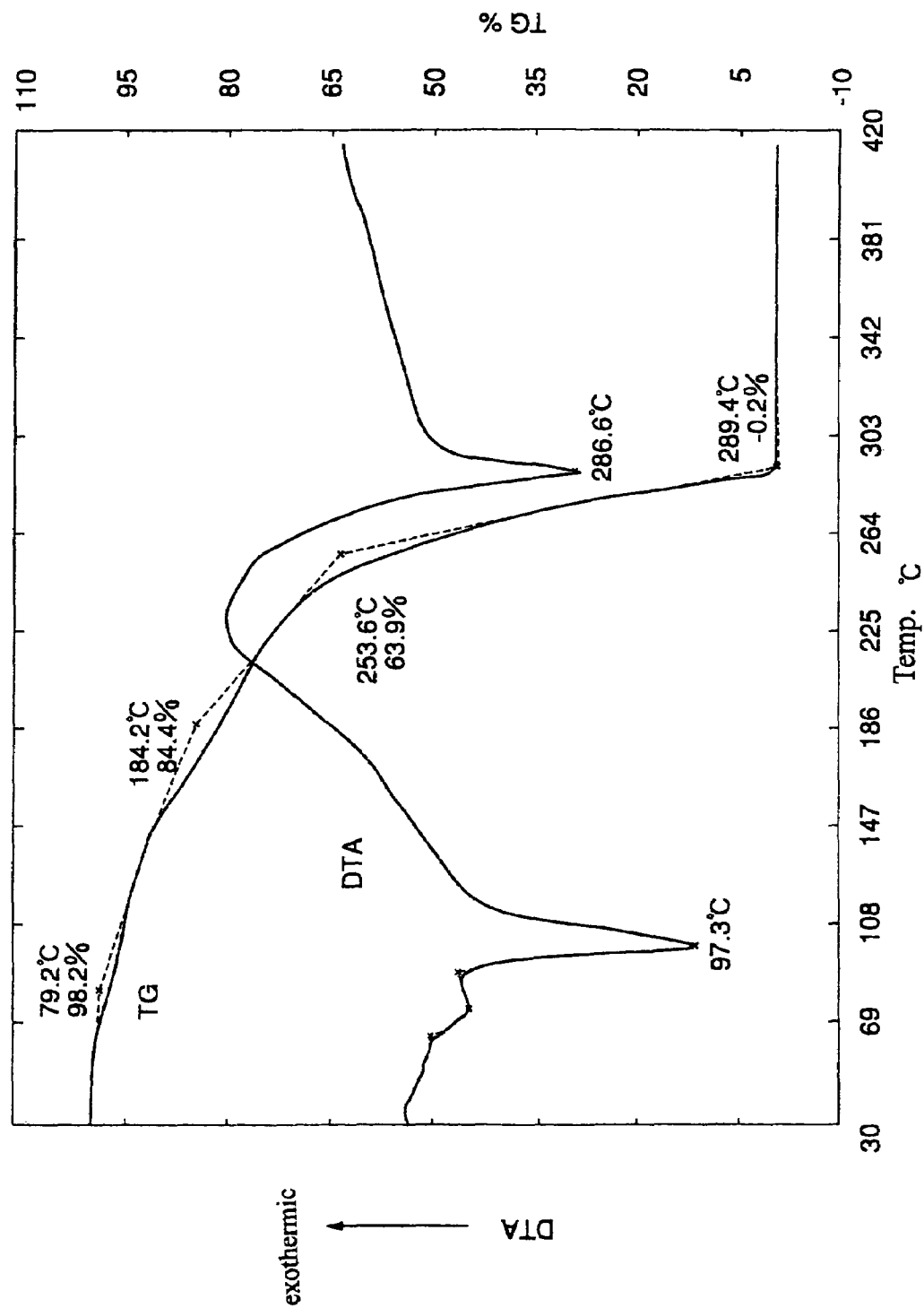
FIG. 39 shows a thermal analysis (TG/DTA) chart of a compound (Sample No. 49) described in Table 3.
Figure 40:
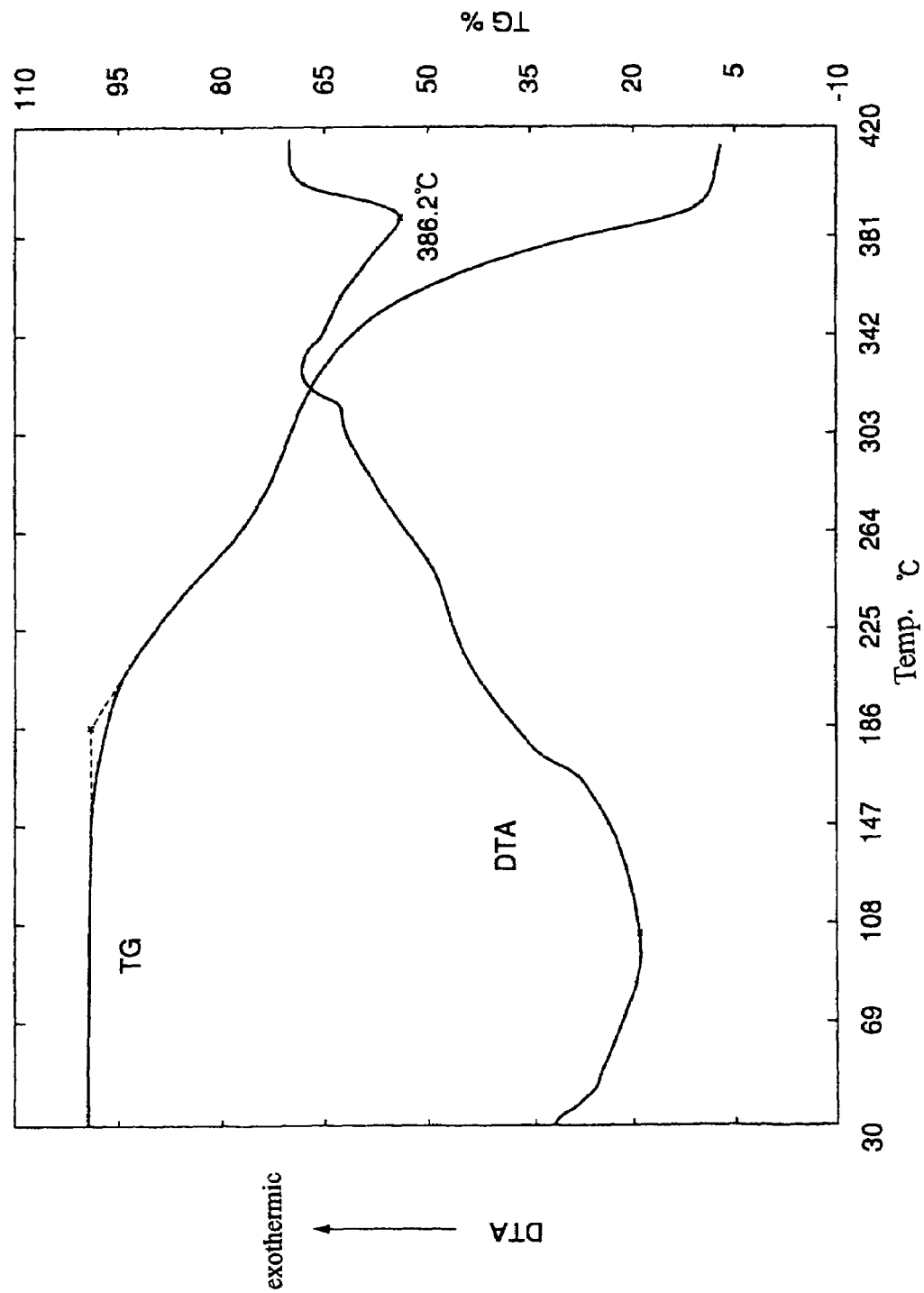
FIG. 40 shows a thermal analysis (TG/DTA) chart of a compound (Sample No. 51) described in Table 3.
Figure 41:
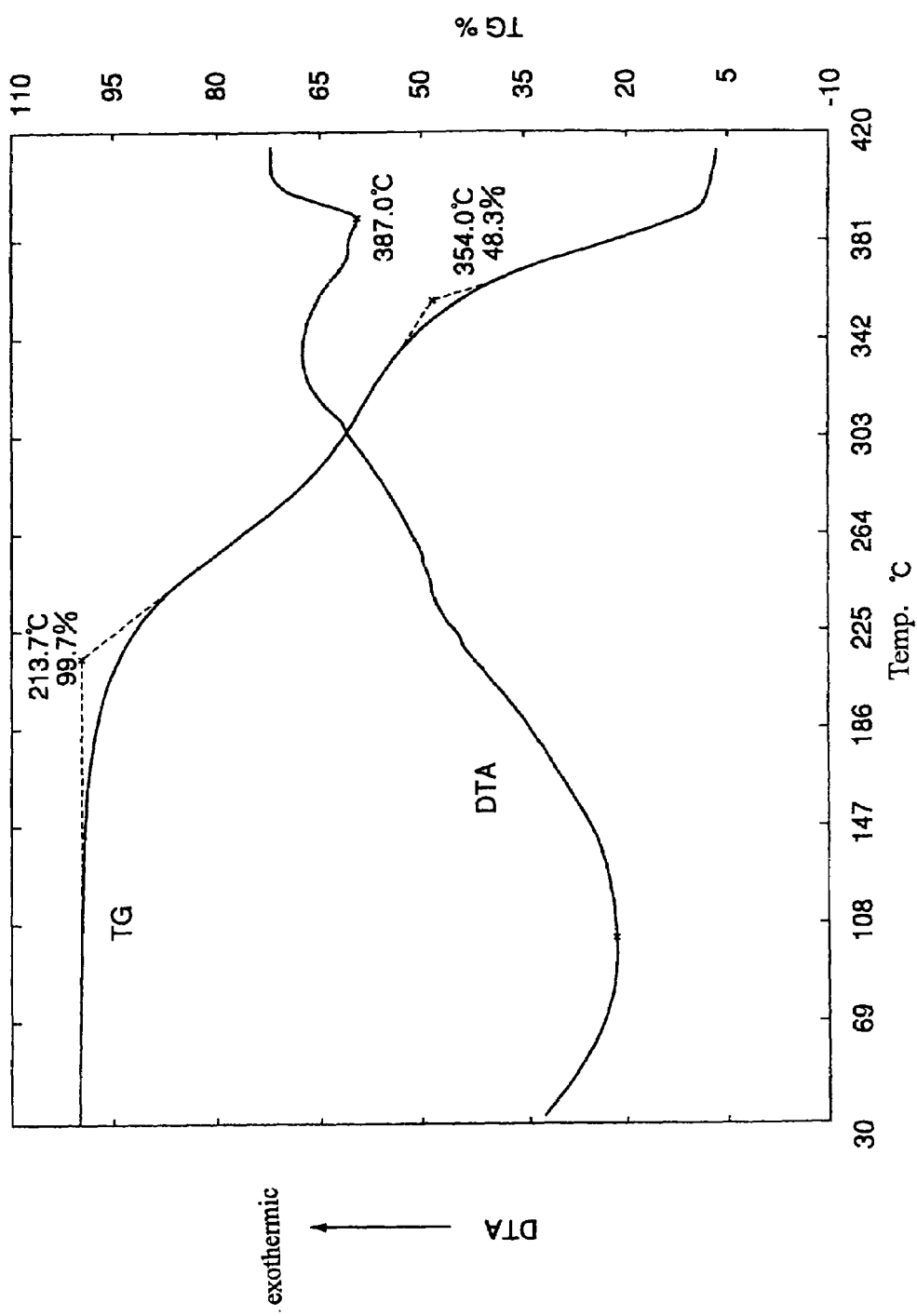
FIG. 41 shows a thermal analysis (TG/DTA) chart of a compound (Sample No. 52) described in Table 3.
Figure 42:
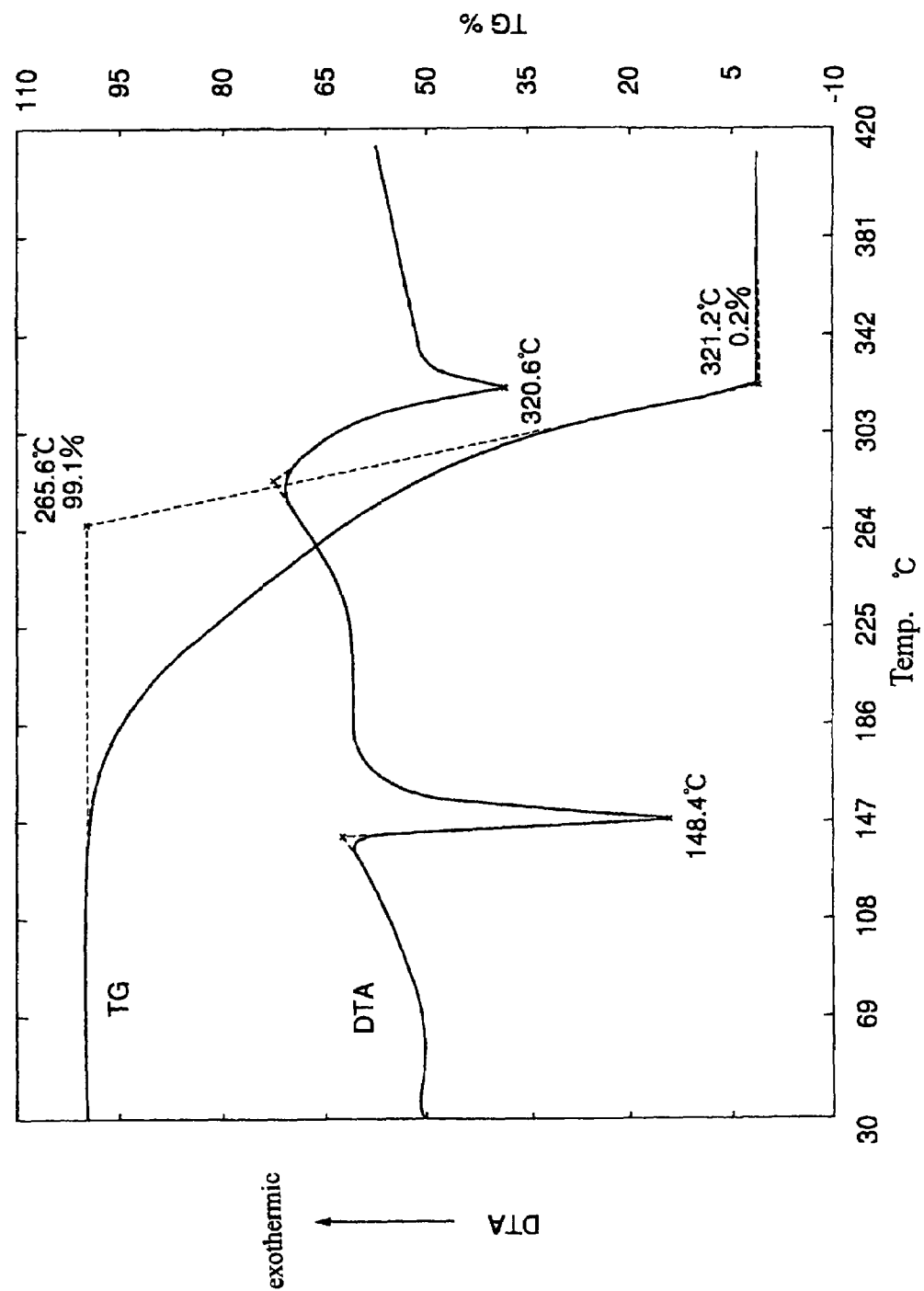
FIG. 42 shows a thermal analysis (TG/DTA) chart of a compound (Sample No. 53) described in Table 3.
Figure 43:
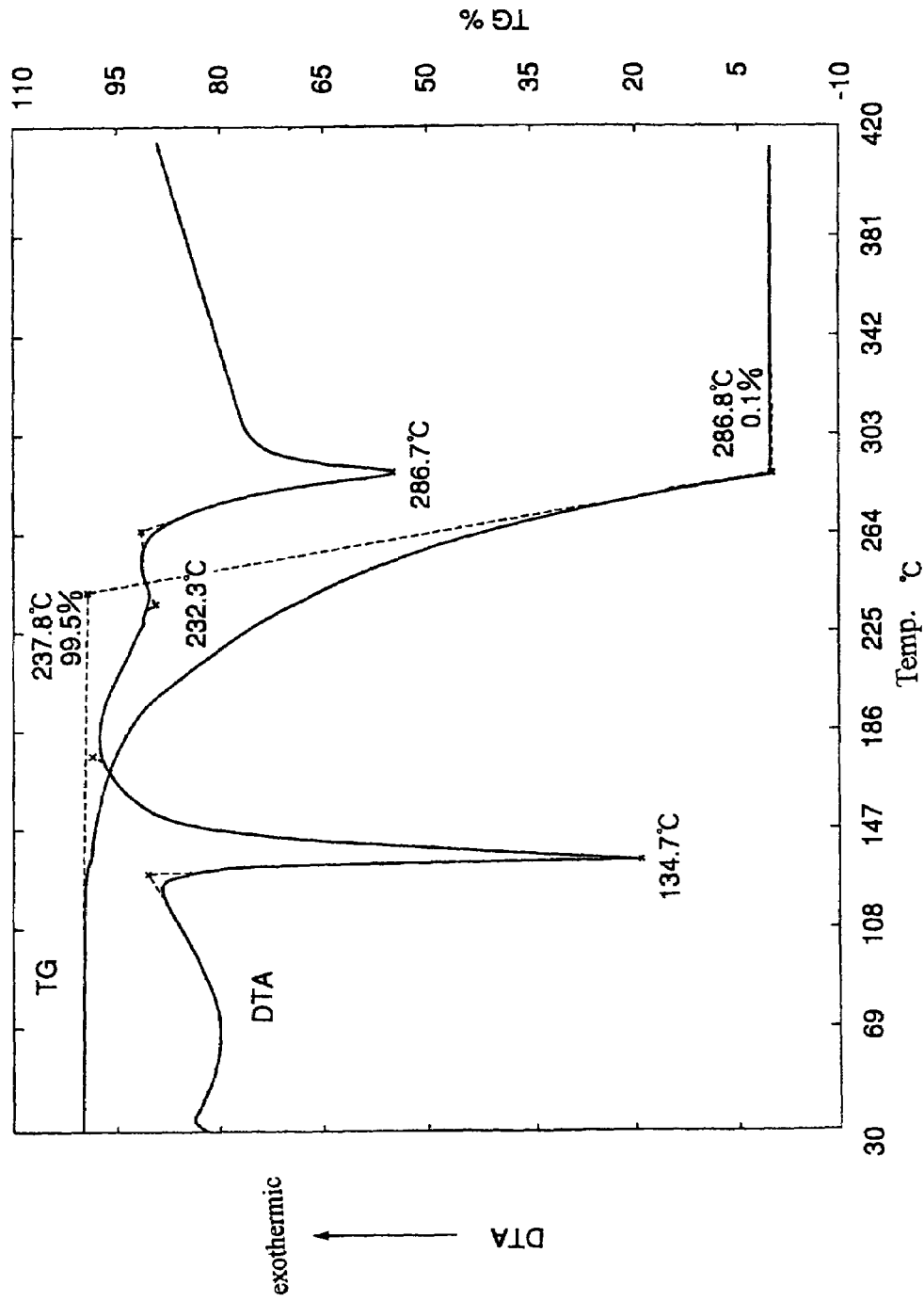
FIG. 43 shows a thermal analysis (TG/DTA) chart of a compound (Sample No. 54) described in Table 3.
Figure 44:
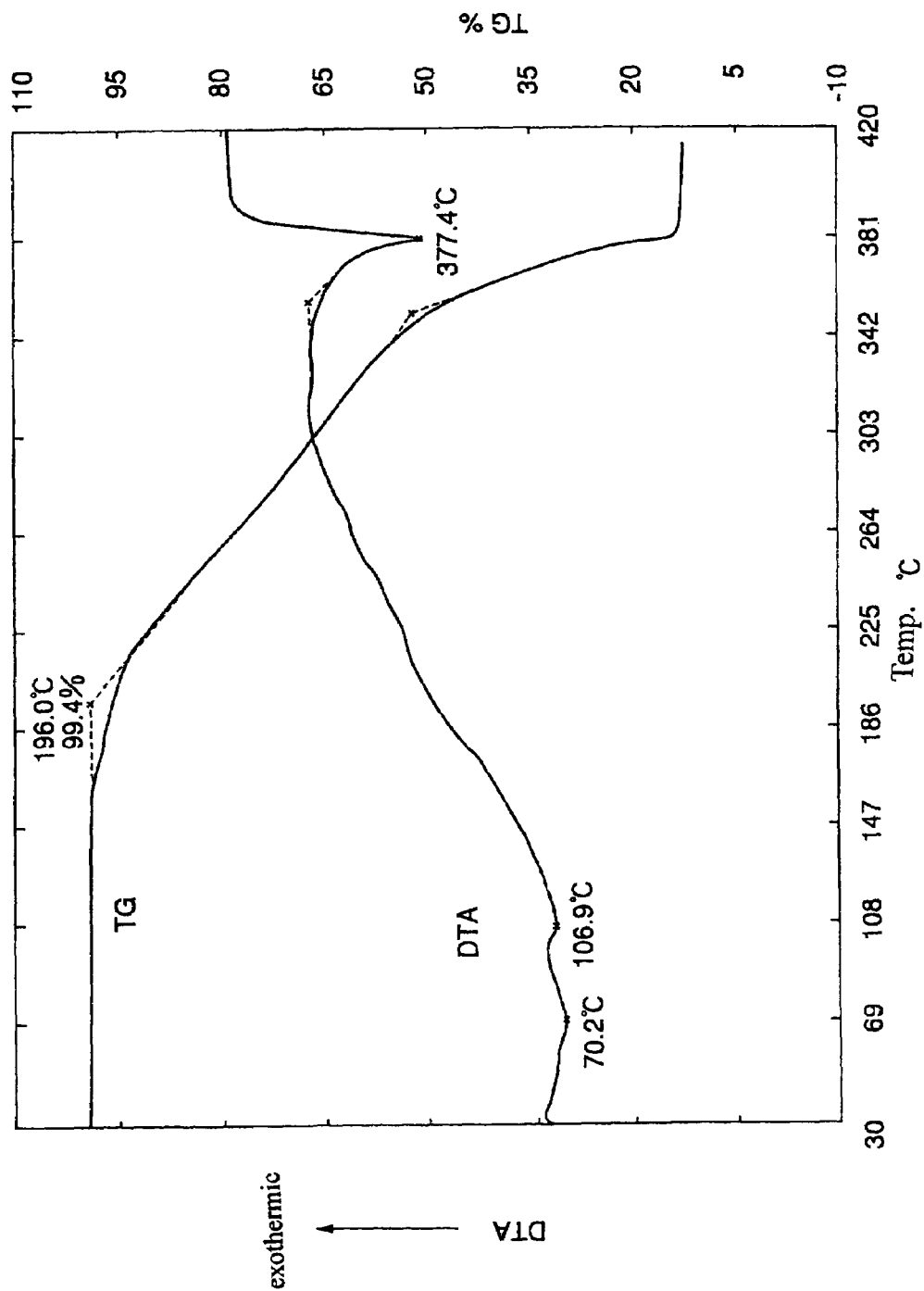
FIG. 44 shows a thermal analysis (TG/DTA) chart of a compound (Sample No. 55) described in Table 3.

From the samples described in Tables 1 and 2, the thermal analysis (TG/DTA) charts for the samples, Nos. 10, 11, 19, 20, 21, 22, 23, 24, 27, 28, 29, 30, 31, 32, 33, 38, 43, 46 and 47, are shown in FIG. 1 through 19, respectively. Besides, $^1$H NMR spectrums, wherein heavy methanol was used as a solvent, for the samples, Nos. 10, 21, 24, 27 and 28, are shown in FIG. 20 through 24, respectively. The IR spectrums for the samples, Nos. 24, 27, 39, 42 and 45, are shown in FIG. 25 through 29, respectively. The powder X-ray diffraction patterns for the samples, Nos. 10, 27 and 31, are shown in FIG. 30 through 32, respectively. Further, the $^{13}$C NMR spectrums for the samples, Nos. 24, 27, 28 and 30, are shown in FIG. 33 through 36, respectively. Again, the result of X-ray single crystal structure analysis for the sample No. 10 is shown in FIG. 37. Whereas, the results of X-ray single crystal structure analysis for the samples, Nos. 19, 20, 28 and 31, have been obtained as well, and the structures of those samples have been determined as ones being formed into molecular crystal structure wherein a host compound and a guest compound are regularly configured in three dimensional direction same as the structure of the sample No. 10.

COMPARISON EXAMPLE 1

Manufacturing of Curatives and Curing Accelerators According to Conventional the Method According to the method described in the patent previously disclosed, the manufacturing of curatives and curing accelerators were performed. The samples manufactured were shown in Table 3. The abbreviations for curatives and curing accelerators shown in Table 3 are corresponding to the compounds described in the examples, respectively.

The abbreviations for phenol compounds represent the following compounds, respectively.
BHC: 1,1-Bis(4-hydroxyphenyl)cyclohexane
BPA: Bisphenol A[2,2-bis(4-hydroxyphenyl)propane]
BPS: Bisphenol S(4,4'-dihydroxydiphenylsulfone)

Whereas, the references (1) through (5) shown in Table 3, which are describing the preparation method for the samples, correspond to the following references, respectively.

(1) Japanese Patent Laid-open No. Hei 5-194711 Gazette
(2) U.S. Pat. No. 3,519,576
(3) U.S. Pat. No. 4,845,234 and Japanese Patent Publication No. Hei 6-9868
(4) Japanese Patent Publication No. Sho 62-24006
(5) Japanese Patent Laid-open No. Hei 8-15142 Gazette

TABLE 3

| Sample No. | Curative/Curing Accelerator | Phenol Compound | Reference Describing Preparation Method of Samples | Sample Composition Curative:Phenol Compound (Mole ratio) |
|---|---|---|---|---|
| 48 | EDA | BHC | (1) | 1:1 |
| 49 | EDA | BPA | (2) | 1:1 |
| 50 | 2E4MZ | BHC | (1) | 1:1 |
| 51 | 2E4MZ | BPS | (3) | 1:1 |
| 52 | 1B2MZ | BPS | (3) | 1:1 |
| 53 | 2MZ | BHC | (1) | 1:1 |
| 54 | 2MZ | BPA | (1) | 1:1 |
| 55 | 2PZL | BPS | (4) | 1:1 |
| 56 | 2PZL | BPS | (5) | 1:1 |

Figure 45:
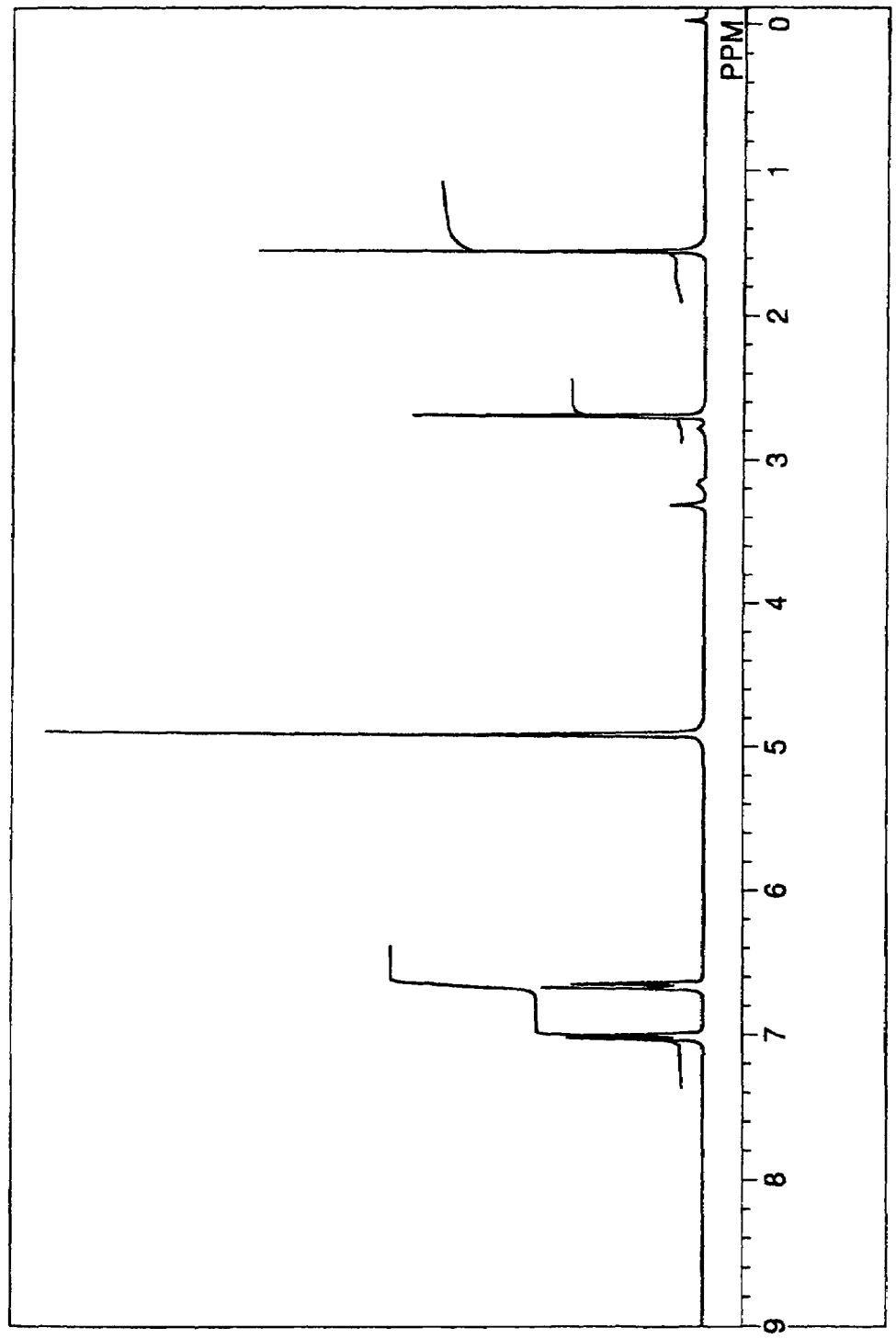
FIG. 45 shows a $^1HNMR$ spectrum chart of a compound (Sample No. 49) described in Table 3.
Figure 46:
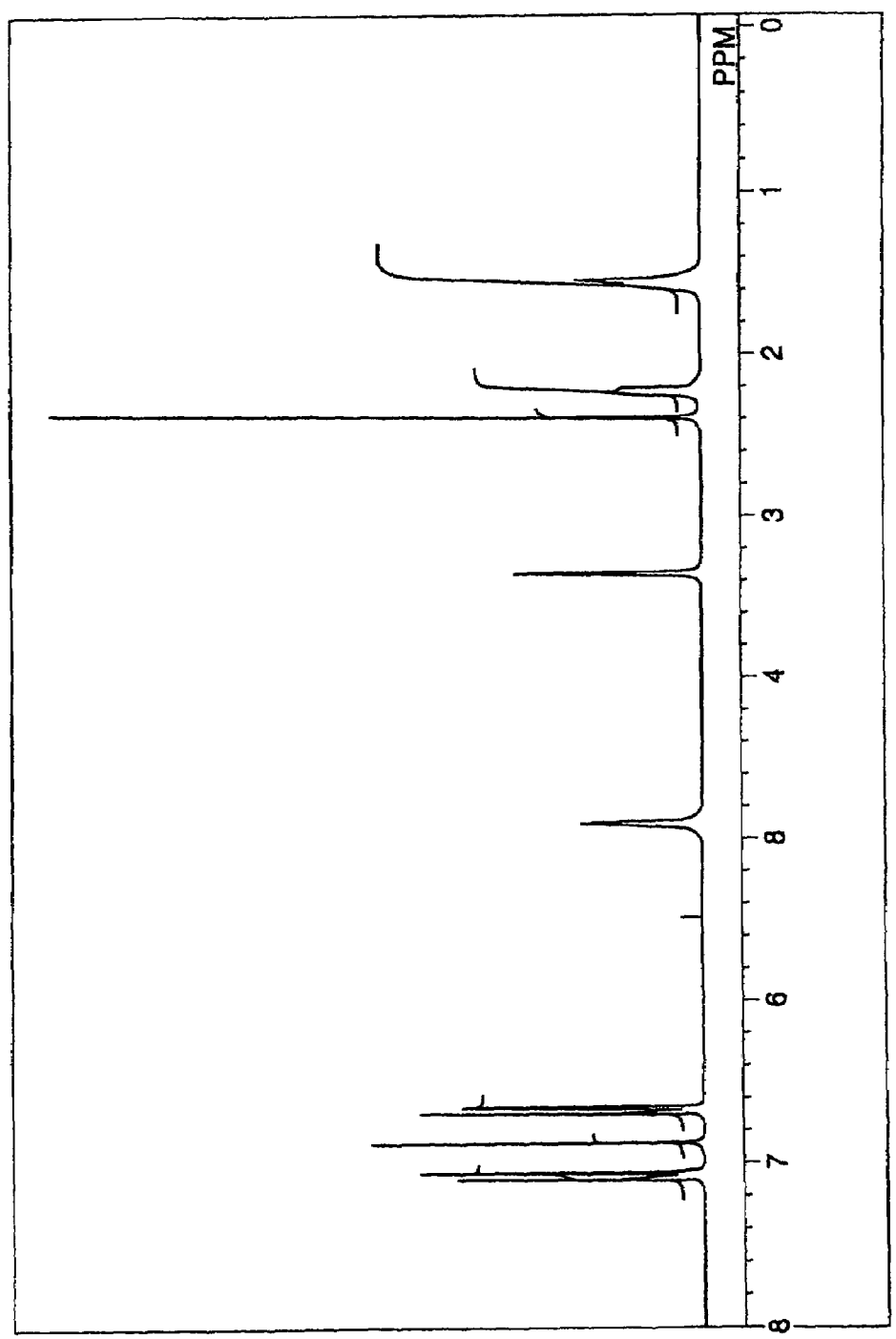
FIG. 46 shows a $^1HNMR$ spectrum chart of a compound (Sample No. 53) described in Table 3.
Figure 47:
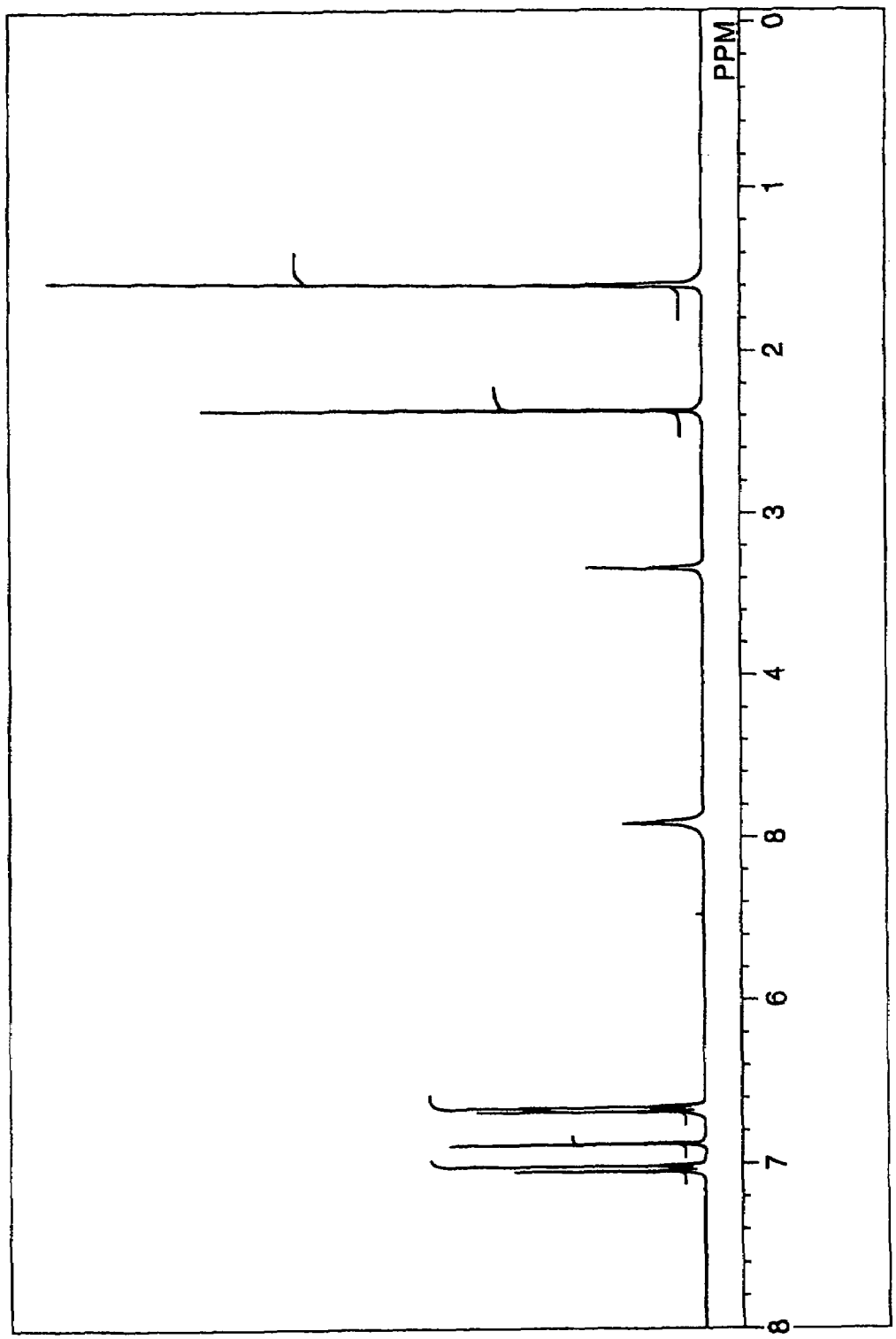
FIG. 47 shows a $^1HNMR$ spectrum chart of a compound (Sample No. 54) described in Table 3.

From the samples described in Table 3, the thermal analysis (TG/DTA) charts for the samples, Nos. 48, 49, 51, 52, 53, 54 and 55, are shown in FIGS. 38 through 44, respectively. Further, the $^1$H NMR spectrum analysis, wherein heavy methanol was used as a solvent, for the samples, Nos. 49, 53 and 54, are shown in FIGS. 45 through 47, respectively.

EXAMPLE 2

Measurement of Prolonged Pot life of Resin Compositions (Part 1)

Figure 48:
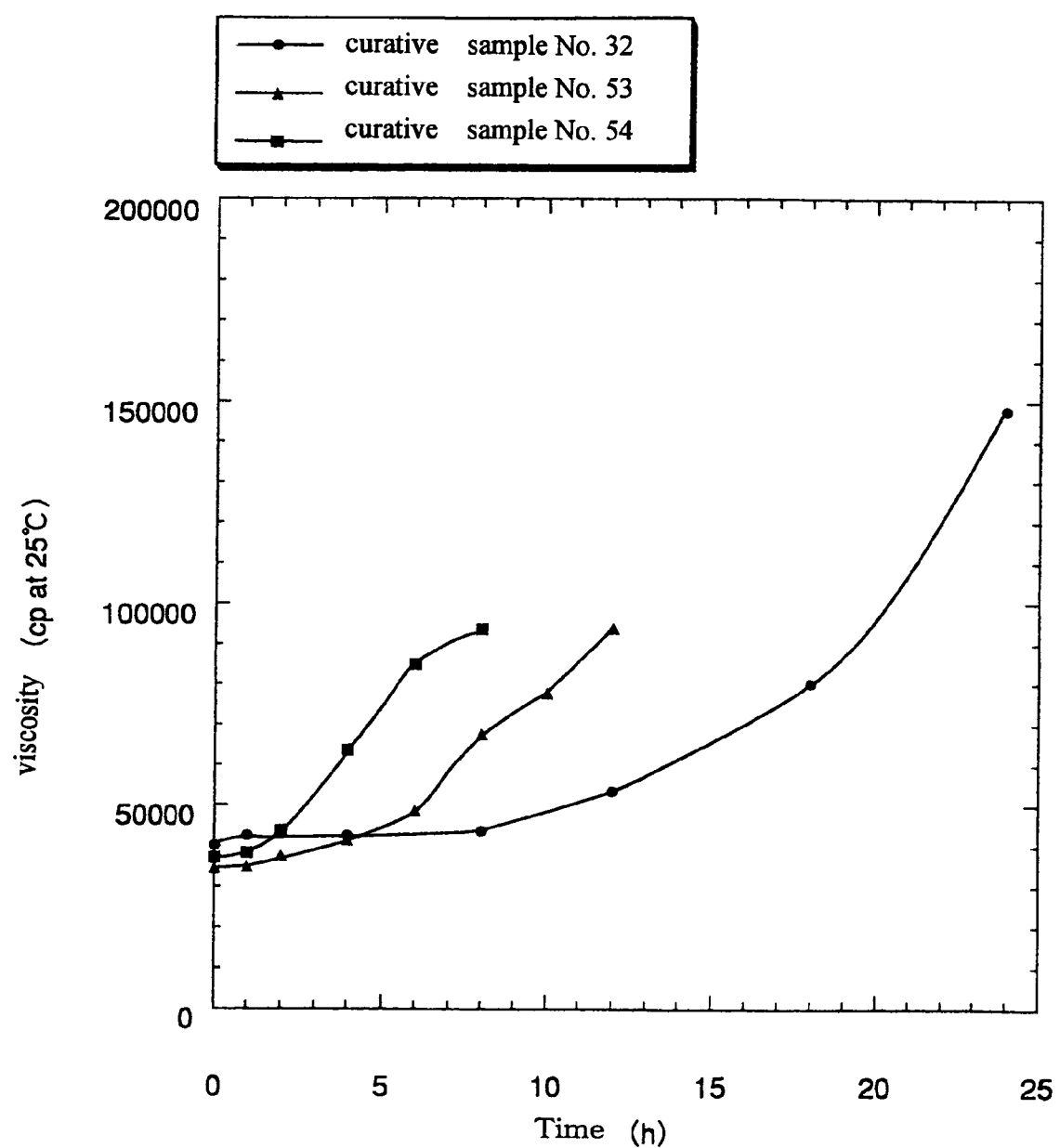
FIG. 48 shows a result of measurements of a prolonged pot life (viscosity) of the resin compositions which are using the sample No. 32 specified in Example 2 and the samples No. 53 and No. 54 specified in Comparison Example 2 described below, respectively.

To 100 parts of a base resin (uncured resin) UVR-6410 (Trade name, Manufactured by Union Carbide Co., Ltd.), was added 13.7 parts (corresponding to 4.0 parts by weight as 2 MZ) of the inventive curative, sample No. 32, described in Table 1. The mixture was kneaded for 10 min. at 25° C. and was further allowed to stand for 20 min. at 25° C. Then, the initial viscosity of the resin composition prepared was measured. The resin composition was then placed under 25° C., and periodical change in viscosity was measured. The viscosity measurement was accorded to JIS K-6833-1994, and B8R-type rotational viscosity meter (Manufactured by Tokyo Keiki) was used for the measurement. The results of the measurement are shown in Table 4 and FIG. 48. When prolonged pot life of the resin composition is defined as the time requiring for the viscosity of a resin to be the double value of the initial viscosity value, the prolonged pot life was found to be 18 hours when using the inventive curative, sample No. 32.

COMPARISON EXAMPLE 2

To 100 parts of UVR-6410, was added 17.1 parts by weight (4.0 parts by weight based on 2MZ) of the curative, sample No. 53 described in Table 3. According to the procedure as described in Example 2, the initial viscosity of the resulting resin composition and the periodical change in viscosity thereof were measured. In addition, measurement of the viscosity of the resin composition, wherein 15.1 parts by weight (4.0 parts by weight based on 2MZ) of a curative having sample No. of 54 described in Table 3 is contained instead of the curative of sample No. 53, was also performed. The results are shown in Table 4 and FIG. 48. When using the curative of sample No. 53, the prolonged pot life of the resin composition was 9 hours, while the prolonged pot life of the resin composition, wherein the curative of sample No. 53 is used, was 5 hours.

When compared the results each obtained in Example 2 and Comparison Example 2, it is clearly demonstrated that the curative of the present invention can remarkably prolonged the pot life of the resin composition comparing to other compositions which are using curatives being conventionally-used.

EXAMPLE 3

Measurement of Prolonged Pot Life of Resin Compositions (Part 2)

Figure 49:
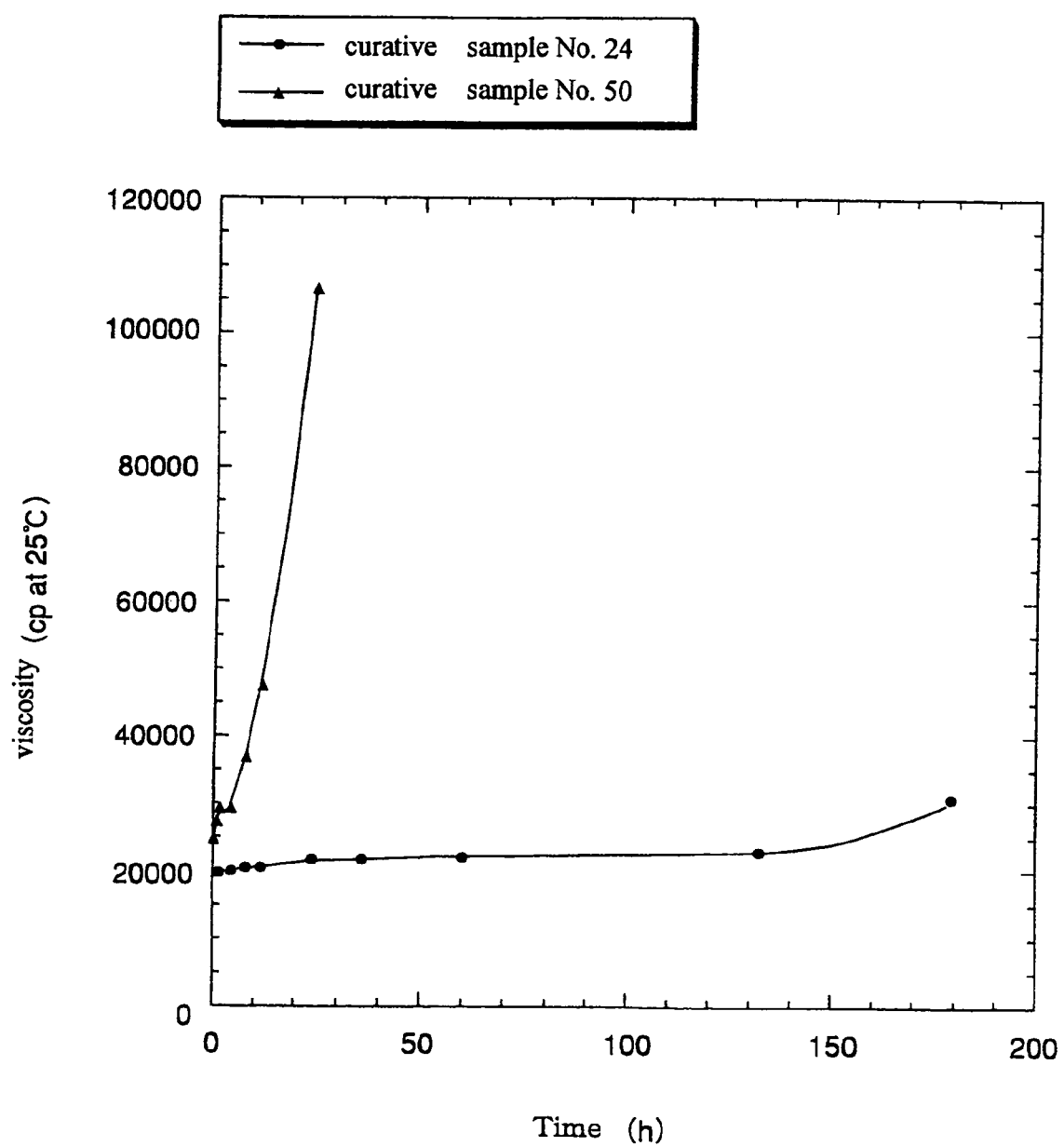
FIG. 49 shows a result of measurements of a prolonged pot life (viscosity) of the resin compositions which are using the sample No. 24 specified in Example 3 and the sample No. 50 specified in Comparison Example 3 described below, respectively.

To 100 parts of a base resin (uncured resin) UVR-6410 (Trade name, Manufactured by Union Carbide Co., Ltd.), was added 11.2 parts by weight (corresponding to 4.0 parts by weight as 2E4MZ) of the inventive curative of sample No. 24 described in Table 1. Then, the viscosity of the resulting resin composition was measured according to the procedure as described in the example 2. The results of the measurement are shown in Table 5 and FIG. 49. When using the inventive curative of sample No. 24, the prolonged pot life, which is the time required for the viscosity of the resin composition to be a double value of the initial viscosity value, was found to be 180 hours.

COMPARISON EXAMPLE 3

To 100 parts by weight of UVR-6410, was added 13.7 parts by weight (equivalent to 4.0 parts by weight based on 2E4MZ) of a curative of sample No. 50. The viscosity of the resultant resin composition was measured according to the procedure described in the example 2. The results are shown in Table 5 and FIG. 49. When using the curative of sample No. 50 according to the method in the past, the prolonged pot life, which is the time required for the viscosity of the resin composition to be a double value of the initial viscosity value, was found to be 12 hours.

From the comparison between the result in the example 3 and that of the comparison example 3, it is obvious that the inventive curative can prolong the pot life of the resin compositions remarkably comparing to that of other resin compositions using curatives conventionally-used.

TABLE 4

| | Viscosity of Resin Composition (cp/25° C.) | | |
|---|---|---|---|
| Time (h) | Resin Composition Sample No. 32 | Resin Composition Sample No. 53 | Resin Composition Sample No. 54 |
| 0 | 40500 | 35100 | 37100 |
| 1 | 42800 | 35300 | 38700 |
| 2 | | 38100 | 44400 |
| 4 | 43000 | 41900 | 63900 |
| 6 | | 48800 | 86000 |
| 8 | 44200 | 67900 | 94300 |
| 10 | | 78000 | |
| 12 | 54300 | 94300 | |
| 18 | 80500 | | |
| 24 | 149000 | | |

TABLE 5

| | Viscosity of Resin Composition (cp/25° C.) | |
|---|---|---|
| Time (h) | Resin Composition Sample No. 24 | Resin Composition Sample No. 50 |
| 0 | 19600 | 24800 |
| 1 | 19800 | 27400 |
| 2 | | 29400 |
| 4 | 20100 | 29400 |
| 8 | 20700 | 37000 |
| 12 | 20900 | 48100 |
| 24 | 21900 | 107000 |
| 36 | 22100 | |
| 60 | 22500 | |
| 132 | 23000 | |
| 180 | 30600 | |

EXAMPLE 4

Measurement of Prolonged Pot Life of Resin Compositions (Part 3)

Figure 50:
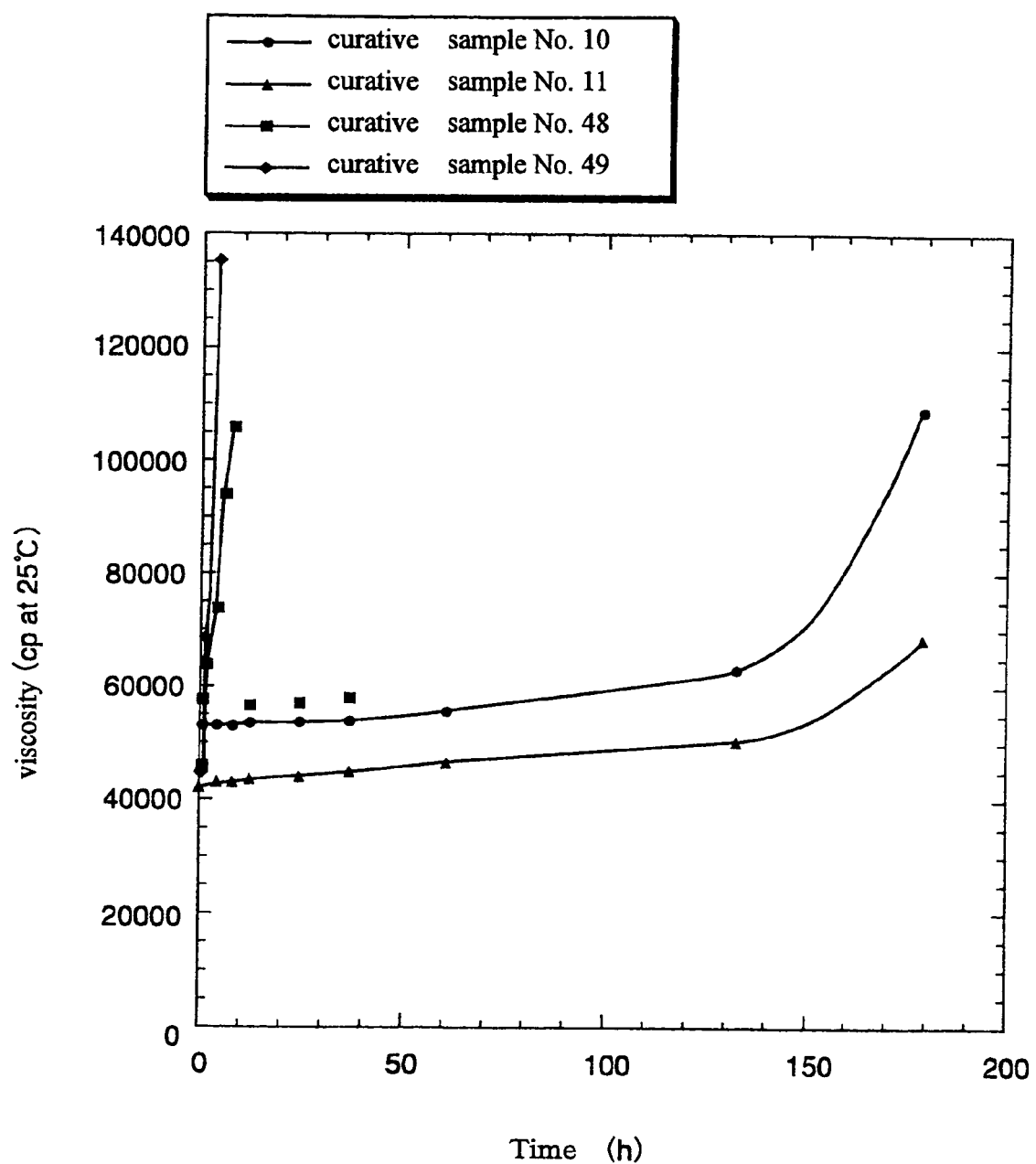
FIG. 50 shows a result of measurements of a prolonged pot life (viscosity) of the resin compositions which are using the samples No. 10 and No. 11 specified in Example 4 and the samples No. 48 and No. 49 specified in Comparison Example 4 described below, respectively.

To 100 parts by weight of a base resin (uncured resin) UVR-6410 (Trade names Manufactured by Union Carbide Co., Ltd.), was added 30.5 parts by weight (corresponding to 4.0 parts by weight based on EDA) of the inventive curative of sample No. 10 described in Table 1. The viscosity of the resultant resin composition was measured according to the procedure described in the example 2. Similarly, the viscosity measurements were also done about a resin composition, in which 34.2 parts by weight (equivalent to 4.0 parts by weight based on EDA) of a curative of sample No. 11 described in Table 1 was used instead of the curative of sample No. 10. The results of the measurement are shown in Table 6 and FIG. 50. When using the curative of sample No. 10, the prolonged pot life, which is defined as time required for the viscosity of the resin to be a double value of the initial viscosity value, was found to be 180 hours. Whereas, when using the inventive curative of sample No. 11, the prolonged pot life was more than 180 hours.

COMPARISON EXAMPLE 4

To 100 parts by weight of UVR-6410, was added 21.9 parts by weight (equivalent to 4.0 parts by weight based on EDA) of a curative of sample No. 48. The viscosity of the resultant resin composition was measured according to the procedure described in the example 2. Similarly, the viscosity measurements were also done about a resin composition, in which 19.2 parts by weight (equivalent to 4.0 parts by weight based on EDA) of a curative of sample No. 49 described in Table 3 was used instead of the curative of sample No. 48. The results are shown in Table 6 and FIG. 50. When using the curative of sample No. 48, the prolonged pot life, which is time required for the viscosity of the resin composition to be a double value of the initial viscosity value, was found to be 6 hours. Whereas, when using the curative of sample No. 49, the prolonged pot life was 2 hours.

From the comparison between the result in the example 4 and that of the comparison example 4, it is obvious that the inventive curative can prolong the pot life of the resin compositions remarkably comparing to that of other resin compositions using curatives conventionally-used.

EXAMPLE 5

Measurement of Prolonged Pot Life of Resin Compositions (Part 4)

Figure 51:
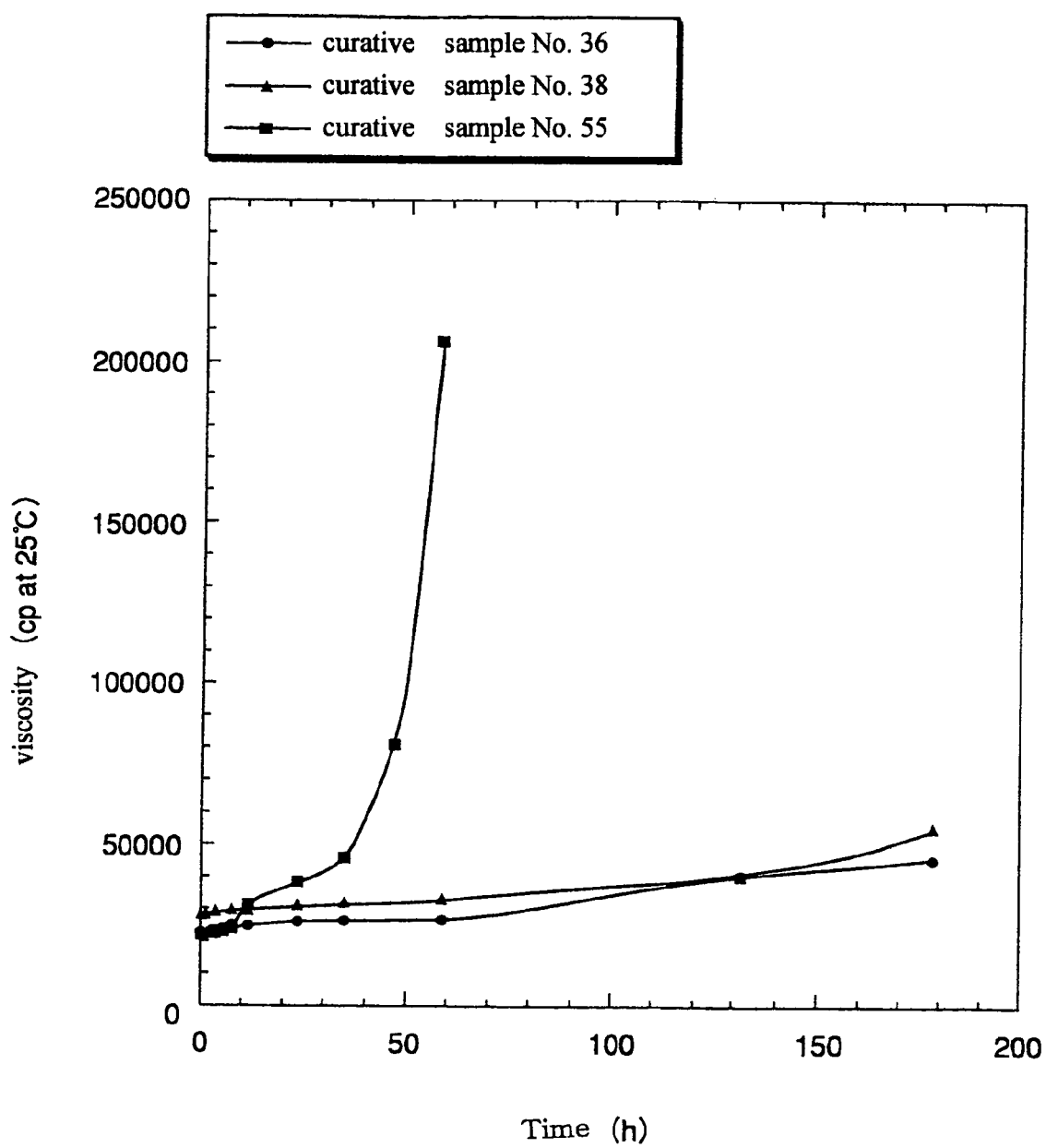
FIG. 51 shows a result of measurements of a prolonged pot life (viscosity) of the resin compositions which are using the samples No. 36 and No. 38 specified in Example 5 and the sample No. 55 specified in Comparison Example 5 described below, respectively.

To 100 parts by weight of a base resin (uncured resin) UVR-6410 (Trade name, Manufactured by Union Carbide Co., Ltd.), was added 9.46 parts by weight (equivalent to 4.0 parts by weight based on 2PZL) of the inventive curative of sample No. 36 described in Table 1. The viscosity of the resultant resin composition was measured according to the procedure described in the example 2. Similarly, viscosity measurements were also done about a resin composition, in which 10.2 parts by weight (equivalent to 4.0 parts by weight based on 2PZL) of a curative of sample No. 38 described in Table 1 was used instead of the curative of sample No. 36. The results of the measurement are shown in Table 7 and FIG. 51. When using the curative of sample No. 36, the prolonged pot life, which is defined as time required for the viscosity of the resin composition to be a double value of the initial viscosity value, was found to be 180 hours. Whereas, when using the inventive curative of sample No. 38, the-prolonged pot life was more than 180 hours.

COMPARISON EXAMPLE 5

To 100 parts by weight of UVR-6410, was added 15.1 parts by weight (equivalent to 4.0 parts by weight based on 2PZL) of a curative of sample No. 55. The viscosity of the resultant resin composition was measured according to the procedure described in the example 2. The results are shown in Table 7 and FIG. 51. When using the curative of sample No. 55, the prolonged pot life, which is time required for the viscosity of the resin composition to be a double value of the initial viscosity value, was found to be 36 hours.

From the comparison between the result in the example 5 and that of the comparison example 5, it is obvious that the inventive curative can prolong the pot life of the resin compositions remarkably comparing to that of other resin compositions using curatives conventionally-used.

TABLE 6

| | Viscosity of Resin Composition (cp/25° C.) | | | |
|---|---|---|---|---|
| Time (h) | Resin Composition Sample No. 10 | Resin Composition Sample No. 11 | Resin Composition Sample No. 48 | Resin Composition Sample No. 49 |
| 0 | 52800 | 42000 | 45800 | 30500 |
| 1 | 52800 | 42000 | 58200 | 44400 |
| 2 | | | 63700 | 68500 |
| 4 | 53000 | 43000 | 73800 | 135000 |
| 6 | | | 94300 | 288000 |
| 8 | 53000 | 43200 | 106000 | |
| 12 | 53400 | 43700 | | |
| 24 | 53400 | 43900 | | |
| 36 | 53400 | 44900 | | |
| 60 | 55200 | 46600 | | |
| 132 | 62100 | 50100 | | |
| 180 | 109000 | 67900 | | |

TABLE 7

| | Viscosity of Resin Composition (cp/25° C.) | | |
|---|---|---|---|
| Time (h) | Resin Composition Sample No. 36 | Resin Composition Sample No. 38 | Resin Composition Sample No. 55 |
| 0 | 40500 | 35100 | 37100 |
| 1 | 42800 | 35300 | 38700 |
| 2 | | 38100 | 44400 |
| 4 | 43000 | 41900 | 63900 |
| 6 | | 48800 | 86000 |
| 8 | 44200 | 67900 | 94300 |
| 10 | | 78000 | |
| 12 | 54300 | 94300 | |
| 24 | 80500 | | |
| 36 | 149000 | | |

EXAMPLE 6

Measurement of Prolonged Pot Life of Resin Compositions (Part 5)

Figure 52:
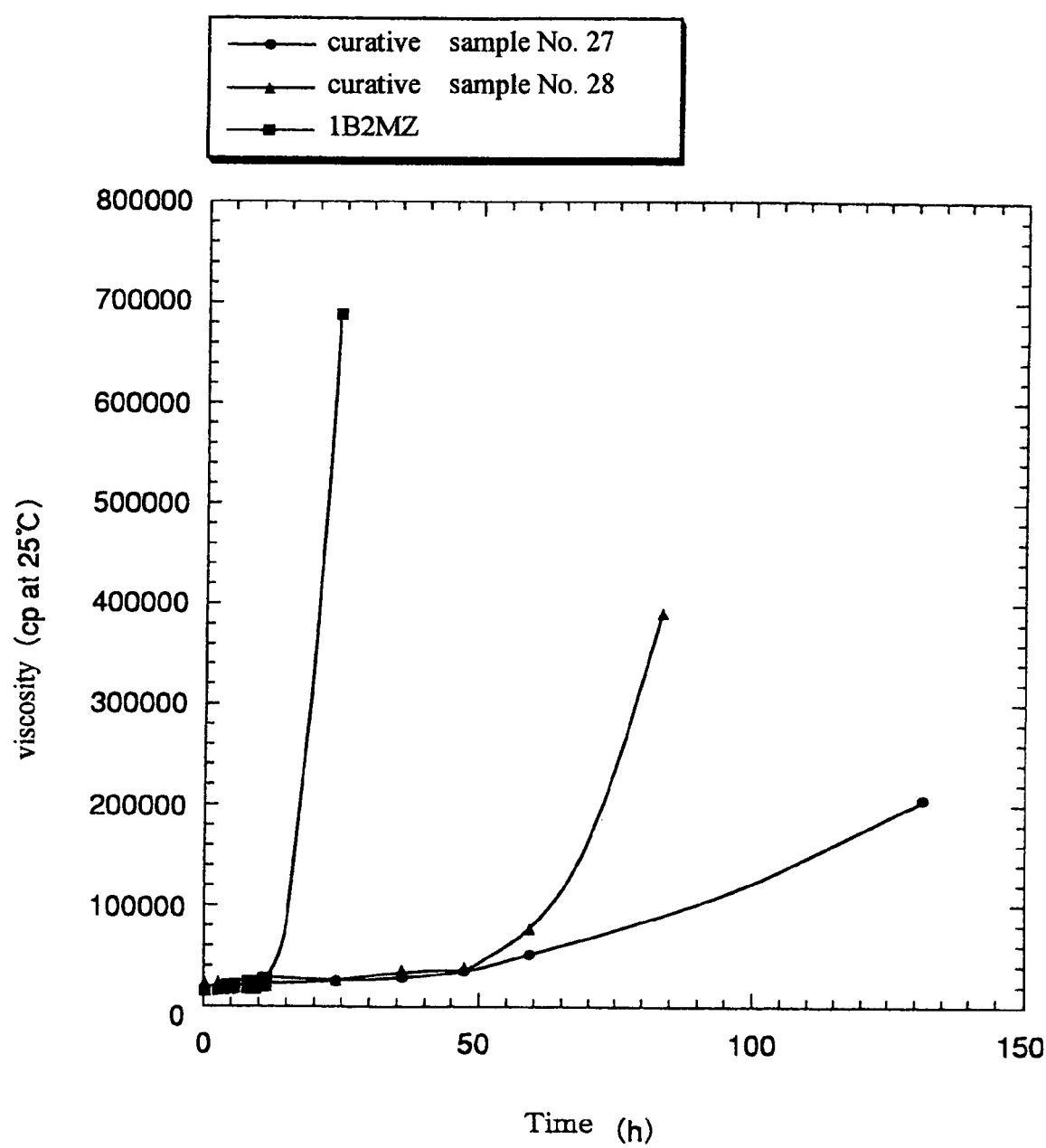
FIG. 52 shows a result of measurements of a prolonged pot life (viscosity) of the resin compositions which are using the samples No. 27 and No. 28 specified in Example 6 and 1B2MZ specified in Comparison Example 6 described below, respectively.

To 100 parts by weight of a base resin (uncured resin) UVR-6410 (Trade name, Manufactured by Union Carbide Co., Ltd.), was added 8.62 parts by weight (equivalent to 4.0 parts by weight based on 1B2MZ) of the inventive curative of sample No. 27 described in Table 1. The viscosity of the resultant resin composition was measured according to the procedure described in the example 2. Similarly, viscosity measurements were also done about a resin composition, in which 6.64 parts by weight (equivalent to 4.0 parts by weight based on 1B2MZ) of a curative of sample No. 28 described in Table 1 was used instead of the curative of sample No. 27. The results of the measurement are shown in Table 8 and FIG. 52. When using the curative of sample No. 27, the prolonged pot life, which is defined as time required for the viscosity of the resin composition to be a double value of the initial viscosity value, was found to be 60 hours. Whereas, when using the inventive curative of sample No. 28, the prolonged pot life was 36 hours.

COMPARISON EXAMPLE 6

To 100 parts by weight of UVR-6410, was added 4.0 parts by weight (equivalent to 4.0 parts by weight based on 1B2MZ) of a curative of sample No. 55. The viscosity of the resultant resin composition was measured according to the procedure described in the example 2. The results are shown in Table 8 and FIG. 52. When using 1B2MZ, the prolonged pot life, which is time required for the viscosity of the resin composition to be a double value of the initial viscosity value, was found to be 10 hours.

From the comparison between the result in the example 6 and that of the comparison example 6, it is obvious that the pot life of the resin compositions can be prolonged remarkably by means of using the inventive curatives.

TABLE 8

| | Viscosity of Resin Composition (cp/25° C.) | | |
|---|---|---|---|
| Time (h) | Resin Composition Sample No. 27 | Resin Composition Sample No. 28 | Resin Composition Compounded with 1B2MZ |
| 0 | 17300 | 19600 | 10200 |
| 1 | 17300 | 20000 | 10200 |
| 2 | | | 10700 |
| 4 | 17400 | 22300 | 12400 |
| 6 | | | 14800 |
| 8 | 17400 | 22800 | 16700 |
| 10 | | | 20400 |
| 12 | 17800 | 25300 | 27100 |
| 24 | 23700 | 25300 | 689000 |
| 36 | 28500 | 34500 | |
| 48 | 35000 | 35100 | |
| 60 | 52000 | 78900 | |
| 84 | | 392000 | |
| 132 | 20700 | | |
| 180 | | | |

EXAMPLE 7

Measurement of Curing Temperature of Resin Compositions (Part 1)

Figure 53:
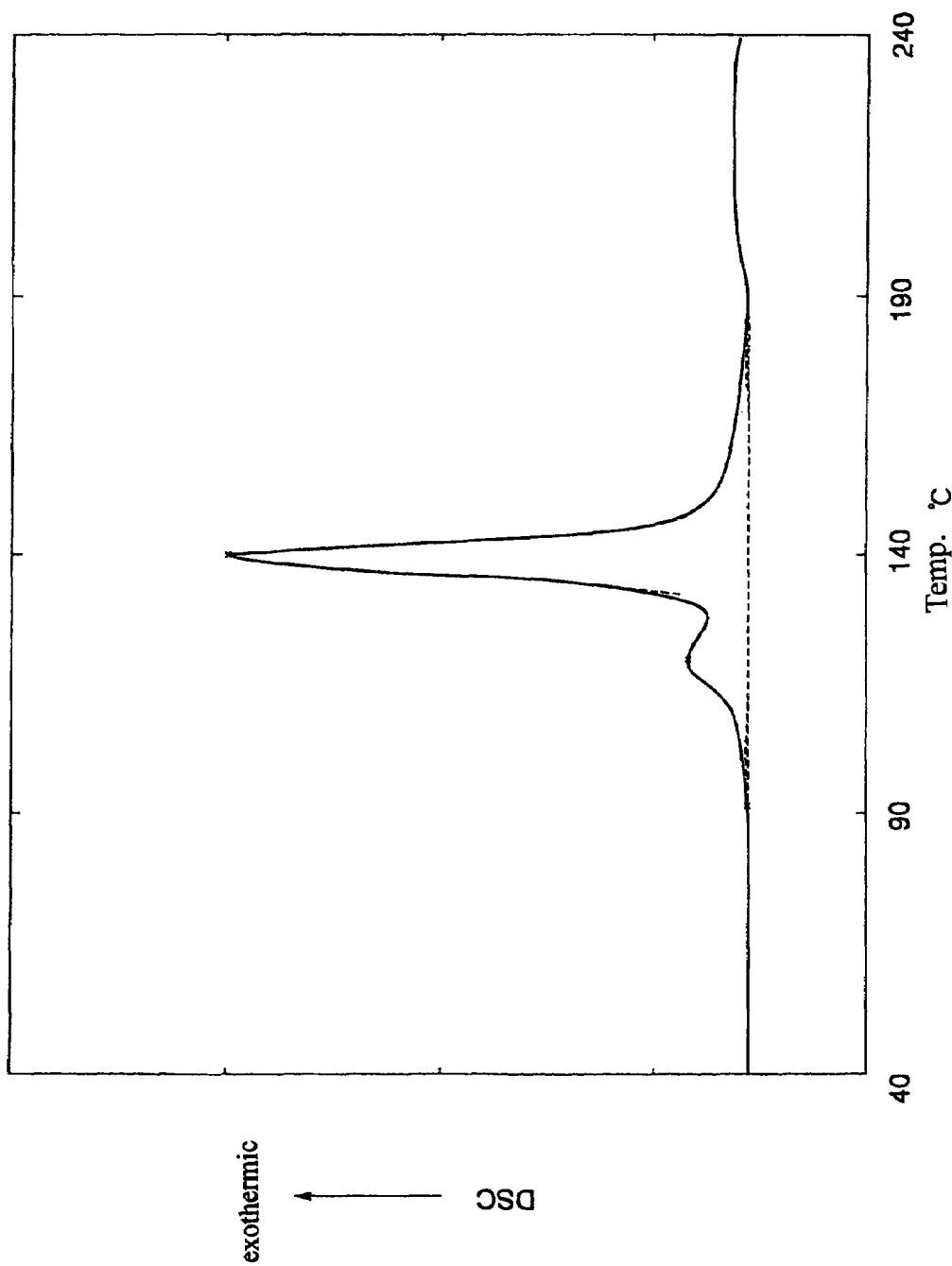
FIG. 53 shows a DSC chart of the resin composition containing the sample No. 32, which is specified in Example 7 described below.
Figure 54:
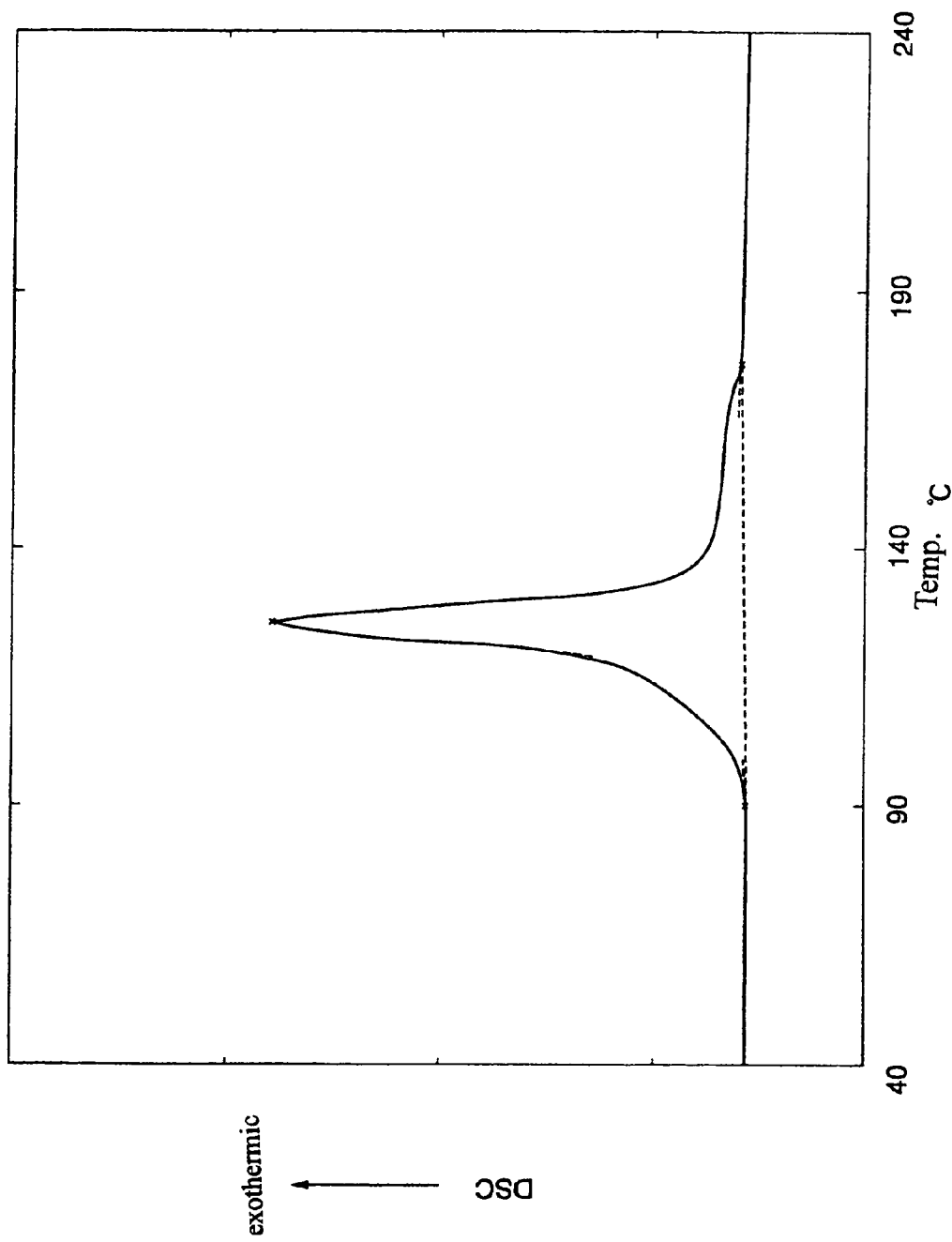
FIG. 54 shows a DSC chart of the resin composition containing the sample No. 33, which is specified in Example 7 described below.

To 100 parts by weight of a base resin (uncured resin) UVR-6410 (Trade name, Manufactured by Union Carbide Co., Ltd.), was added 13.7 parts by weight (equivalent to 4.0 parts by weight based on 2MZ) of the inventive curative of sample No. 32 described in Table 1. After kneading the resulting resin composition for 10 min. at 25° C., the part thereof was collected and its curing temperature was determined by measuring the heat generated from the resin composition during the curing reaction by using a differential scanning calorimeter (DSC) under nitrogen gas flow at 30 ml/min. and at a temperature elevation rate of 10° C./min. As a result, it was found that the curing initiation temperature of the resin composition was 93° C. and the peak of heat generated during the reaction was 140° C. The DSC chart of the resin composition is shown in FIG. 53. Similarly, DSC measurements were also made for a resin composition, wherein 15.1 parts by weight (equivalent to 4.0 parts by weight based on 2MZ) of a curative of sample No. 33 is used instead of the curative of sample No. 32, and it was demonstrated that the curing initiation temperature of the later resin composition was 90° C. and the peak of heat generated during the reaction was 126° C. The DSC chart of the later resin composition is shown in FIG. 54.

COMPARISON EXAMPLE 7

Figure 55:
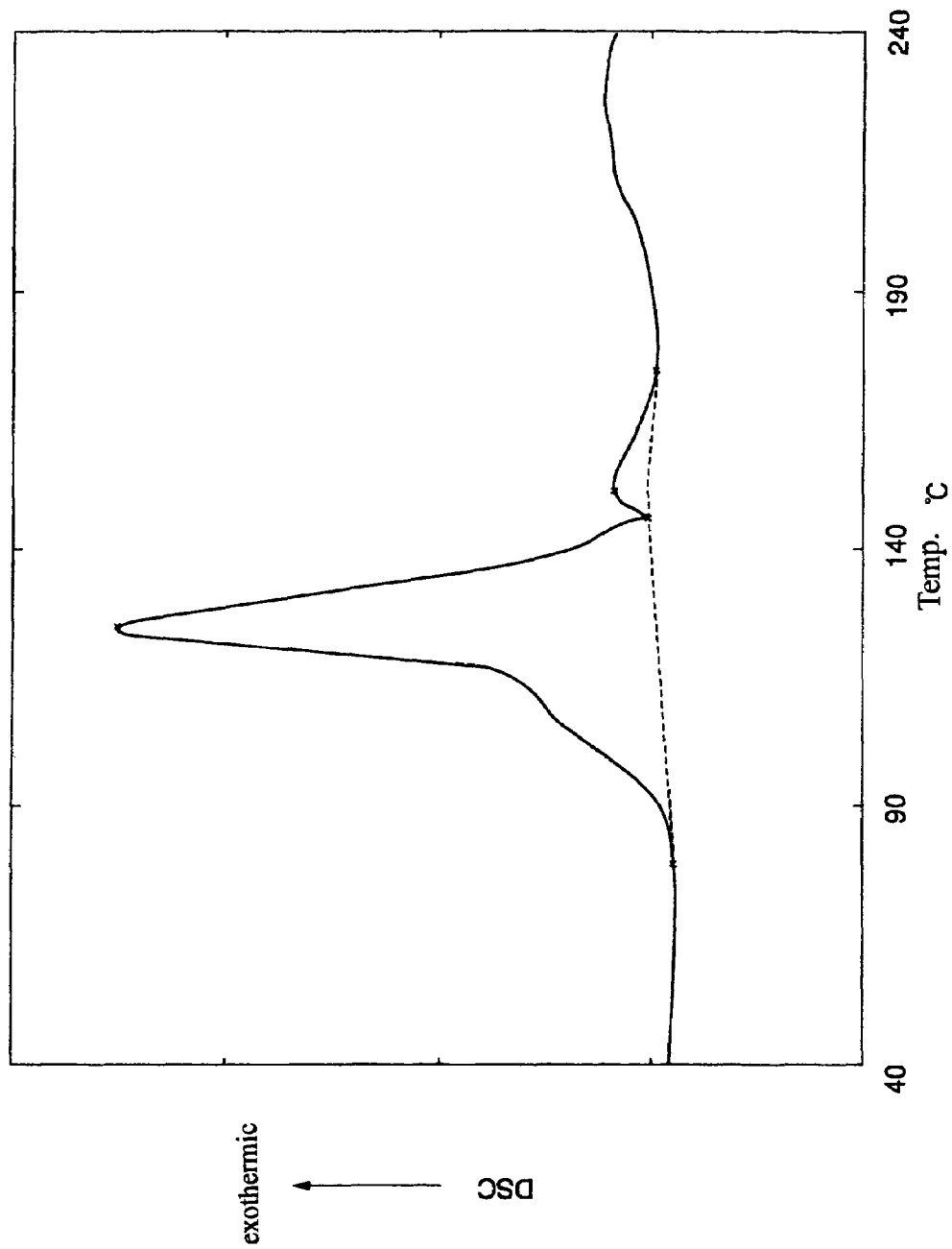
FIG. 55 shows a DSC chart of the resin composition containing the sample No. 53, which is specified in Comparison Example 7 described below.
Figure 56:
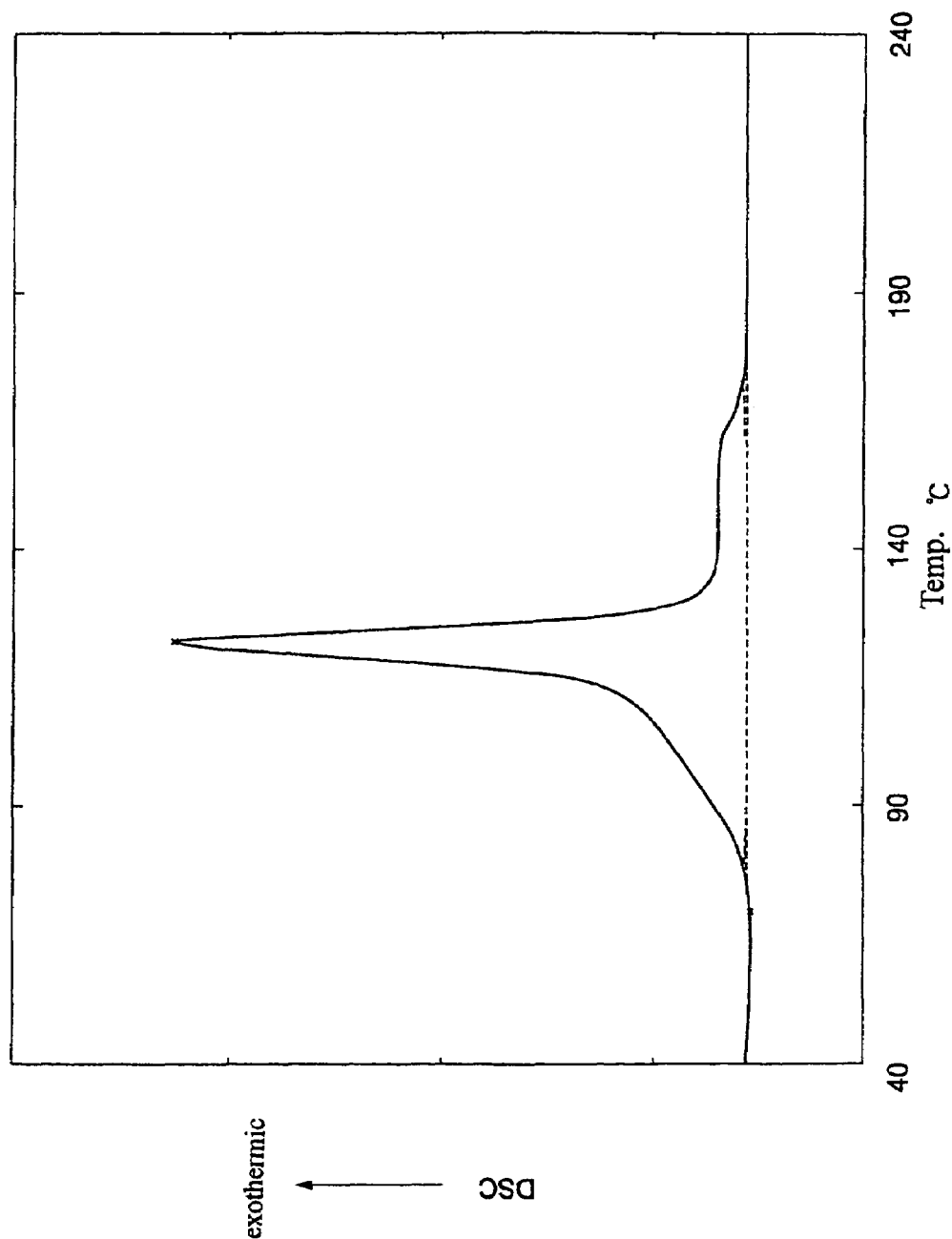
FIG. 56 shows a DSC chart of the resin composition containing the sample No. 54, which is specified in Comparison Example 7 described below.

To 100 parts by weight of UVR-6410, was added 17.1 parts by weight (equivalent to 4.0 parts by weight based on 2MZ) of a curative of sample No. 53 described in Table 3. The curing temperature of the resulting resin composition was measured according to the procedure described in the example 7. As a result, it was found that the curing initiation temperature of the resin composition was 79° C. and the peak of heat generated during the reaction was 126° C. The DSC chart of the resin composition is shown in FIG. 55. Similarly, DSC measurements were also made for a resin composition, wherein 15.1 parts by weight (equivalent to 4.0 parts by weight based on 2MZ) of a curative of sample No. 54 was used instead of the curative of sample No. 53, and it was demonstrated that the curing initiation temperature of the later resin composition was 71° C. and the peak of heat generated during the reaction was 122° C. The DSC chart of the later resin composition is shown in FIG. 56.

From the comparison between the result in the example 7 and that of the comparison example 7, it was shown that the thermal stability of the resin compositions using a curative conventionally-used, the sample Nos. 53 or 54, was damaged, because the curing reaction has already started from a low temperature lower than 80° C. On the other hand, both resin compositions using a curative of sample No. 32 or No. 33 according to the present invention have a curing-initiation temperature higher than 90° C., respectively, and it is obviously understood that the thermal stability of the inventive resin compositions are well secured and the inventive curatives have excellent curing activity at a favorable temperature range of from 125 to 140° C.

EXAMPLE 8

Measurement of Curing Temperature of Resin Compositions (Part 2)

Figure 57:
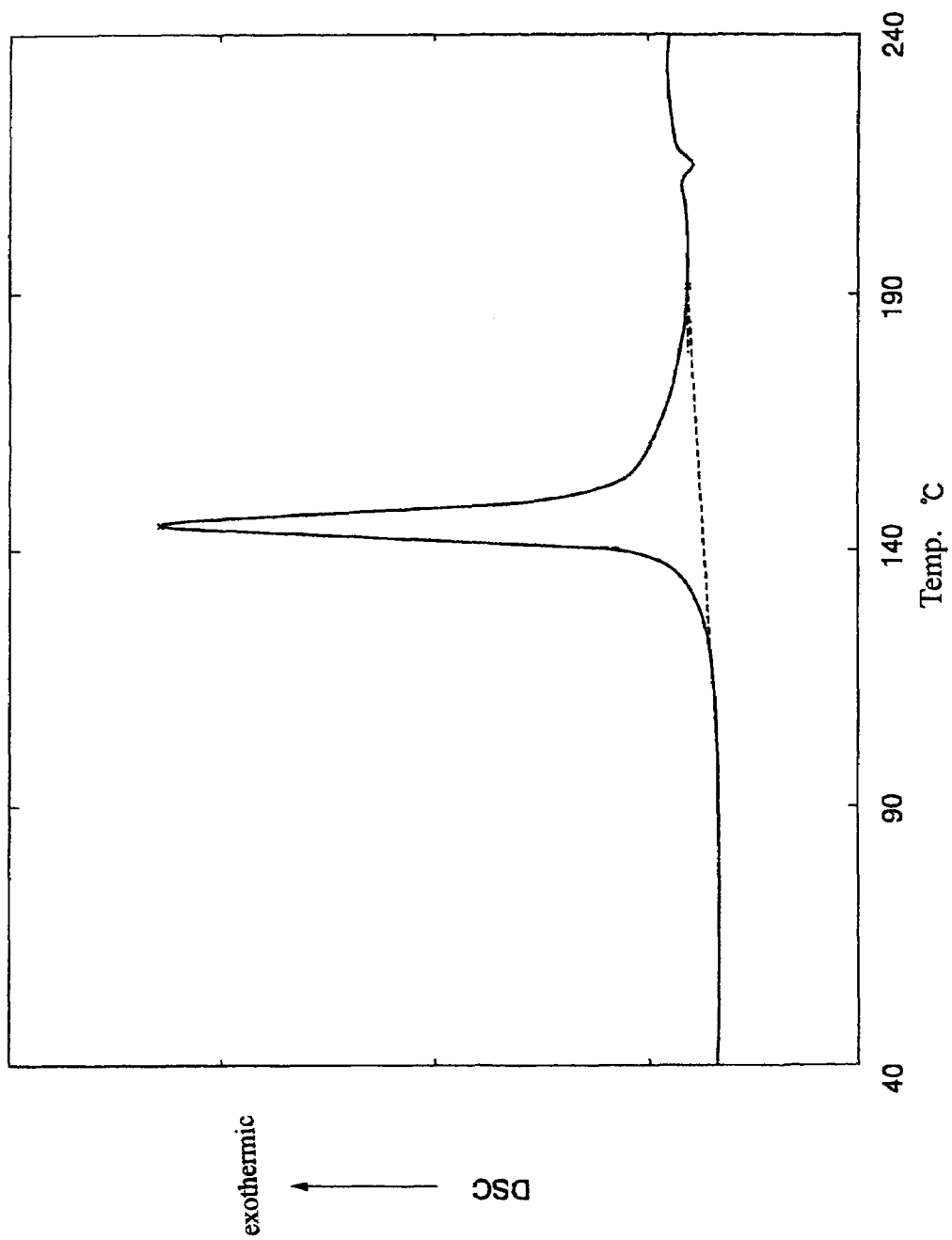
FIG. 57 shows a DSC chart of the resin composition containing the sample No. 24, which is specified in Example 8 described below.

To 100 parts by weight of a base resin (uncured resin) UVR-6410 (Trade name, Manufactured by Union Carbide Co., Ltd.), was added 11.2 parts by weight (equivalent to 4.0 parts by weight based on 2E4MZ) of the inventive curative of sample No. 24 described in Table 1. The curing temperature of the resulting resin composition was measured according to the procedure described in the example 7. As a result, it was found that the curing initiation temperature of the resin composition was 125° C. and the peak of heat generated during the reaction was 146° C. The DSC chart of the resin composition is shown in FIG. 57.

COMPARISON EXAMPLE 8

Figure 58:
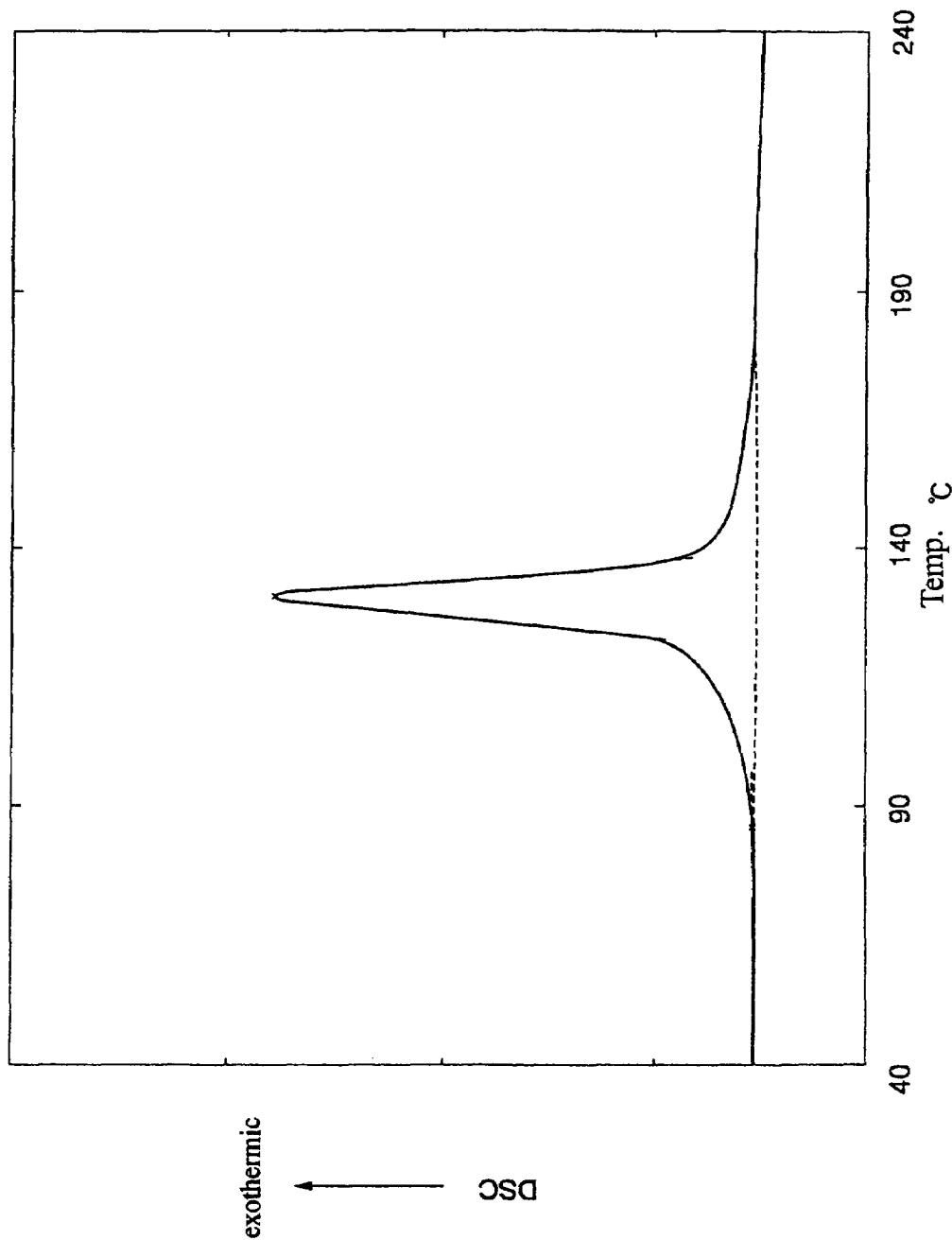
FIG. 58 shows a DSC chart of the resin composition containing the sample No. 50, which is specified in Comparison Example 8 described below.

To 100 parts by weight of UVR-6410, was added 13.7 parts by weight (equivalent to 4.0 parts by weight based on 2E4MZ) of a curative of sample No. 50 described in Table 3. The curing temperature of the resulting resin composition was measured according to the procedure described in the example 7. As a result, it was found that the curing initiation temperature of the resin composition was 80° C. and the peak of heat generated during the reaction was 130° C. The DSC chart of the resin composition is shown in FIG. 58.

From the comparison between the result in the example 8 and that of the comparison example 8, it is shown that the thermal stability of the resin composition using a curative of sample No. 50 conventionally-used was damaged, because the curing reaction had already started from a low temperature of 80° C. On the other hand, the resin compositions using the curative of sample No. 24 according to the present invention have a curing-initiation temperature higher than 90° C., and it is obviously understood that the thermal stability of the inventive resin compositions is well secured and the inventive curative has an excellent curing activity at a favorable temperature of approximately 145° C.

EXAMPLE 9

Measurement of Curing Temperature of Resin Compositions (Part 3)

Figure 59:
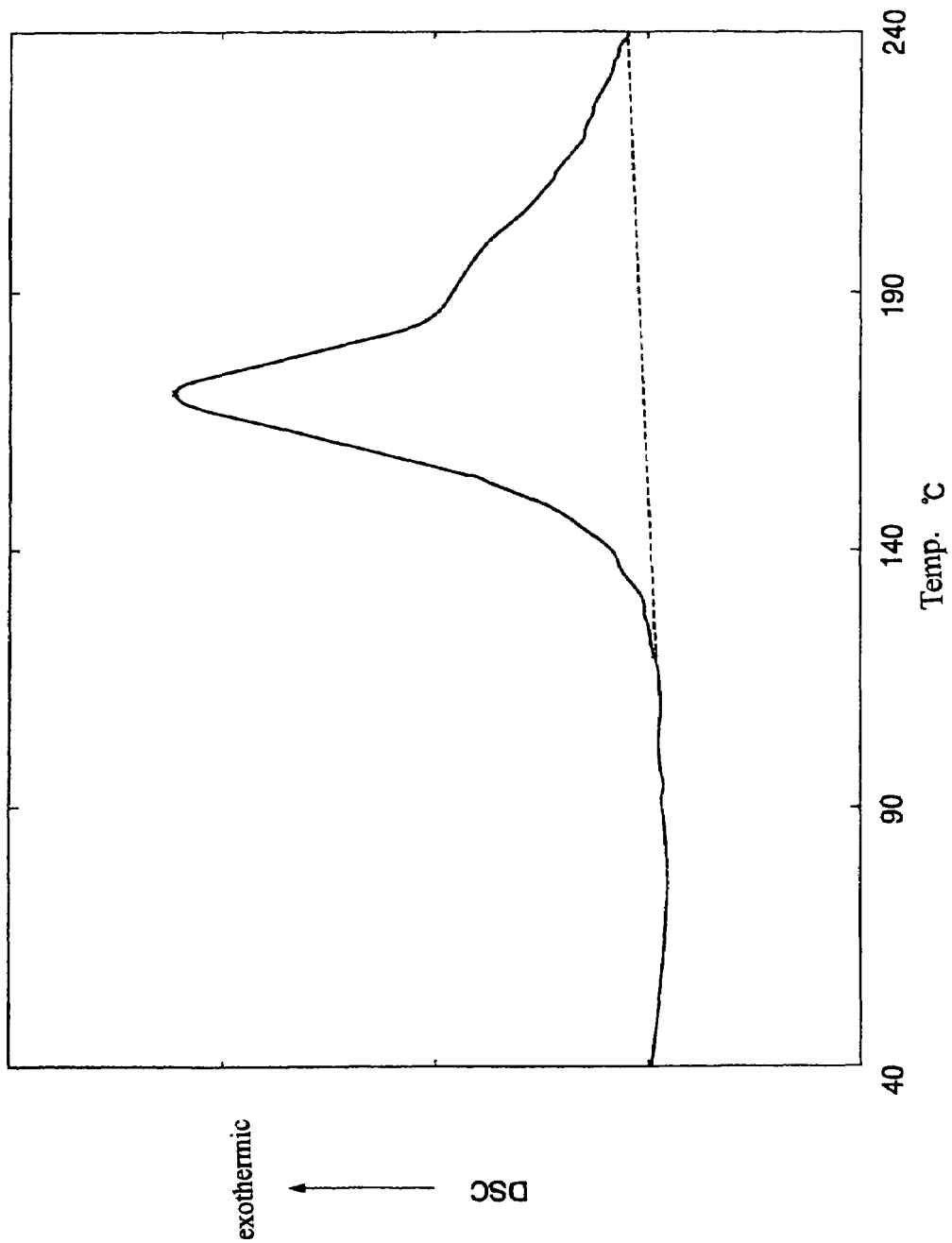
FIG. 59 shows a DSC chart of the resin composition containing the sample No. 10, which is specified in Example 9 described below.
Figure 60:
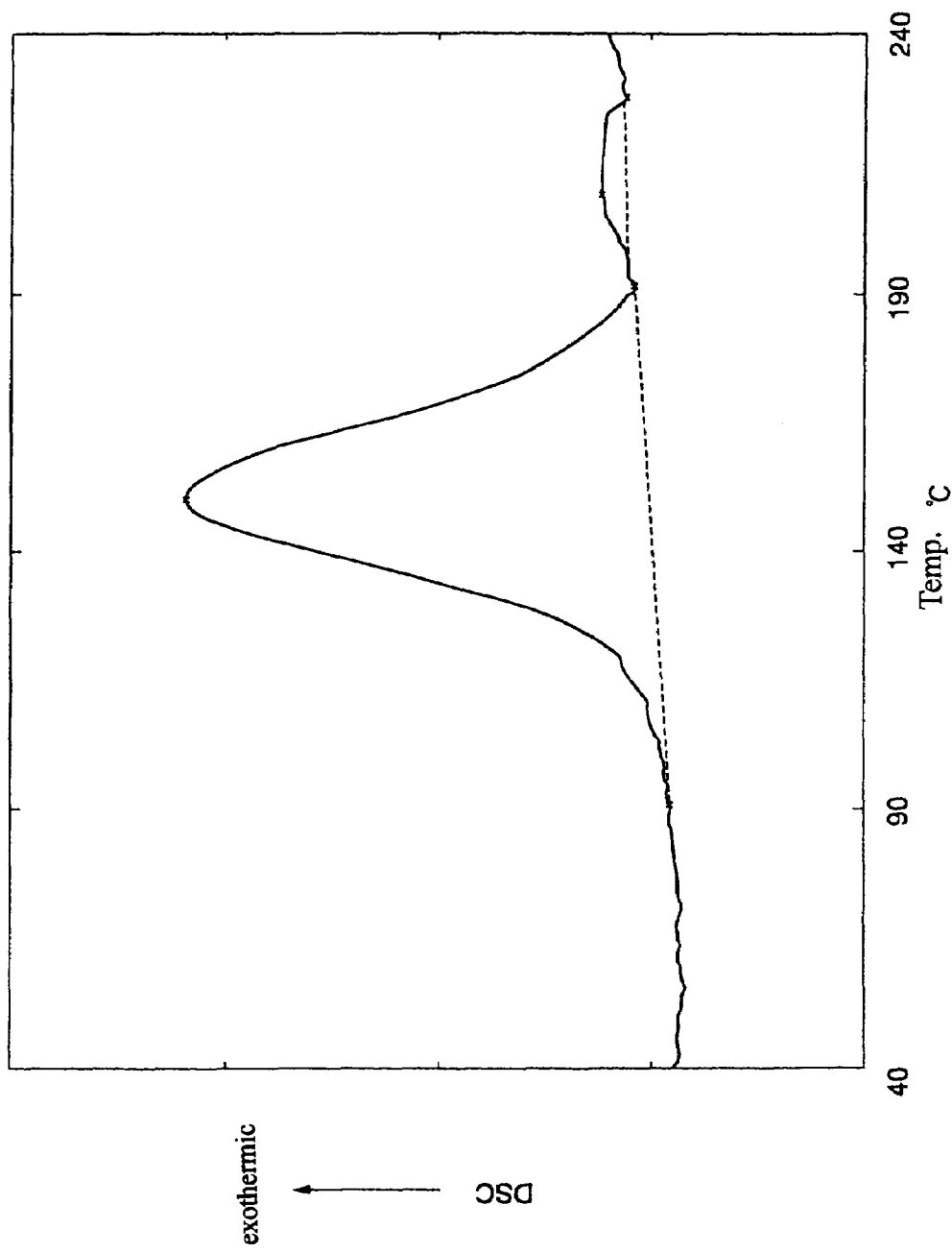
FIG. 60 shows a DSC chart of the resin composition containing the sample No. 11, which is specified in Example 9 described below.

To 100 parts by weight of a base resin (uncured resin) UVR-6410 (Trade name, Manufactured by Union Carbide Co., Ltd.), was added 30.5 parts by weight (equivalent to 4.0 parts by weight based on EDA) of the inventive curative of sample No. 10 described in Table 1. The curing temperature of the resulting resin composition was measured according to the procedure described in the example 7. As a result, it was found that the curing initiation temperature of the resin composition was 117° C. and the peak of heat generated during the reaction was 165° C. The DSC chart of the resin composition is shown in FIG. 59. Similarly, measurements of curing temperature were also made for a resin composition, wherein 34.2 parts by weight (equivalent to 4.0 parts by weight based on EDA) of a curative of sample No. 11 described in Table 1 was used instead of the curative of sample No. 10, and it was demonstrated that the curing initiation temperature of the later resin composition was 104° C. and the peak of heat generated during the reaction was 150° C. The DSC chart of the later resin composition is shown in FIG. 60.

COMPARISON EXAMPLE 9

Figure 61:
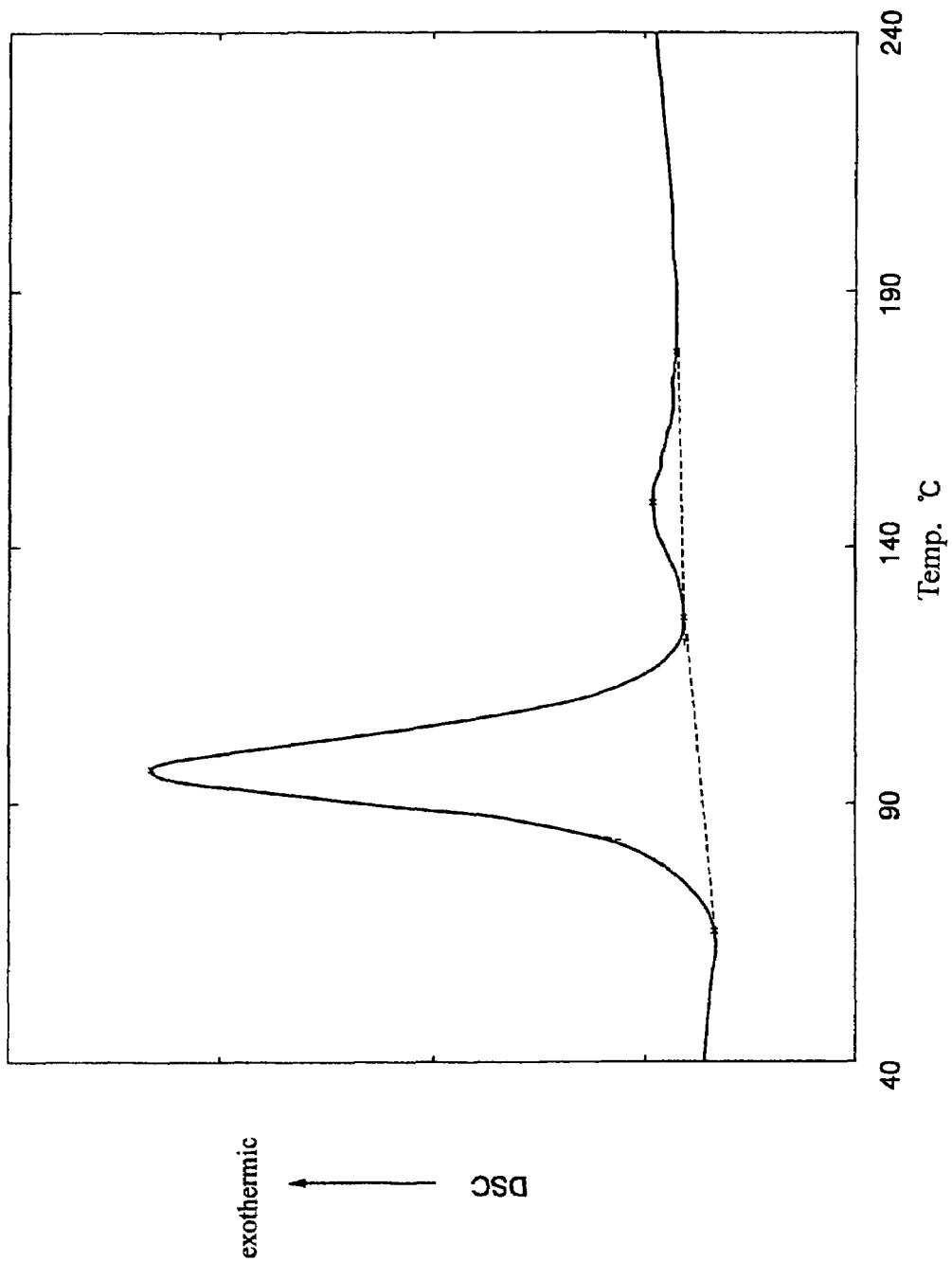
FIG. 61 shows a DSC chart of the resin composition containing the sample No. 48, which is specified in Comparison Example 9 described below.
Figure 62:
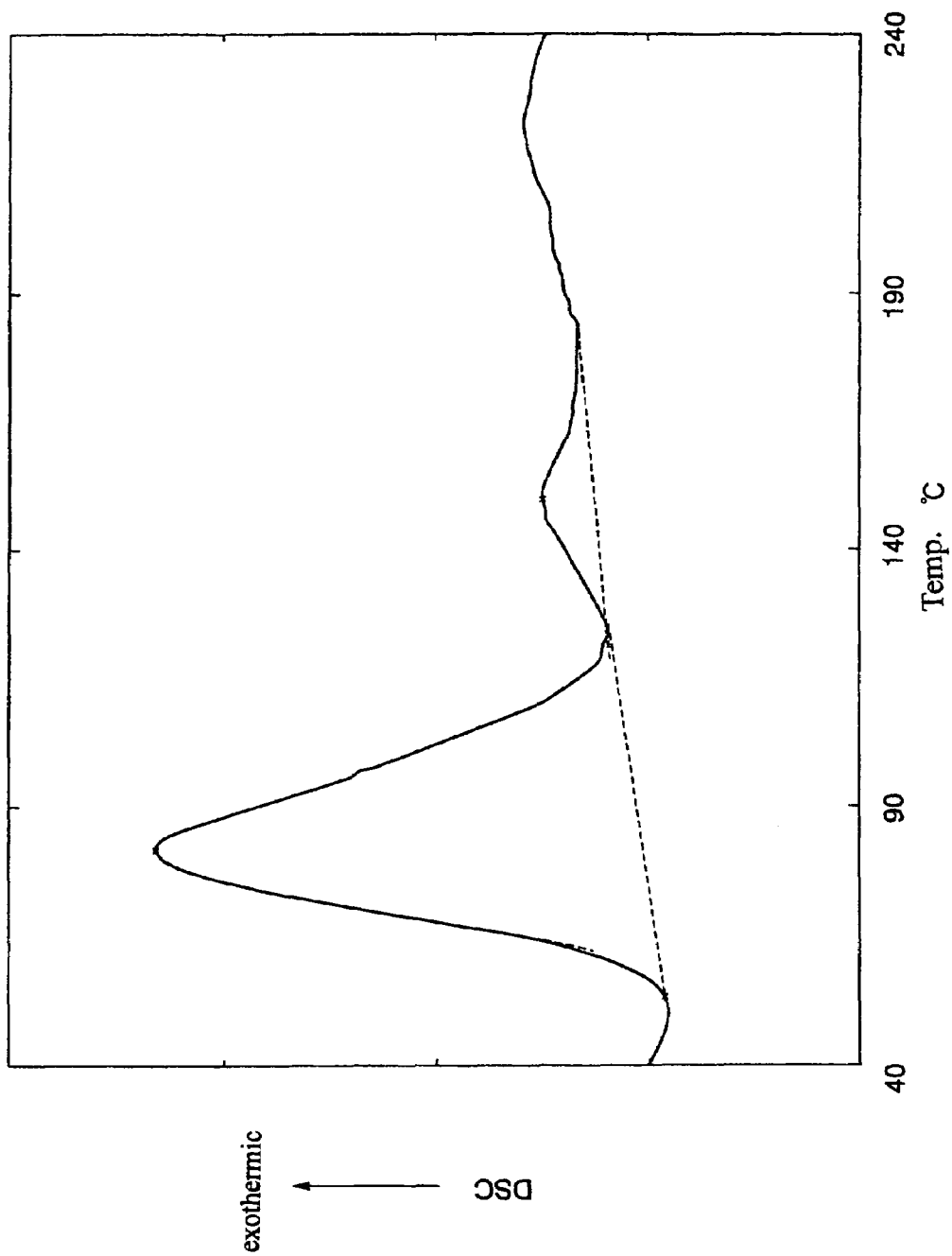
FIG. 62 shows a DSC chart of the resin composition containing the sample No. 49, which is specified in Comparison Example 9 described below.

To 100 parts by weight of UVR-6410, was added 21.9 parts by weight (equivalent to 4.0 parts by weight based on EDA) of a curative of sample No. 48 described in Table 3. The curing temperature of the resulting resin composition was measured according to the procedure described in the example 7. As a result, it was found that the curing initiation temperature of the resin composition was 65° C. and the peak of heat generated during the reaction was 97° C. The DSC chart of the resin composition is shown in FIG. 61. Similarly, measurements of curing temperature were also made for a resin composition, wherein 19.2 parts by weight (equivalent to 4.0 parts by weight based on EDA) of a curative of sample No. 49 described in Table 3 was used instead of the curative of sample No. 48, and it was demonstrated that the curing initiation temperature of the later resin composition was 51° C. and the peak of heat generated during the reaction was 81° C. The DSC chart of the later resin composition is shown in FIG. 62.

From the comparison between the result in the example 9 and that of the comparison example 9, it is shown that the thermal stability of both resin compositions using curatives conventionally-used, the sample Nos. 48 and 49, respectively, was damaged, because the curing reactions had already started from a low temperature lower than 65° C. On the other hand, both resin compositions using the curatives of sample Nos. 10 and 11 according to the present invention have a curing initiation temperature higher than 90° C., respectively, and it is obviously understood that the thermal stability of the inventive resin compositions are well secured and the inventive curatives have excellent curing activity at a favorable temperature range of from 150 to 165° C.

EXAMPLE 10

Measurement of Curing Temperature of Resin Compositions (Part 4)

Figure 63:
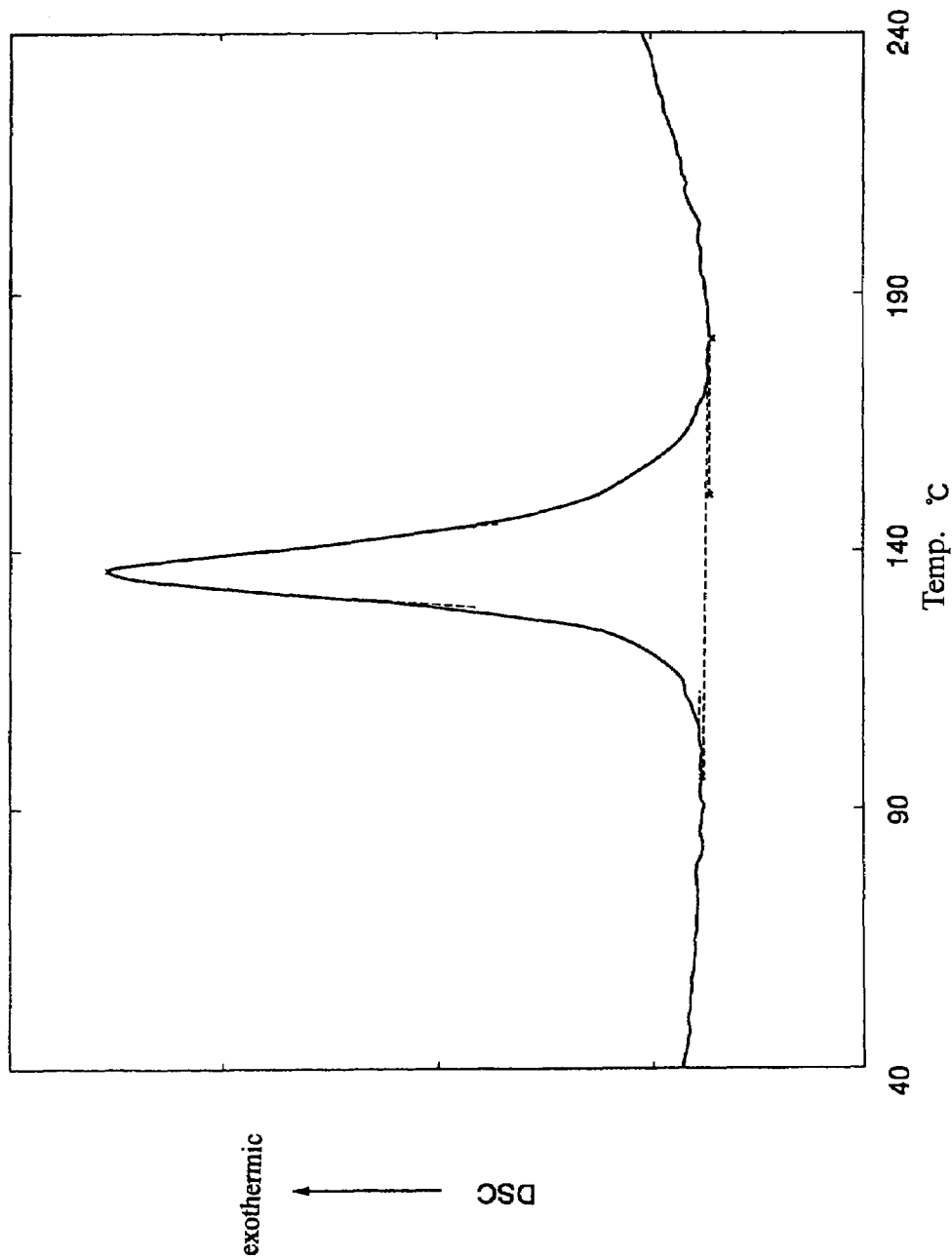
FIG. 63 shows a DSC chart of the resin composition containing the sample No. 36, which is specified in Example 10 described below.
Figure 64:
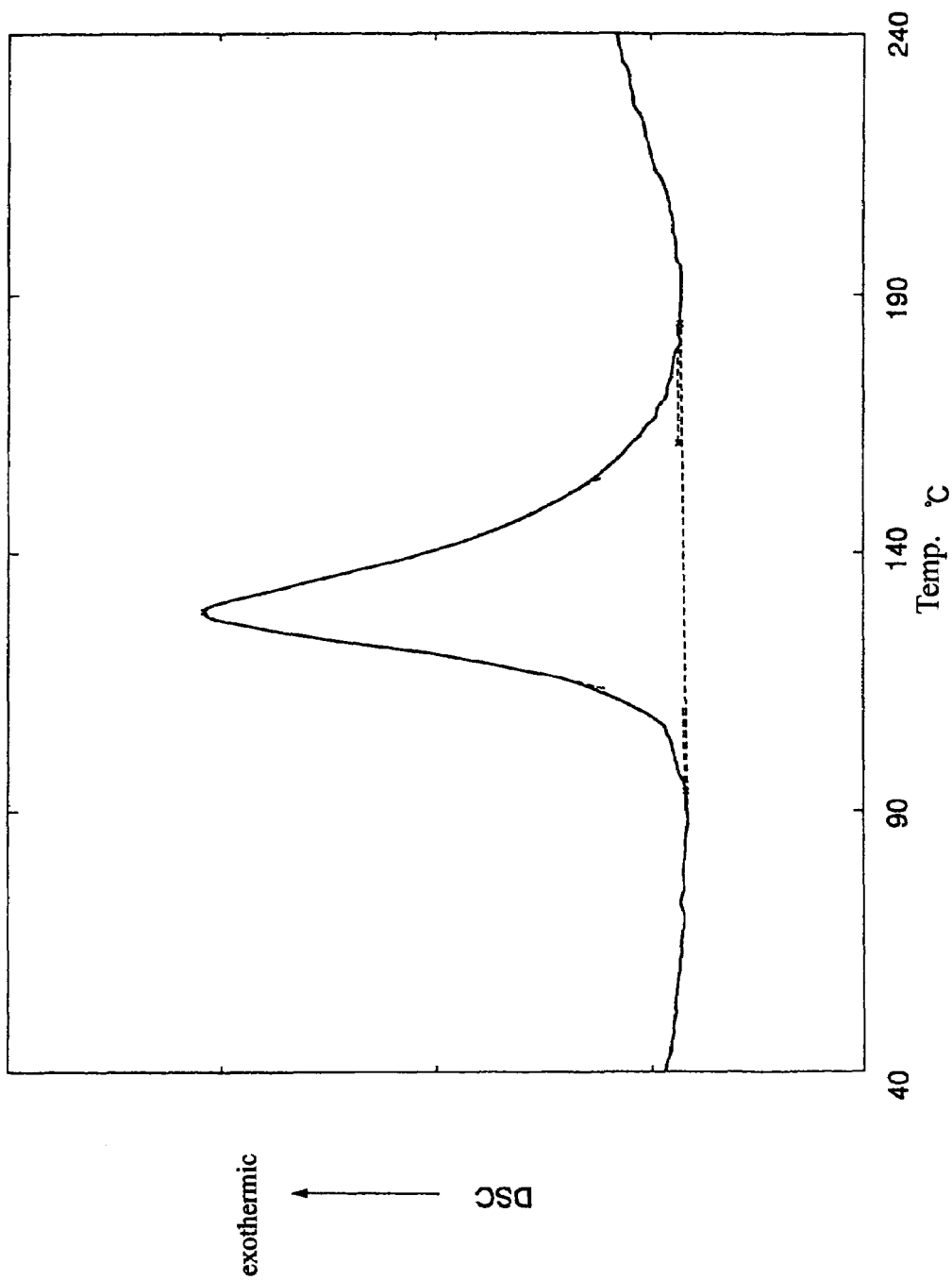
FIG. 64 shows a DSC chart of the resin composition containing the sample No. 38, which is specified in Example 10 described below.

To 100 parts by weight of a base resin (uncured resin) UVR-6410 (Trade name, Manufactured by Union Carbide Co., Ltd.), was added 9.46 parts by weight (equivalent to 4.0 parts by weight based on 2PZL) of the inventive curative of sample No. 36 described in Table 1. The curing temperature of the resulting resin composition was measured according to the procedure described in the example 7. As a result, it was found that the curing initiation temperature of the resin composition was 100° C. and the peak of heat generated during the reaction was 136° C. The DSC chart of the resin composition is shown in FIG. 63. Similarly, measurements of curing temperature were also made for a resin composition, wherein 10.2 parts by weight (equivalent to 4.0 parts by weight based on 2PZL) of a curative of sample No. 38 described in Table 1 was used instead of the curative of sample No. 36, and it was demonstrated that the curing initiation temperature of the later resin composition was 93° C. and the peak of heat generated during the reaction was 129° C. The DSC chart of the later resin composition is shown in FIG. 64.

COMPARISON EXAMPLE 10

Figure 65:
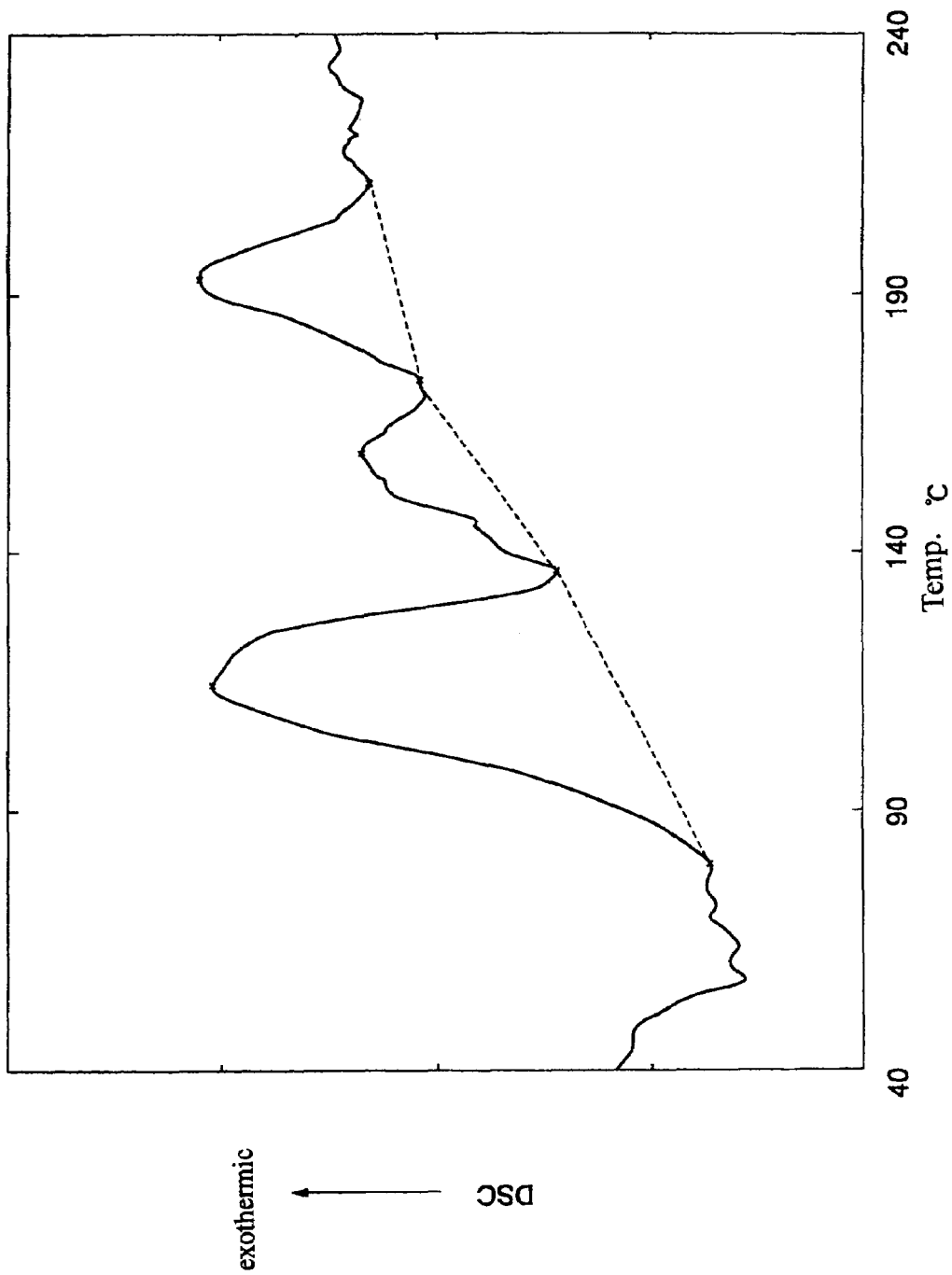
FIG. 65 shows a DSC chart of the resin composition containing the sample No. 55, which is specified in Comparison Example 10 described below.
Figure 66:
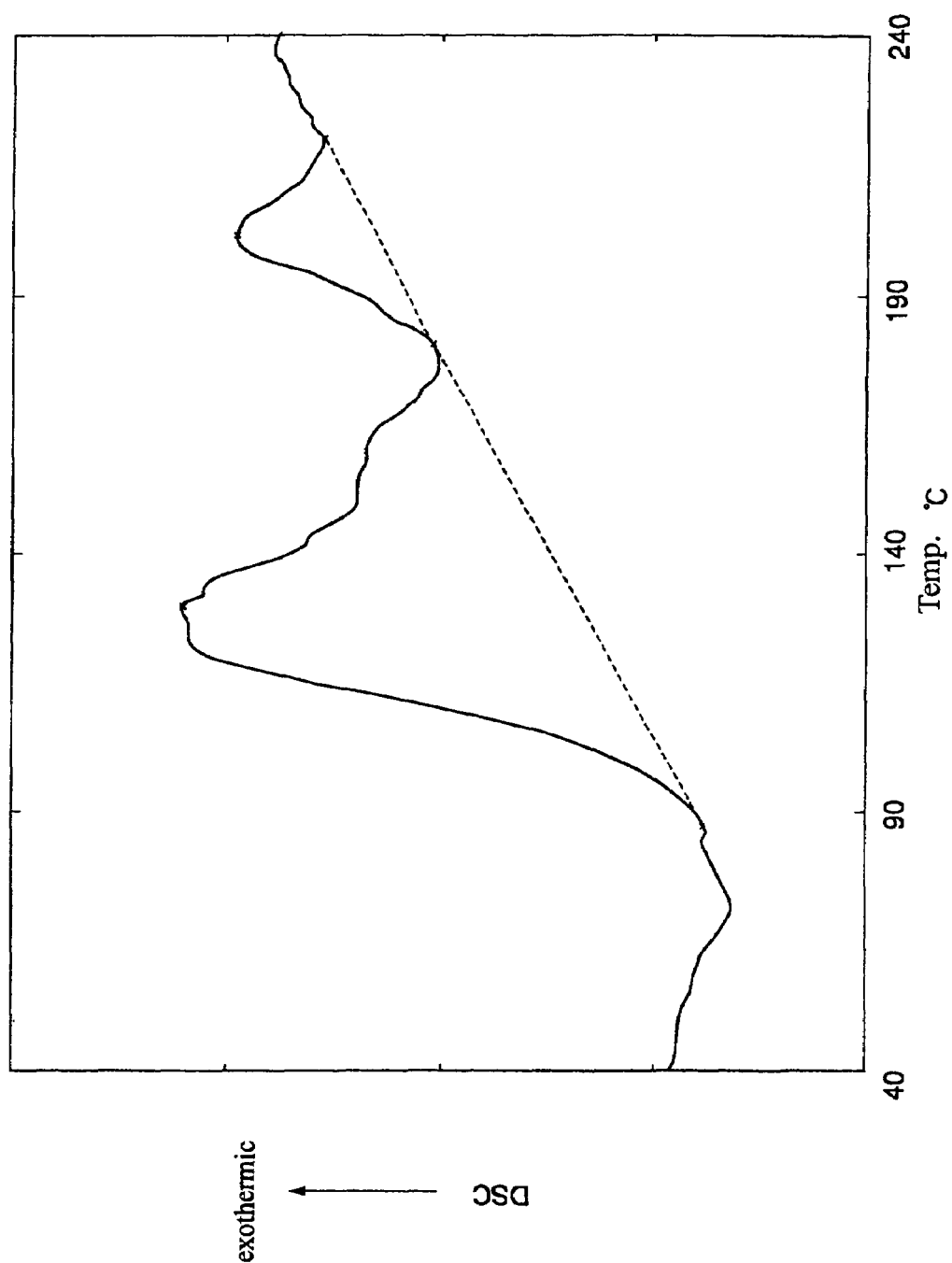
FIG. 66 shows a DSC chart of the resin composition containing the sample No. 56, which is specified in Comparison Example 10 described below.

To 100 parts by weight of UVR-6410, was added 15.1 parts by weight (equivalent to 4.0 parts by weight based on 2PZL) of a curative of sample No. 55 described in Table 3. The curing temperature of the resulting resin composition was measured according to the procedure described in the example 7. As a result, it was found that the curing initiation temperature of the resin composition was 79° C. and the peak of heat generated during the reaction was located at three points of 114° C., 160° C. and 193° C. The DSC chart of the resin composition is shown in FIG. 65. Similarly, measurements of curing temperature were also made for a resin composition, wherein a curative of sample No. 56 was used instead of the curative of sample No. 55, and it was demonstrated that the curing initiation temperature of the later resin composition was 85° C. and the peak of heat generated during the reaction was located at two points of 130° C. and 202° C. The DSC chart of the later resin composition is shown in FIG. 66.

From the comparison between the result in the example 10 and that of the comparison example 10, it is shown that the thermal stability of both resin compositions using curatives conventionally-used, the sample Nos. 55 and 56, respectively, was damaged, because the curing reactions had already started from a low temperature lower than 85° C. On the other hand, both resin compositions using the curatives of sample Nos. 36 and 38 according to the present invention have a curing initiation temperature higher than 90° C., respectively, and it is obviously understood that the thermal stability of the inventive resin compositions are well secured and the inventive curatives have excellent curing activity at a favorable temperature range of from 130 to 135° C.

EXAMPLE 11

Measurement of Curing Temperature of Resin Compositions (Part 5)

Figure 67:
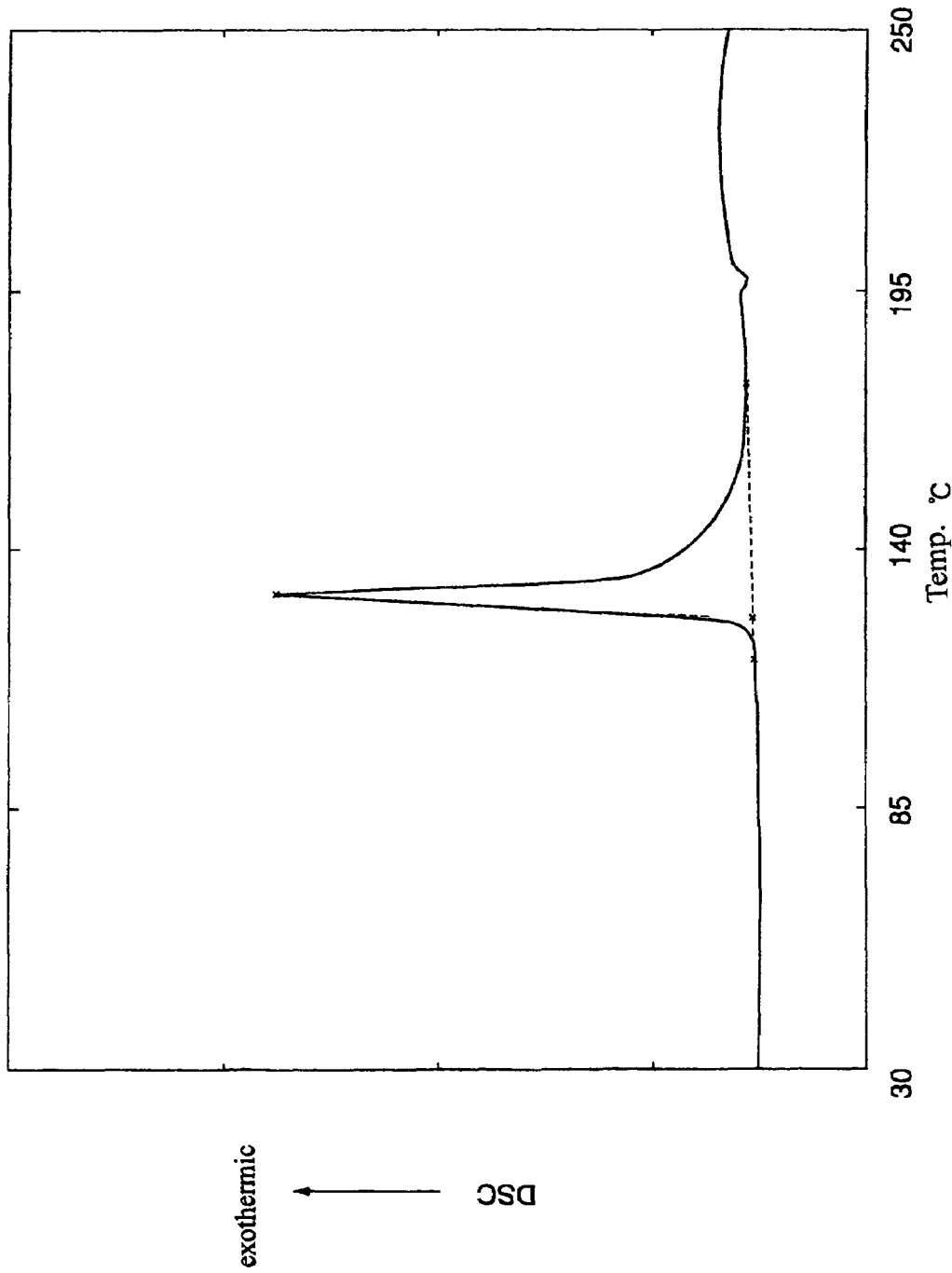
FIG. 67 shows a DSC chart of the resin composition containing the sample No. 27, which is specified in Example 11 described below.
Figure 68:
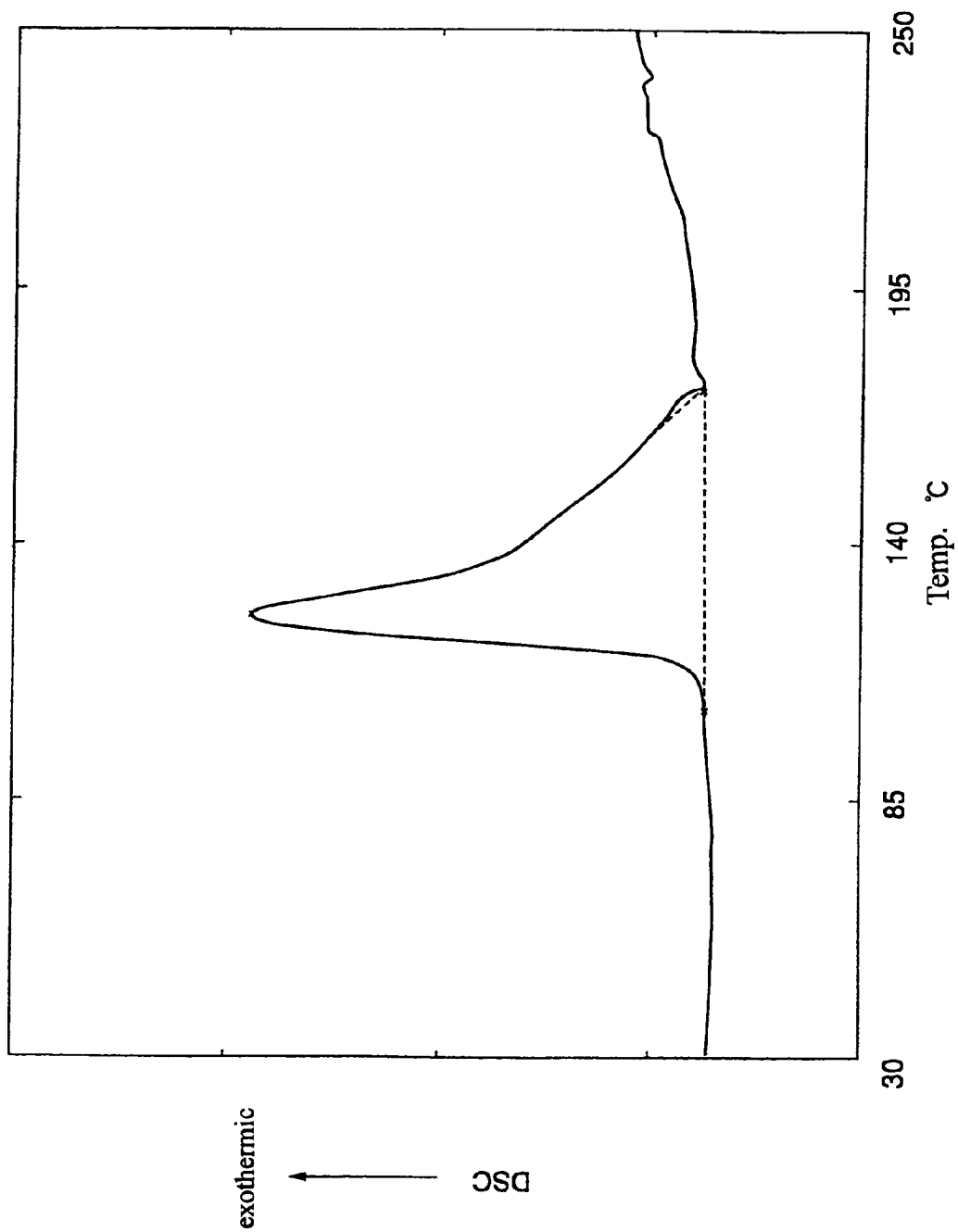
FIG. 68 shows a DSC chart of the resin composition containing the sample No. 28, which is specified in Example 11 described below.

To 100 parts by weight of a base resin (uncured resin) UVR-6410 (Trade name, Manufactured by Union Carbide Co., Ltd.), was added 8.62 parts by weight (equivalent to 4.0 parts by weight based on 1B2MZ) of the inventive curative of sample No. 27 described in Table 1. The curing temperature of the resulting resin composition was measured according to the procedure described in the example 7. As a result, it was found that the curing initiation temperature of the resin composition was 115° C. and the peak of heat generated during the reaction was 131° C. The DSC chart of the resin composition is shown in FIG. 67. Similarly, measurements of curing temperature were also made for a resin composition, wherein 6.64 parts by weight (equivalent to 4.0 parts by weight based on 1B2MZ) of a curative of sample No. 28 described in Table 1 was used instead of the curative of sample No. 27, and it was demonstrated that the curing initiation temperature of the later resin composition was 110° C. and the peak of heat generated during the reaction was 127° C. The DSC chart of the later resin composition is shown in FIG. 68.

The inventive curatives of sample Nos. 27 and 28 have a curing initiation temperature higher than 110° C., respectively, and it is obviously understood that the thermal stability of the resin compositions are well secured by using the inventive curatives and the curatives have excellent curing effect on resin compositions at a favorable temperature ranging from 130 to 140° C.

EXAMPLE 12

Measurements of Hygroscopy of Curatives (Part 1)

2 g of a curative powder of sample No. 24 according to the present invention was placed in a petri dish having a diameter of 3 cm, and the sample was allowed to stand for 3 days under a temperature of 40° C. and 90% R.H., and subsequently for 2 days under a temperature of 50° C. and 90% R.H. During these days, the weight of the sample was measured every 2 days to check the hygroscopy of the sample curative. The results are shown in Table 9. It is found that the curative has no hygroscopic property even under high humid atmosphere.

COMPARISON EXAMPLE 11

2 g of a curative powder of sample No. 51 described in Table 3 was placed in a petri dish having a diameter of 3 cm, and the hygroscopy of the sample was measured according to the procedure described in the example 12. The results are shown in Table 9. The curative showed its hygroscopic property of approximately 6% by weight after 3 days laying under an atmosphere of 40° C. and 90% R.H. Further, the sample showed its hygroscopic property of approximately 10% by weight when it was placed for 2 days under an atmosphere of 50° C. and 90% R.H.

From the comparison between the result in the example 12 and that of the comparison example 11, it is shown that the curative of sample No. 51 conventionally-used showed remarkable hygroscopic property after laying it under high humid atmosphere, while it is obviously understood that the inventive curative of sample No. 24 shows no hygroscopic property under the same condition and that the inventive curative has an excellent property of storage stability.

EXAMPLE 13

Measurements of Hygroscopy of Curatives (Part 2)

2 g of a curative powder of sample No. 10 according to the present invention was placed in a petri dish having a diameter of 3 cm, and the hygroscopy of the curative was determined according to the procedure described in the example 12. Similarly, measurements of hygroscopy were also made for the curative of sample No. 11 according to the same procedure. The results are shown in Table 10. It is found that these curatives showed to have no hygroscopic property even under high humid atmosphere.

COMPARISON EXAMPLE 12

2 g of a curative powder of sample No. 48 described in Table 3 was placed in a petri dish having a diameter of 3 cm, and the hygroscopy of the sample was measured according to the procedure described in the example 12. Similarly, measurements of hygroscopy were also made for the curative of sample No. 49 according to the same procedure. The results are shown in Table 10. The curative of sample No. 48 showed its hygroscopic property of approximately 5% by weight after 2 days laying under an atmosphere of 50° C. and 90% R.H., whereas the curative of sample No. 49 showed its hygroscopic property of approximately 25% by weight when it was placed for 3 days under an atmosphere of 40° C. and 90% R.H. or approximately 60% by weight when it was placed for 2 days under an atmosphere of 50° C. and 90% R.H.

From the comparison between the result in the example 13 and that of the comparison example 12, it is shown that the curatives of sample Nos. 48 and 49 conventionally-used showed remarkable hygroscopic property after laying them under high humid atmosphere, respectively, while it is obviously understood that the inventive curatives of sample Nos. 10 and 11 showed no hygroscopic property under the same condition and they have an excellent property of storage stability, respectively.

TABLE 9

| Test Period (Days) | Test Condition | Change in Weight (wt %) * | |
| --- | --- | --- | --- |
| | | Curative Sample No. 24 | Curative Sample No. 51 |
| 0 | | 0 | 0 |
| 1 | 40° C. | −0.03 | 3.33 |
| 2 | R.H. 90% | 0.01 | 4.97 |
| 3 | | 0 | 5.85 |
| 4 | 50° C. | −0.02 | 8.45 |
| 5 | R.H. 90% | −0.01 | 9.68 |

* Change in Weight (wt %) = {[(Weight of Curative after Testing) − (Weight of Curative before Testing)]/(Weight of Curative before Testing)} × 100

TABLE 10

| Test Period (Days) | Test Condition | Change in Weight (wt %) * | | | |
| --- | --- | --- | --- | --- | --- |
| | | Curative Sample No. 10 | Curative Sample No. 11 | Curative Sample No. 48 | Curative Sample No. 49 |
| 0 | | 0 | 0 | 0 | 0 |
| 1 | 40° C. | 0.12 | −0.20 | 4.69 | 29.3 |
| 2 | R.H. 90% | 0.15 | −0.20 | 4.63 | 26.9 |
| 3 | | 0.15 | −0.17 | 4.57 | 24.6 |
| 4 | 50° C. | 0.26 | −0.18 | 5.30 | 52.8 |
| 5 | R.H. 90% | 0.26 | −0.18 | 5.15 | 57.7 |

* Change in Weight (wt %) = {[(Weight of Curative after Testing) − (Weight of Curative before Testing)]/(Weight of Curative before Testing)} × 100

EXAMPLE 14

Measurements of Hygroscopy of Curatives (Part 3)

2 g of a curative powder of sample No. 36 according to the present invention was placed in a petri dish having a diameter of 3 cm, and the hygroscopy of the curative was determined according to the procedure described in the example 12. Similarly, measurements of hygroscopy were also made for the curative of sample No. 38 according to the same procedure. The results are shown in Table 11. It is found that these curatives showed to have no hygroscopic property even under high humid atmosphere.

COMPARISON EXAMPLE 13

2 g of a curative powder of sample No. 56 described in Table 3 was placed in a petri dish having a diameter of 3 cm, and the hygroscopy of the curative was measured according to the procedure described in the example 12, and the results are shown in Table 11. The curative showed its hygroscopic property of approximately 5% by weight after 3 days laying under an atmosphere of 40° C. and 90% R.H. or approximately 6% by weight when it was placed for 2 days under an atmosphere of 50° C. and 90% R.H.

From the comparison between the result in the example 14 and that of the comparison example 13, it is shown that the curative of sample No. 56 conventionally-used showed remarkable hygroscopic property after laying them under high humid atmosphere, while it is obviously understood that the inventive curatives of sample Nos. 36 and 38 showed no hygroscopic property under the same condition and they have an excellent property of storage stability, respectively.

Figure 69:
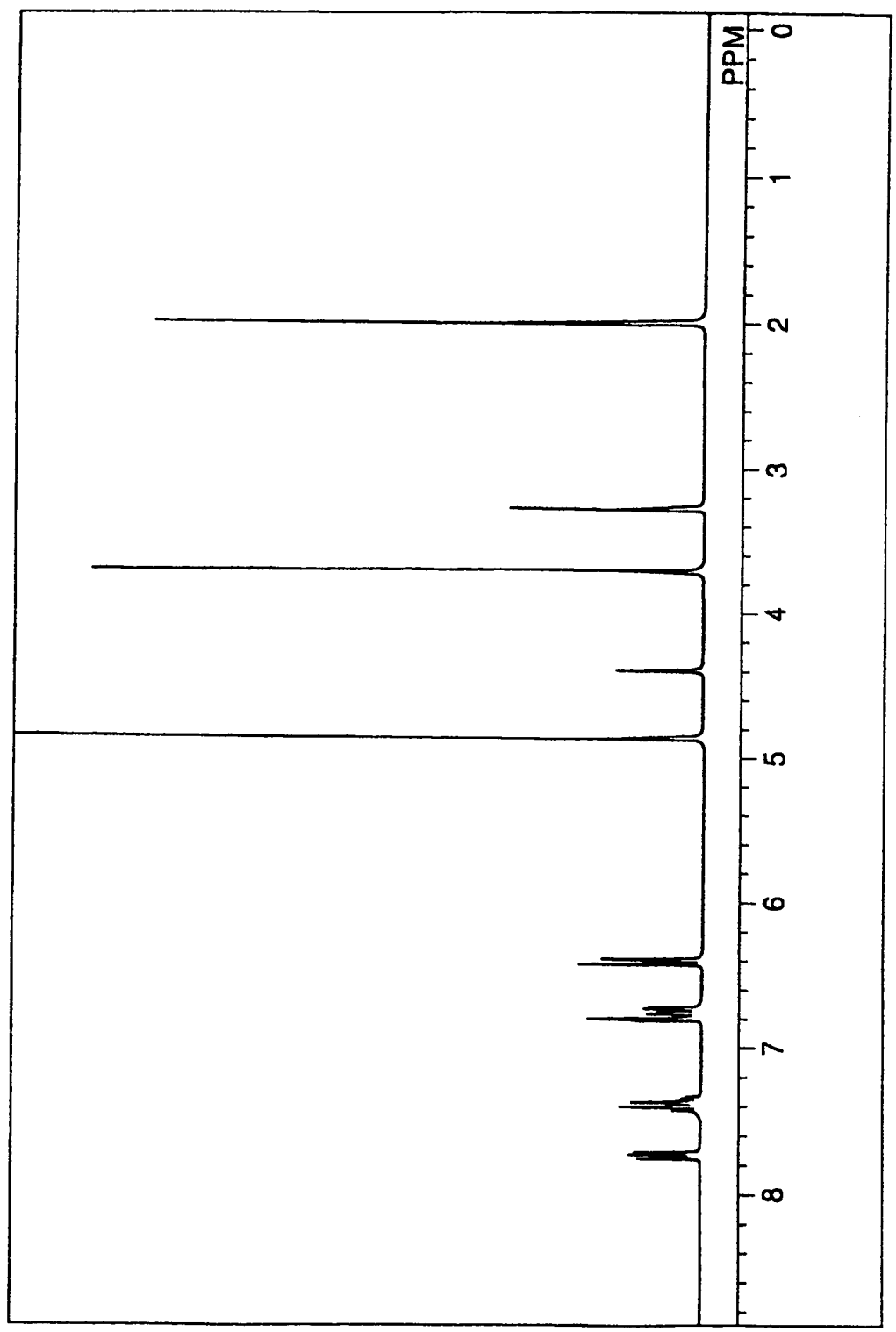
FIG. 69 shows a $^1HNMR$ spectrum chart of the sample No. 38 specified in Example 14 after subjecting it to a moisture absorption test.
Figure 70:
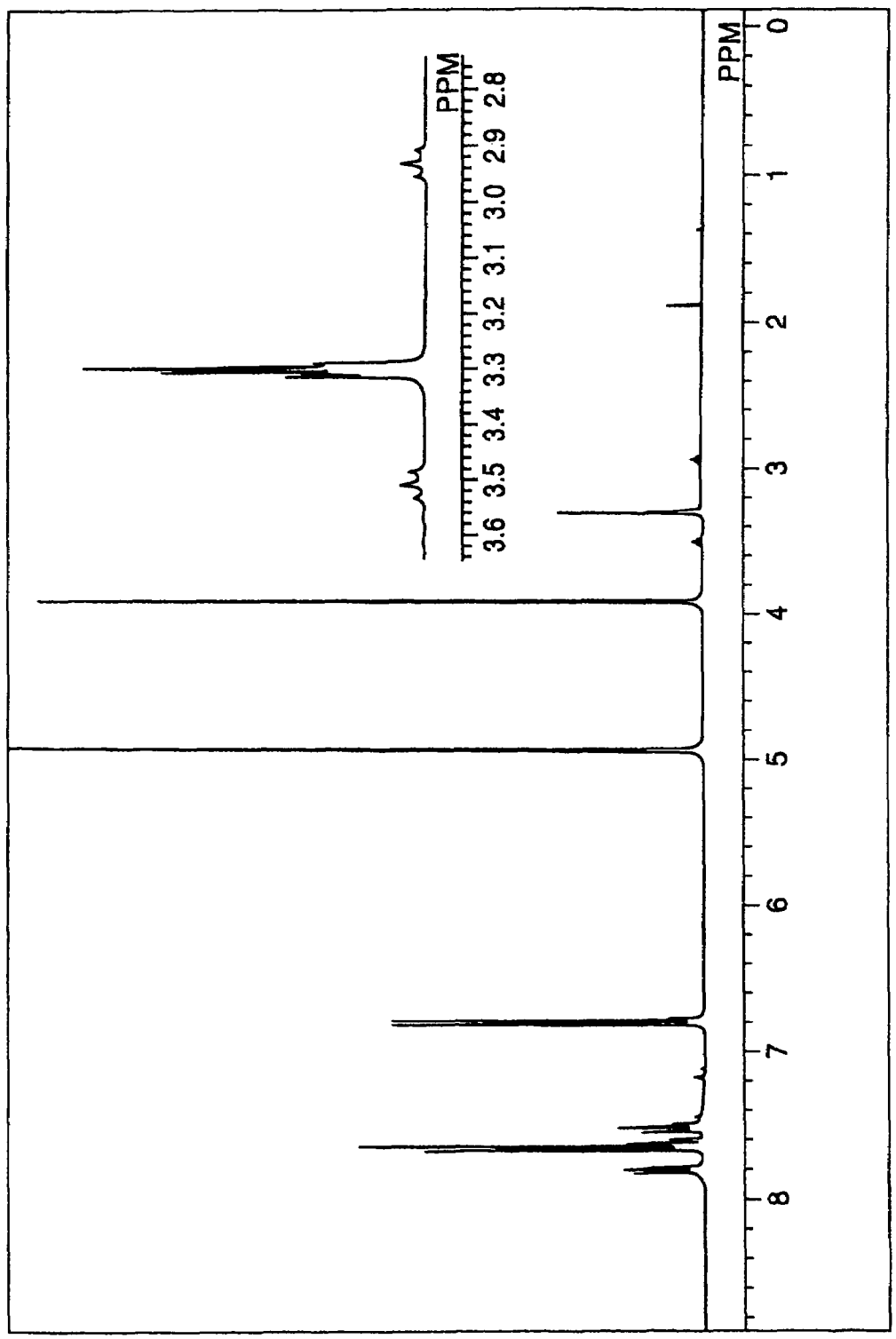
FIG. 70 shows a $^1HNMR$ spectrum chart of the sample No. 56 specified in Comparison Example 13 after subjecting it to a moisture absorption test.

Further, after performing the test above, $^1$H NMR spectrum analysis was carried out for the curatives of sample Nos. 38 and 56, respectively. The spectrum of the curative of sample No. 38 is shown in FIG. 69, and the spectrum of the curative of sample No. 56 is shown in FIG. 70. Impurity signals presumably related to the hydrolized products of 2PZL contained in the curative of sample No. 56 were observed, while no decomposition of 2PZL was observed from the spectrums of the curative of sample No. 38. From this results, it is obvious that the storage stability of the curatives according to the present invention is so excellent.

EXAMPLE 15

Measurements of Hygroscopy of Curatives (Part 4)

2 g powder of the inventive curative of sample No. 27 described in Table 1 was placed in a petri dish having a diameter of 3 cm, and the hygroscopy of the curative was determined according to the procedure described in the example 12. Similarly, measurements of hygroscopy were also made for the curative of sample No. 28 according to the same procedure. The results are shown in Table 12. It is found that these curatives showed to have no hygroscopic property even under high humid atmosphere.

COMPARISON EXAMPLE 14

2 g powder of a curative of sample No. 52 described in Table 3 was placed in a petri dish having a diameter of 3 cm, and the hygroscopy of the curative was measured according to the procedure described in the example 12, and the results are shown in Table 12. The curative showed its hygroscopic property of approximately 3% by weight after 3 days laying under an atmosphere of 40° C. and 90% R.H. or approximately 4.5% by weight when it was placed for 2 days under an atmosphere of 50° C. and 90% R.H.

From the comparison between the result in the example 15 and that of the comparison example 14, it is shown that the curative of sample No. 52 conventionally-used showed remarkable hygroscopic property after laying them under high humid atmosphere, while it is obviously understood that the inventive curatives of sample Nos. 27 and 28 showed no hygroscopic property under the same condition and they have an excellent property of storage stability, respectively.

TABLE 11

| | | Change in Weight (wt %) * | | |
|---|---|---|---|---|
| Test Period (Days) | Test Condition | Curative Sample No. 36 | Curative Sample No. 38 | Curative Sample No. 56 |
| 0 | | 0 | 0 | 0 |
| 1 | 40° C. | −0.10 | −0.20 | 7.12 |
| 2 | R.H. 90% | −0.02 | −0.15 | 5.88 |
| 3 | | 0.12 | −0.06 | 4.97 |
| 4 | 50° C. | 0.02 | −0.09 | 6.73 |
| 5 | R.H. 90% | 0 | −0.10 | 5.79 |

* Change in Weight (wt %) = {[(Weight of Curative after Testing) − (Weight of Curative before Testing)]/(Weight of Curative before Testing)} × 100

TABLE 12

| | | Change in Weight (wt %) * | | |
|---|---|---|---|---|
| Test Period (Days) | Test Condition | Curative Sample No. 27 | Curative Sample No. 28 | Curative Sample No. 52 |
| 0 | | 0 | 0 | 0 |
| 1 | 40° C. | −0.19 | −0.17 | 1.53 |
| 2 | R.H. 90% | −0.22 | −0.18 | 2.19 |
| 3 | | −0.17 | −0.17 | 2.70 |
| 4 | 50° C. | −0.21 | −0.22 | 3.90 |
| 5 | R.H. 90% | −0.21 | −0.22 | 4.41 |

* Change in Weight (wt %) = {[(Weight of Curative after Testing) − (Weight of Curative before Testing)]/(Weight of Curative before Testing)} × 100

EXAMPLE 16

Measurements of Subliming Property of Curatives (Part 1)

The inventive curative of sample No. 10 described in Table 1. was held for 30 min. by using a thermal analyzer (TG) at 100° C., and the change in the weight of the curative was checked. Similarly, such change in weight was also checked for a curative of sample No. 11, and the results are shown in Table 13. Further, these curatives were held for 30 min. by using a thermal analyzer (TG) at 150° C., and the change in the weight of these curatives was checked, respectively. The results are shown in Table 14. It is found that no change in the weight was observed for these curatives when they were held for 30 min. at 100° C. and for 30 min. at 150° C., respectively.

COMPARISON EXAMPLE 15

Weight change after holding at 100° C. and 150° C. was checked for the curatives of sample Nos. 48 and 49 described in Table 3 according to the procedure described in the example 16, respectively. The results at 100° C. and 150° C. are shown in Table 13 and Table 14, respectively. In case of the curative of sample No. 48, weight change of 10% was observed by 30 min. holding at 100° C. and weight change of approximately 20% was observed by 30 min. holding at 150° C. Whereas, in case of the curative of sample No. 49, weight change of approximately 9% was observed by 30 min. holding at 100° C. and weight change of approximately 20% was observed by 30 min. holding at 150° C.

From the comparison between the result in the example 16 and that of the comparison example 15, it is shown that the curatives of sample Nos. 48 and 49 conventionally-used showed subliming property, while it is obviously understood that the inventive curatives of sample Nos. 10 and 11 showed to have no subliming property but they have an excellent property of storage stability, respectively.

TABLE 13

| Test Period (min.) | Test Condition | Change in Weight (wt %) * | | | |
|---|---|---|---|---|---|
| | | Curative Sample No. 10 | Curative Sample No. 11 | Curative Sample No. 48 | Curative Sample No. 49 |
| 0 | | 0 | 0 | 0 | 0 |
| 5 | 100° C. | −0.1 | −0.3 | −2.8 | −4.9 |
| 10 | Fold | −0.2 | −0.3 | −6.0 | −6.2 |
| 20 | | −0.2 | −0.3 | −8.1 | −7.6 |
| 30 | | −0.2 | −0.4 | −10.0 | −8.6 |

* Change in Weight (wt %) = {[(Weight of Curative after Testing) − (Weight of Curative before Testing)]/(Weight of Curative before Testing)} × 100

TABLE 14

| Test Period (min.) | Test Condition | Change in Weight (wt %) * | | | |
|---|---|---|---|---|---|
| | | Curative Sample No. 10 | Curative Sample No. 11 | Curative Sample No. 48 | Curative Sample No. 49 |
| 0 | | 0 | 0 | 0 | 0 |
| 5 | 150° C. | −0.2 | −0.3 | −9.8 | −7.0 |
| 10 | Fold | −0.4 | −0.3 | −19.1 | −15.2 |
| 20 | | −0.6 | −0.5 | −20.7 | −20.3 |
| 30 | | −0.6 | −0.8 | −20.9 | −22.0 |

* Change in Weight (wt %) = {[(Weight of Curative after Testing) − (Weight of Curative before Testing)]/(Weight of Curative before Testing)} × 100

EXAMPLE 17

Measurements of Subliming Property of Curatives (Part 2)

Using the inventive curative of sample No. 24 described in Table 1, weight change of the curative when it was held for 30 min. at 100° C. and for 30 min. at 150° C. were checked according to the procedure described in the example 16. The results at 100° C. and 150° C. are shown in Table 15 and Table 16, respectively. It is found that no change in the weight was observed for the curative when it was held for 30 min. both at 100 ° C. and 150° C.

COMPARISON EXAMPLE 16

Weight change after holding at 100° C. and 150° C. was checked for the curative of sample Nos. 50 described in Table 3 according to the procedure described in the example 16. The results at 100° C. and 150° C. are shown in Table 15 and Table 16, respectively. Weight change of approximately 3% was observed for the curative by 30 min. holding at 100° C. and weight change of approximately 12% was observed by 30 min. holding at 150° C.

From the comparison between the result in the example 17 and that of the comparison example 16, it is shown that the curative of sample No. 50 conventionally-used showed subliming property, while it is obviously understood that the inventive curative of sample No. 24 and 11 showed to have no subliming property but it has an excellent property of storage stability.

TABLE 15

| Test Period (min.) | Test Condition | Change in Weight (wt %) * | |
|---|---|---|---|
| | | Curative Sample No. 24 | Curative Sample No. 50 |
| 0 | | 0 | 0 |
| 5 | 100° C. Fold | 0 | −0.3 |
| 10 | | 0 | −0.8 |
| 20 | | −0.1 | −1.7 |
| 30 | | −0.1 | −2.8 |

* Change in Weight (wt %) = {[(Weight of Curative after Testing) − (Weight of Curative before Testing)]/(Weight of Curative before Testing)} × 100

TABLE 16

| Test Period (min.) | Test Condition | Change in Weight (wt %) * | |
|---|---|---|---|
| | | Curative Sample No. 24 | Curative Sample No. 50 |
| 0 | | 0 | 0 |
| 5 | 150° C. Fold | −0.3 | −2.0 |
| 10 | | −0.6 | −4.6 |
| 20 | | −0.7 | −8.2 |
| 30 | | −1.0 | −11.8 |

* Change in Weight (wt %) = {[(Weight of Curative after Testing) − (Weight of Curative before Testing)]/(Weight of Curative before Testing)} × 100

EXAMPLE 18

Measurements of Subliming Property of Curatives (Part 3)

Using the inventive curatives of sample Nos. 36 and 38 described in Table 1, weight change of these curatives when they were held for 30 min. at 100° C. and for 30 min. at 150° C. were checked according to the procedure described in the example 16. The results at 100° C. and 150° C. are shown in Table 17 and Table 18, respectively. It is found that no change in the weight was observed for the curatives when they were held for 30 min. both at 100° C. and 150° C., respectively.

COMPARISON EXAMPLE 17

Weight change after holding at 100° C. and 150° C. was checked for the curative of sample Nos. 56 described in Table 3 according to the procedure described in the example 16. The results at 100° C. and 150° C. are shown in Table 17 and Table 18, respectively. Weight change of approximately 4% was observed for the curative by 30 min. holding at 100° C. and weight change of approximately 10% was observed by 30 min. holding at 150° C.

From the comparison between the result in the example 18 and that of the comparison example 17, it is shown that the curative of sample No. 56 conventionally-used showed subliming property, while it is obviously understood that the inventive curatives of sample Nos. 36 and 38 showed to have no subliming property but they have an excellent property of storage stability, respectively.

TABLE 17

| | | Change in Weight (wt %) * | | |
|---|---|---|---|---|
| Test Period (min.) | Test Condition | Curative Sample No. 36 | Curative Sample No. 38 | Curative Sample No. 56 |
| 0 | | 0 | 0 | 0 |
| 5 | 100° C. Fold | 0 | 0 | −1.5 |
| 10 | | −0.1 | 0 | −1.8 |
| 20 | | −0.3 | −0.1 | −2.4 |
| 30 | | −0.4 | −0.1 | −3.8 |

* Change in Weight (wt %) = {[(Weight of Curative after Testing) − (Weight of Curative before Testing)]/(Weight of Curative before Testing)} × 100

TABLE 18

| | | Change in Weight (wt %) * | | |
|---|---|---|---|---|
| Test Period (min.) | Test Condition | Curative Sample No. 36 | Curative Sample No. 38 | Curative Sample No. 56 |
| 0 | | 0 | 0 | 0 |
| 5 | 150° C. Fold | −0.2 | −0.2 | −4.6 |
| 10 | | −0.3 | −0.4 | −6.8 |
| 20 | | −0.5 | −0.5 | −8.5 |
| 30 | | −0.6 | −0.7 | −9.8 |

* Change in Weight (wt %) = {[(Weight of Curative after Testing) − (Weight of Curative before Testing)]/(Weight of Curative before Testing)} × 100

EXAMPLE 19

Demonstration of Curing Effect of Curatives at Low Temperature (Part 1)

Figure 71:
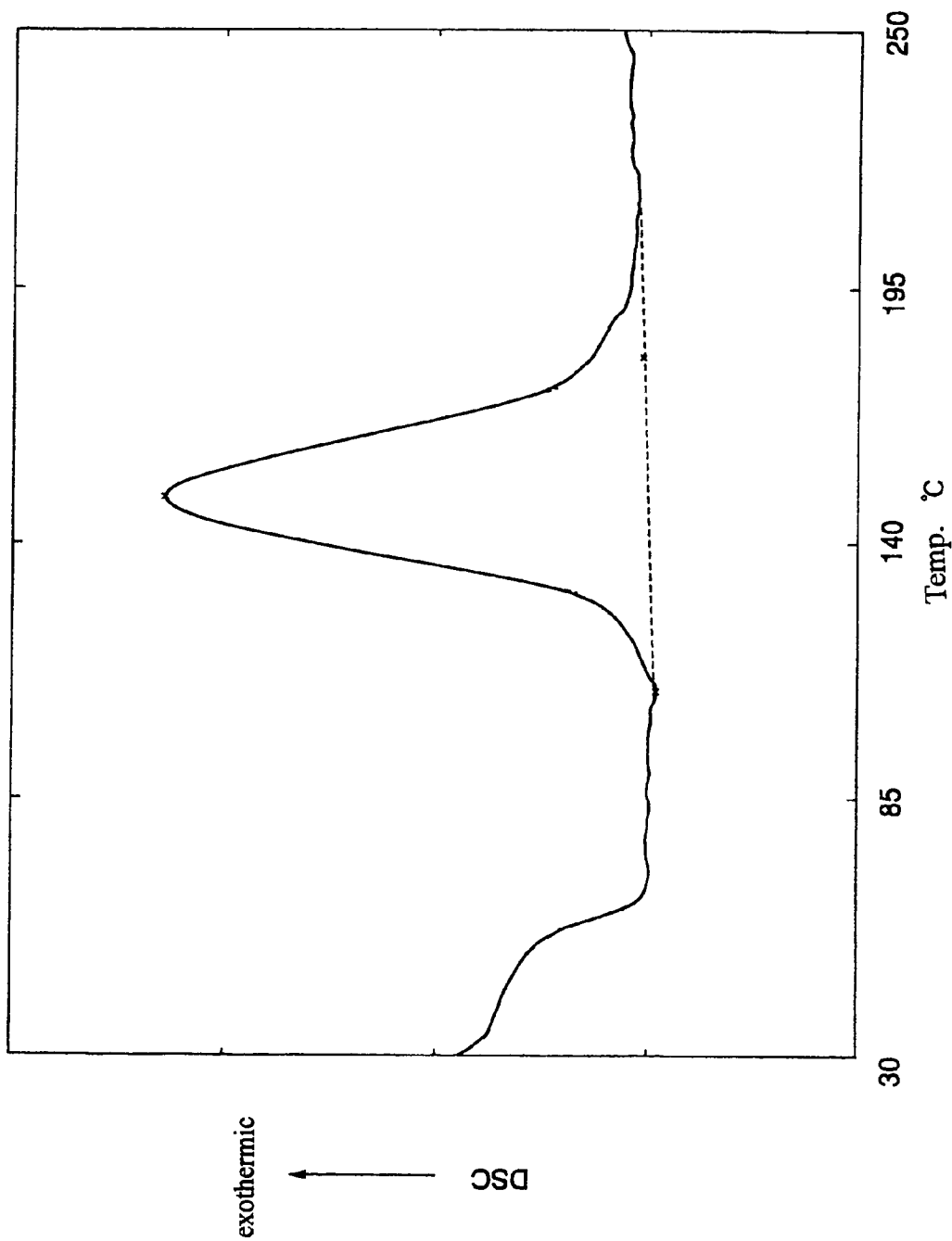
FIG. 71 shows a DSC chart of the resin composition containing the sample No. 27 specified in Example 19 after subjecting it to a heating test.

To 100 parts by weight of a base resin (uncured resin), Epicoat 1004 (Manufactured by Yuka Shell Co., Ltd.), was compounded 0.95 parts by weight (equivalent to 0.44 parts by weight based on 1B2MZ) of the inventive curative of sample No. 27 described in Table 1, and the resulting mixture was kneaded for 30 min. at 80° C. and then cooled down to room a temperature to prepare a resin composition. Then, the part of the composition was collected and was used to determine the curing temperature of the resin composition from the peak of generated heat during the curing by using a thermal analyzer (DSC). As a result, it is found that the peak of heat generated from the resin composition at the reaction was 148° C. The DSC chart of the resin composition is shown in FIG. 71.

COMPARISON EXAMPLE 18

Figure 72:
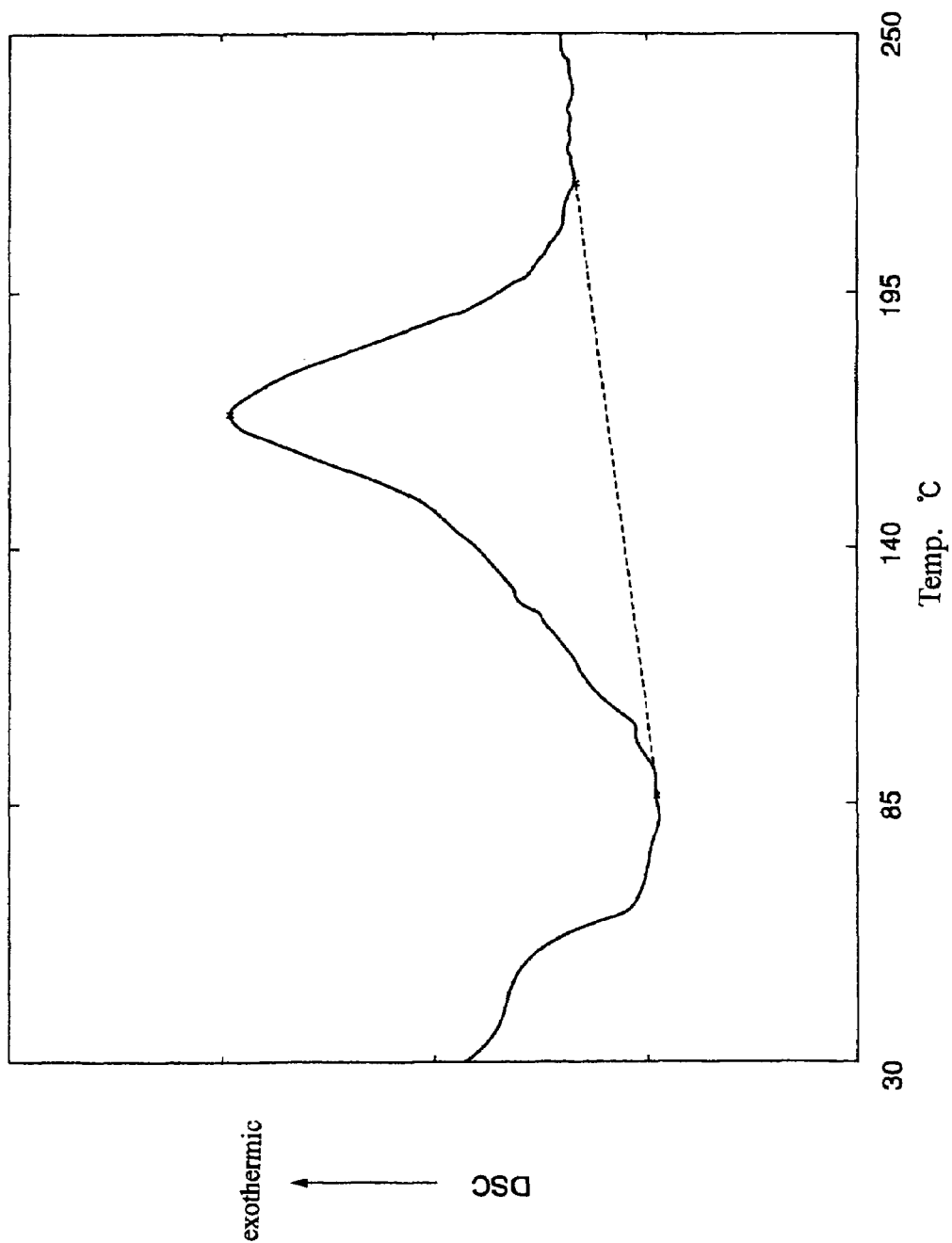
FIG. 72 shows a DSC chart of the resin composition containing 1B2MZ specified in Comparison Example 18 after subjecting it to a heating test.

Using 1.08 parts by weight (equivalent to 0.44 parts by weight based on 1B2MZ) of a curative of sample No. 52 described in Table 3, a resin composition was prepared according to the procedure described in the example 19, and the curing temperature of the said resin composition was measured by using DSC. The peak of heat generated from the resin composition at a reaction was 168° C. Also, another resin composition was prepared according to the procedure described in the example 19 by using 0.44 parts by weight of 1B2MZ as a curative, and the curing temperature was measured according to the method as described above. As a result, the peak of heat generated from the later resin composition at a reaction was found to be 170° C. The DSC chart of the later resin composition is shown in FIG. 72.

From the comparison between the result in the example 19 and that of the comparison example 18, it is shown that the peak of heat generated from the resin compositions using either a curative of sample No. 52 being used in the past or 1B2MZ were more or less 170° C. Therefore, it is noted that high temperature as high as 170° C. is required to thoroughly cure these resin compositions. On the other hand, the resin composition which contains the inventive curative of sample No. 27 has a lower peak of heat at reaction as low as 148° C., and therefore, it is possible to thoroughly cure the resin composition at a temperature which is 20° C. lower than the case of this comparison example. Considering this result, it is obvious that the inventive curative has an excellent curability at low temperatures.

EXAMPLE 20

Demonstration of Curing Effect of Curatives at Low Temperature (Part 2)

To 100 parts by weight of a base resin (uncured resin), Epicoat 1004 (Manufactured by Yuka Shell Co., Ltd.), was compounded 0.95 parts by weight (equivalent to 0.44 parts by weight based on 1B2MZ) of the inventive curative of sample No. 27 described in Table 1, and the resulting mixture was kneaded for 30 min. at a room temperature to prepare a resin composition. Then, the part of the composition was held at 120° C. by using a thermal analyzer (DSC) to determine the peak area of heat generated during the curing of the resin composition. As a result, it is found that the resin composition generated heat of 150 jule/g during the curing at 120° C.

COMPARISON EXAMPLE 19

Using 1.08 parts by weight (equivalent to 0.44 parts by weight based on 1B2MZ) of a curative of sample No. 52 described in Table 3, a resin composition was prepared according to the procedure described in the example 20. Then, the part of the resin composition was collected and held at 120° C. by using a thermal analyzer (DSC) to determine the peak area of heat generated during the curing of the said composition. As a result, the resin composition generated heat of 27 jule/g during the curing at 120° C. Similarly, another resin composition was prepared by using 0.44 parts by weight of 1B2MZ as a curative according to the procedure described in the example 20, and the peak area of heat generated during curing according to the method as described above. As a result, it is found that the later resin composition generated heat of 30 jule/g during the curing at 120° C.

From the comparison between the result in the example 20 and that of the comparison example 19, it is shown that the generated amount of heat from the resin compositions using either a curative of sample No. 52 being used in the past or 1B2MZ during curing at 120° C. were too small to initiate the curing. However, the resin composition which contains the inventive curative of sample No. 27 generated 5 times larger heat than the heat generated in this comparison example even at a low temperature of 120° C. Considering this result, it is obvious that the inventive curative has an excellent curability at low temperatures.

EXAMPLE 21

Demonstration of Curing Accelerating Effect of Tetrakisphenol Compounds on Paint Compositions and Resin Compositions To 100 parts by weight of a base resin (uncured resin), UVR-6410 (Trade name, Manufactured by Union Carbide Co., Ltd.), were added 4.0 parts by weight of 1B2MZ and 5.0 parts by weight of TEP. After kneading the mixture for 10 min. at 25° C. and then allowing it to stand for 20 min. at 25° C., the initial viscosity of the resulting resin composition was then measured. Then, the resin composition was laid at 25° C., and the periodical change in the viscosity was measured. Measurements of viscosity were done according to JIS K-6833-1994, for which B8R-type rotary viscosity meter (Manufactured by Tokyo Keiki Co., Ltd.) was used. The results of the measurements are shown in Table 19. If the pot life of the resin composition is defined as time required to make the viscosity of the resin to the double value of the initial viscosity value, the pot life of the resin composition was approximately one hour. Further, in the test described above, measurements of the pot life of the resin composition, wherein 4.0 parts by weight of 2E4MZ was used instead of 1B2MZ, was performed according to the procedure as described above. As results shown in Table 19, the pot life of the resin composition was 2 hours. Again, in the test described above, measurements of the pot life of a resin composition, wherein 1.0 part by weight of 1B2MZ was used instead of 4.0 parts by weight of 1B2MZ, was performed according to the same procedure as described above. As can be understood from the result shown in Table 19, the pot life of the resin composition was 2 hours.

COMPARISON EXAMPLE 20

The pot life of each resin compositions were respectively measured according to the same procedure described in the example 21, except the step to add TEP. The results are shown in Table 19. The pot life of a resin composition to which 4.0 parts by weight of 1B2MZ was compounded was 10 hours. Whereas, the pot life of a resin composition to which 4.0 parts by weight of 2E4MZ was compounded was 8 hours. Further, the pot life of a resin composition to which 1.0 part by weight of 1B2MZ was compounded was 10 hours.

From the comparison between the result in the example 21 and that of the comparison example 20, it is shown that the pot life of the resin composition to which TEP was compounded was ¼ to ¹⁄₁₀ time of the one of the resin composition without TEP, and it is obvious that cured-products can be obtained in a short time when the resin composition compounded with TEP is used.

Furthermore, when any of phenol, bisphenol A, bisphenol S and 1,1-bis(4-hydroxyphenyl)cyclohexane was added instead of TEP in the example 21 to the resin composition, reduction of the pot life, namely the effect to accelerate a curing reaction of a resin composition, which was noted in case of a resin composition compounded with TEP, was not observed at all.

TABLE 19

| | Viscosity of Resin (cp/25° C.) | | | |
|---|---|---|---|---|
| Time (h) | Resin Compounded with 4.0% by Weight 1B2MZ + 5.0% by Weight TEP | Resin Compounded with 4.0% by Weight 2E4MZ + 5.0% by Weight TEP | Resin Compounded with 1.0% by Weight 1B2MZ + 5.0% by Weight TEP | Resin Compounded with 4.0% by Weight 1B2MZ |
| 0 | 12500 | 15200 | 13000 | 10200 |
| 1 | 23500 | 20500 | 19500 | 10200 |
| 2 | 65700 | 29800 | 29700 | 10700 |
| 3 | 377000 | 40100 | 56800 | |
| 4 | | 57200 | 182000 | 12400 |
| 5 | | 88600 | | |
| 6 | | | | 14800 |
| 8 | 2000000 ↑ | 2000000 ↑ | 2000000 ↑ | 16700 |
| 10 | | | | 20400 |
| 18 | | | | 120000 |
| 24 | | | | |

| | Viscosity of Resin (cp/25° C.) | | |
|---|---|---|---|
| Time (h) | Resin Compounded with 4.0% by Weight 1B2MZ | Resin Compounded with 1.0% by Weight 1B2MZ | Resin Compounded with 1.0% by Weight 1B2MZ |
| 0 | 13400 | 10200 | 9000 |
| 1 | 13400 | 10200 | 9000 |
| 2 | 14000 | 10700 | 9300 |
| 3 | | | 9900 |
| 4 | 16800 | 12400 | 10800 |
| 5 | | | 12500 |
| 6 | 20600 | 14800 | 14200 |

TABLE 19-continued

| | | | |
|---|---|---|---|
| 8 | 25000 | 16700 | 18400 |
| 10 | 31500 | 20400 | |
| 18 | | 120000 | |
| 24 | 179000 | | |

INDUSTRIAL USE

The curatives for epoxy resins and the curing accelerators for epoxy resins according to the present invention are formed into a clathrate comprising a curative normally used for an epoxy resins and a curing accelerator for epoxy resins, which are included with a tetrakisphenol host compound, and are capable of improving the subliming property and the decomposing property of the curative for epoxy resins and the curing accelerator for epoxy resins and of steadily remaining in an epoxy resin under a normal temperature, and they can prolong the pot life of epoxy resins when they are admixed into an epoxy resin. In particular, stability of curatives and curing accelerators to heat, which is an extremely important factor for the control of a curing reaction, is remarkably improved, allowing to cure an epoxy resin even at a low temperature. By using the curatives and the curing accelerators, it is possible to improve working efficiency, and they have better mechanical strength and better guest release capability than the microcapsulated ones. Further, the curatives and the curing accelerators according to the present invention have such advantages that they can faster the curing speed of a curative for curing epoxy resins, shorten time for completing curing of an epoxy resin composition and lower the amount of a curative being required in the past, and they are useful for various applications for curing epoxy resins, for example, epoxy resin-type adhesives, a sealant for semiconductors, laminates for printed boards, varnish, powder paints, casting materials and inks. In particular, the present invention provides excellently suitable epoxy resins compositions useful as epoxy-type paints, etc.

The curatives and the curing accelerators according to the present invention are also applicable for two-pack type thermocurable resin compositions, such as urethane resins and silicon resins, which can initiate a curing reaction just by mixing a main component and a subcomponent, even they are not an epoxy resin.

What is claimed is:

1. An epoxy resin composition comprising:
   an epoxy resin prior to curing,
   a non-clathrated curing agent reacting with an epoxy group of the epoxy resin to cure the resin, and
   a tetrakisphenol compound represented by a general formula (I) as a curing accelerator catalyst,

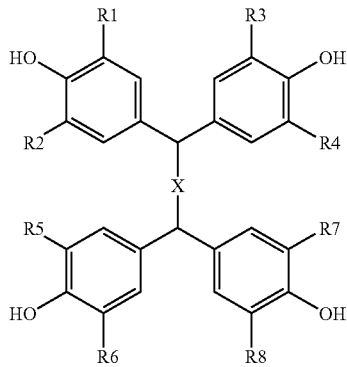

wherein X represents $(CH_2)n$, wherein n is 0, 1, 2 or 3, and $R^1$ to $R^8$ each represents hydrogen, a lower alkyl, a phenyl optionally substituted with halogen or $C_1$-$C_6$ alkyl, a halogen or a $C_1$-$C_6$ alkoxy, and
   wherein the content of said tetrakisphenol compound represented in formula (I) is a range from 0.001 to 0.025 mole based on 1 mole of the epoxy group.

2. A method for curing an epoxy resin comprising a step of mixing a non-clathrated curing agent reacting with an epoxy group of the epoxy resin to cure the resin and a tetrakisphenol compound represented by a general formula (I) as a curing accelerator catalyst with a non-curing epoxy resin,

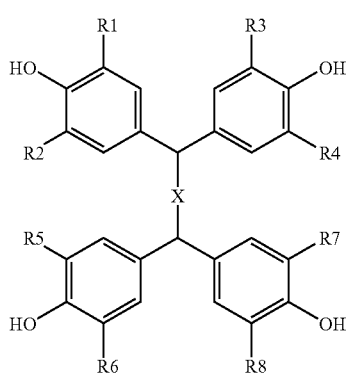

wherein X represents $(CH_2)n$, wherein n is 0, 1, 2 or 3, and $R^1$ to $R^8$ each represents hydrogen, a lower alkyl, a phenyl optionally substituted with halogen or $C_1$-$C_6$ alkyl, a halogen or a $C_1$-$C_6$ alkoxy, and
   wherein the content of said tetrakisphenol compound represented in formula (I) is a range from 0.001 to 0.025 mole based on 1 mole of the epoxy group.

3. An epoxy resin composition comprising a non-curing epoxy resin, and a clathrate comprising a tetrakisphenol compound represented by a general formula (I) and a compound reacting with an epoxy group of the epoxy resin to cure the resin; and
   a clathrate comprising a tetrakisphenol compound represented by a general formula (I) and a compound accelerating the curing of a compound reacting with an epoxy group to cure an epoxy resin,

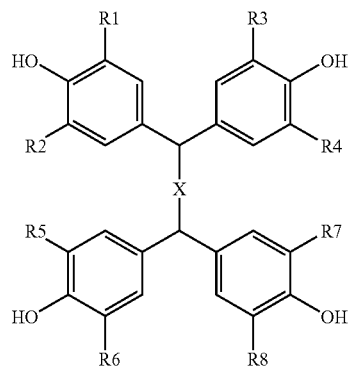

wherein X represents $(CH_2)n$, wherein n is 0, 1, 2 or 3, and $R^1$ to $R^8$ each represents hydrogen, a lower alkyl, a phenyl optionally substituted with halogen or $C_1$-$C_6$ alkyl, a halogen or a $C_1$-$C_6$ alkoxy, wherein the content of the tetrakisphenol compound represented by general formula (I) in the clathrate is from 0.001 to 0.025 mole based on 1 mole of the epoxy group.

4. A method for curing an epoxy resin composition comprising the steps of:
a clathrate comprising a tetrakisphenol compound represented by a general formula (I) and a compound reacting with an epoxy group of the epoxy resin to cure the resin is added and mixed to a non-curing epoxy resin, and then the mixture is heated to a predetermined temperature,

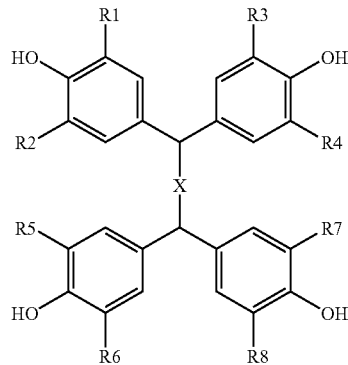

wherein X represents $(CH_2)n$, wherein n is 0, 1, 2 or 3, and $R^1$ to $R^8$ each represents hydrogen, a lower alkyl, a phenyl optionally substituted with halogen or $C_1$-$C_6$ alkyl, a halogen or a $C_1$-$C_6$ alkoxy,
wherein the content of the tetrakisphenol compound represented by general formula (I) in the clathrate is from 0.001 to 0.025 mole based on 1 mole of the epoxy group.

* * * * *